United States Patent
Park et al.

(10) Patent No.: US 11,088,732 B2
(45) Date of Patent: Aug. 10, 2021

(54) METHOD FOR TRANSMITTING/RECEIVING CHANNEL STATE INFORMATION IN WIRELESS COMMUNICATION SYSTEM AND APPARATUS FOR SAME

(71) Applicant: LG ELECTRONICS INC., Seoul (KR)

(72) Inventors: Haewook Park, Seoul (KR); Hyungtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/065,085

(22) PCT Filed: Sep. 26, 2017

(86) PCT No.: PCT/KR2017/010613
§ 371 (c)(1),
(2) Date: Jun. 21, 2018

(87) PCT Pub. No.: WO2018/056786
PCT Pub. Date: Mar. 29, 2018

(65) Prior Publication Data
US 2019/0007106 A1  Jan. 3, 2019

Related U.S. Application Data

(60) Provisional application No. 62/400,066, filed on Sep. 26, 2016, provisional application No. 62/417,257, (Continued)

(51) Int. Cl.
*H04B 7/06* (2006.01)
*H04B 7/0417* (2017.01)
(Continued)

(52) U.S. Cl.
CPC .......... *H04B 7/0417* (2013.01); *H04B 7/0426* (2013.01); *H04B 7/0456* (2013.01); *H04B 7/0626* (2013.01)

(58) Field of Classification Search
CPC .. H04B 7/0417; H04B 7/0426; H04B 7/0456; H04B 7/0478; H04B 7/0626; H04B 7/0639; H04B 7/2603; H04B 17/309
(Continued)

(56) References Cited

U.S. PATENT DOCUMENTS

2014/0071848 A1   3/2014  Park et al.
2014/0328422 A1*  11/2014  Chen .................. H04B 7/0486
                                                   375/267
(Continued)

FOREIGN PATENT DOCUMENTS

WO       2012144842      10/2012

OTHER PUBLICATIONS

European patent application No. 17853500.1, European search report dated Dec. 2, 2019, 13 pages.
(Continued)

*Primary Examiner* — Shawkat M Ali
(74) *Attorney, Agent, or Firm* — Lee Hong Degerman Kang & Waimey

(57) ABSTRACT

Disclosed are a method for transmitting/receiving channel state information in a wireless communication system and an apparatus for the same. Particularly, a method for reporting channel state information (CSI) by a user equipment (UE) in a wireless communication system may comprise the steps of: receiving channel state information reference signal (CSI-RS) from a base station through a multi-antenna port; and reporting CSI to the base station, wherein the CSI includes selection information indicating multiple codewords used to generate a precoding matrix within a code-
(Continued)

book for reporting the CSI, a power coefficient and a phase coefficient are applied to each of the multiple codewords and the precoding matrix is then generated on the basis of a linear combination of the multiple codewords to each of which the power and phase coefficients are applied, and the selection information and information indicating the power coefficient are transmitted at different CSI reporting instances.

15 Claims, 20 Drawing Sheets

Related U.S. Application Data filed on Nov. 3, 2016, provisional application No. 62/453,002, filed on Feb. 1, 2017, provisional application No. 62/454,879, filed on Feb. 5, 2017.

(51) Int. Cl.
*H04B 7/0456* (2017.01)
*H04B 7/0426* (2017.01)

(58) Field of Classification Search
USPC .................. 375/219, 260, 267, 295, 316
See application file for complete search history.

(56) References Cited

U.S. PATENT DOCUMENTS

| | | | |
|---|---|---|---|
| 2014/0362783 A1 | 12/2014 | Yue et al. | |
| 2015/0229371 A1* | 8/2015 | Kim | H04B 7/0469 375/267 |
| 2015/0236766 A1* | 8/2015 | Papadopoulos | H04B 7/0452 370/329 |
| 2015/0280801 A1* | 10/2015 | Xin | H04B 7/0478 370/329 |
| 2016/0072562 A1 | 3/2016 | Onggosanusi et al. | |
| 2016/0142117 A1* | 5/2016 | Rahman | H04B 7/0469 375/267 |
| 2016/0218791 A1 | 7/2016 | Ko et al. | |
| 2016/0359538 A1* | 12/2016 | Onggosanusi | H04L 5/0057 |
| 2018/0014305 A1* | 1/2018 | Nayebi | H04B 7/0413 |
| 2018/0254813 A1* | 9/2018 | Gao | H04B 7/0632 |

OTHER PUBLICATIONS

Samsung, "Linear combination (LC) codebook based CSI reporting and simulation results," 3GPP TSG RAN WG1 Meeting #86, R1-166734, Gothenburg, Sweden, Aug. 22-26, 2016, 10 pages.

Samsung, "LC based explicit CSI feedback and simulation results," 3GPP TSG RAN WG1 Meeting #86, R1-166735, Gothenburg, Sweden, Aug. 22-26, 2016, 8 pages.

PCT International Application No. PCT/KR2017/010613, International Search Report dated Jan. 19, 2018, 6 pages.

Korean Intellectual Property Office Application No. 10-2018-7019889, Office Action dated Nov. 21, 2018, 5 pages.

NTT Docomo, "Codebook Enhancement for eFD-MIMO", 3GPP TSG RAN WG1 Meeting #86, R1-167348, Aug. 2016, 4 pages.

Samsung, "Linear combination (LC) codebook base CSI reporting and simulation results", 3GPP TSG RAN WG1 Meeting #85, R1-164780, 10 pages.

Samsung, "Discussions on periodic CSI reporting for class a in eFD-MIMO", 3GPP TSG RAN WG1 Meeting #85, R1-164775, May 2016, 4 pages.

* cited by examiner

[FIG. 1]
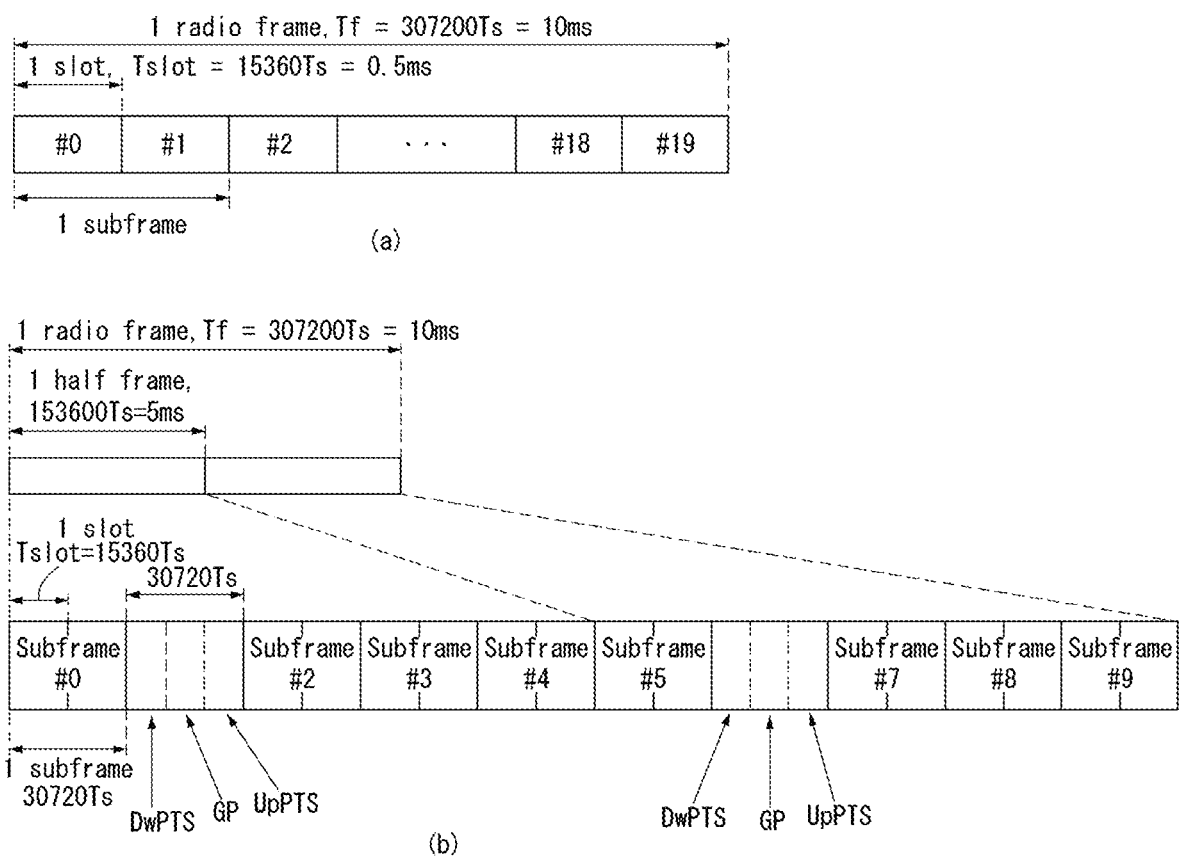

[FIG. 2]
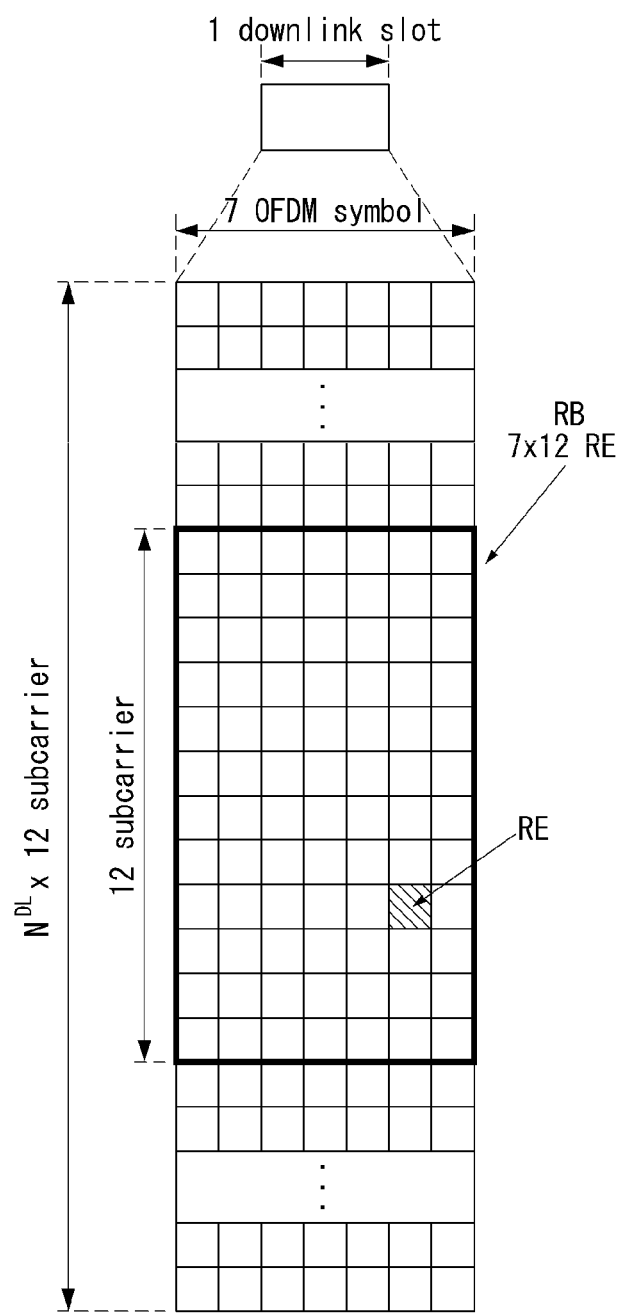

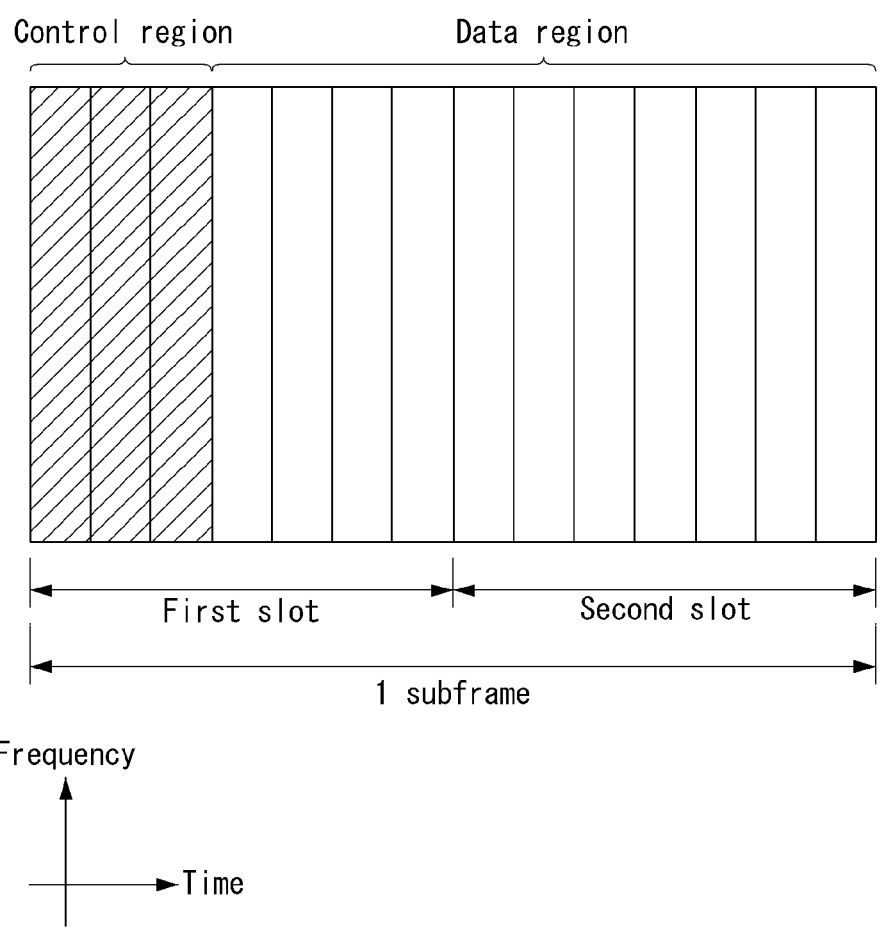

【FIG. 4】
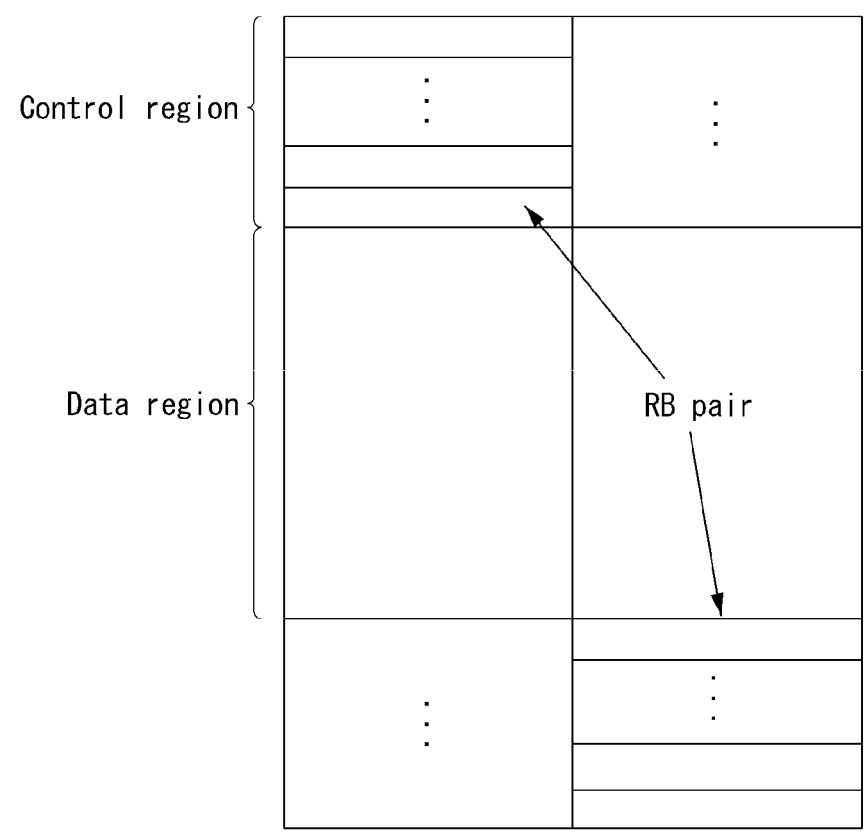

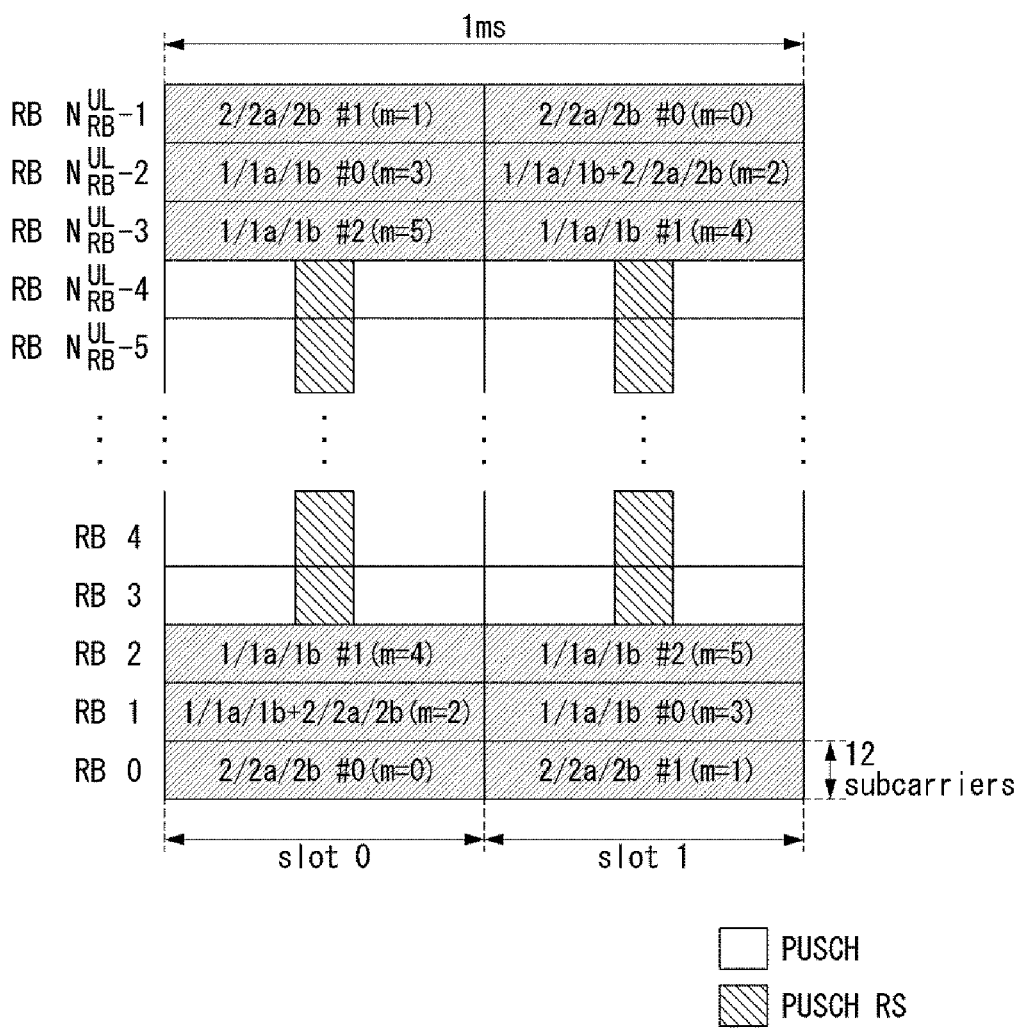
[FIG. 5]

[FIG. 6]
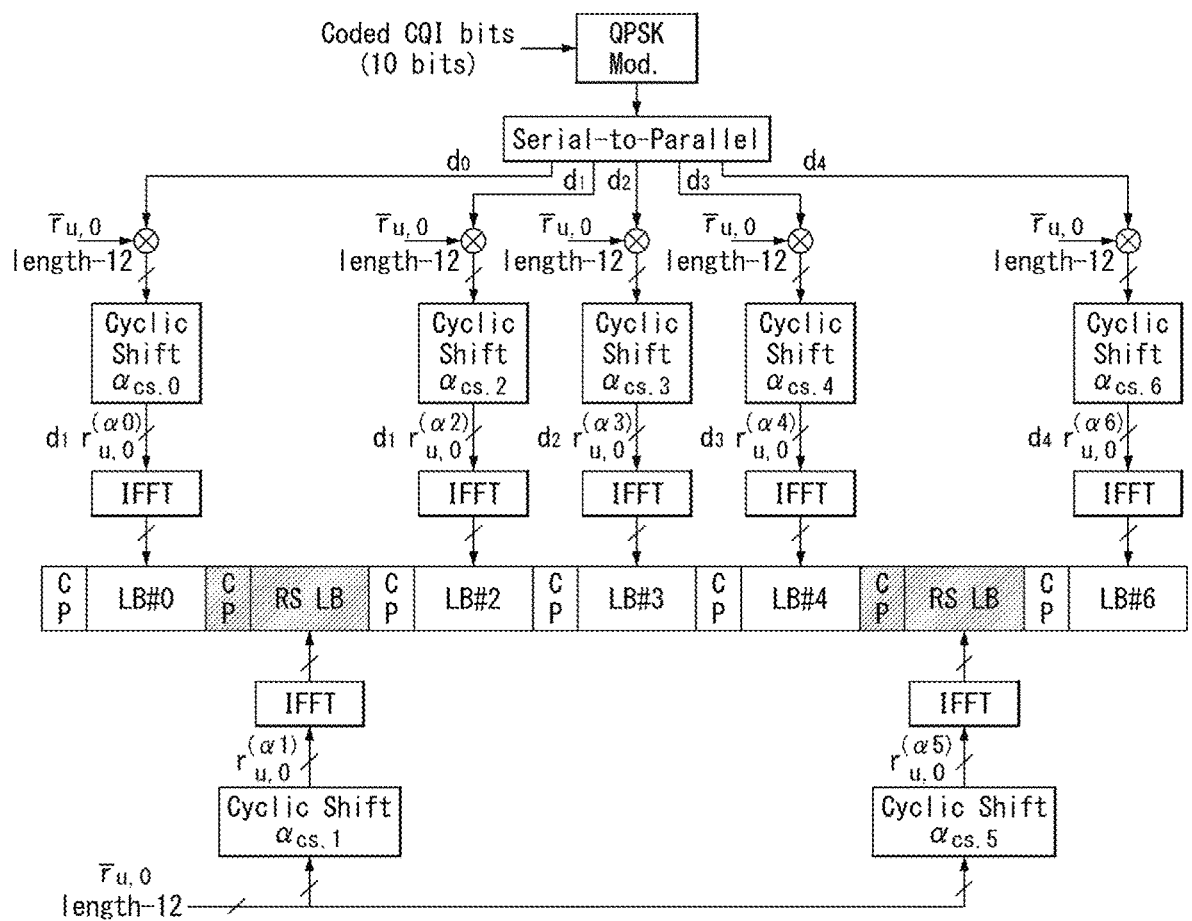

[FIG. 7]
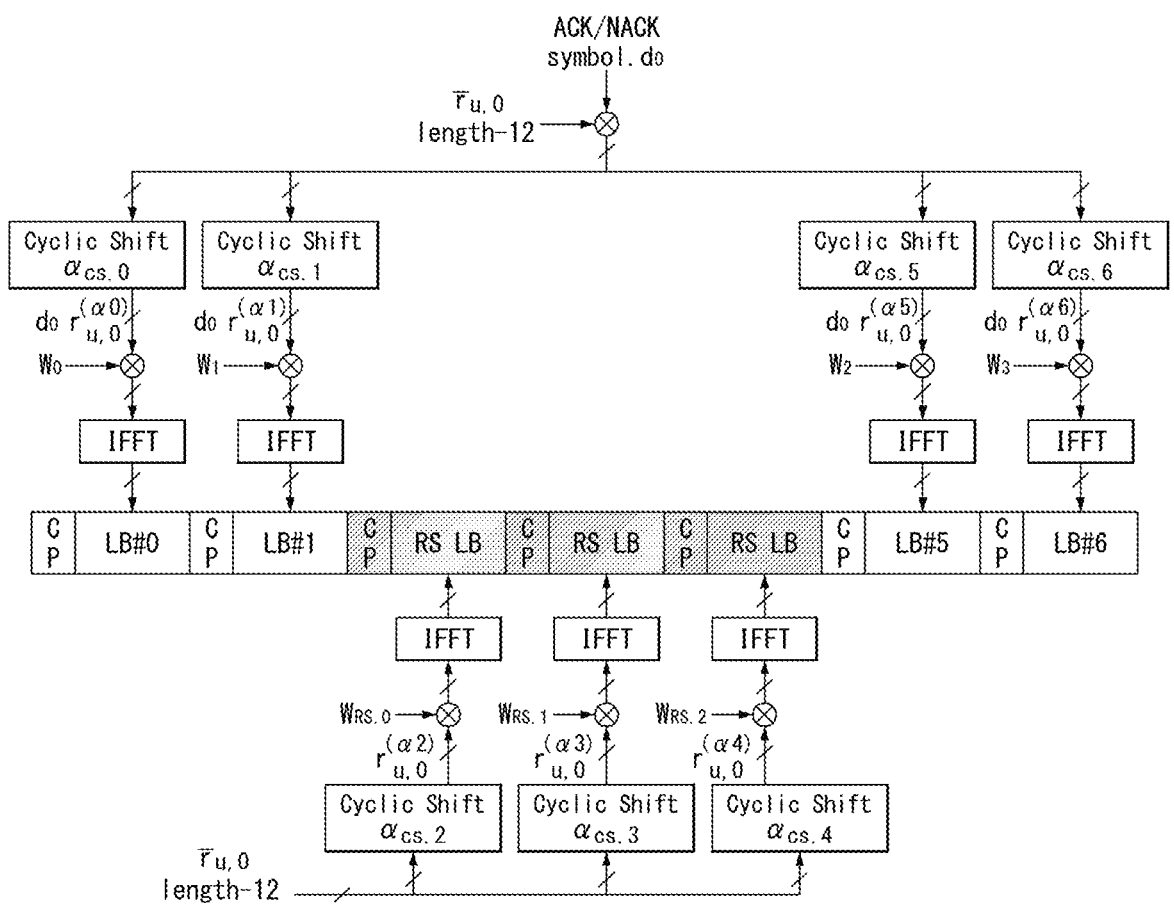

[FIG. 8]
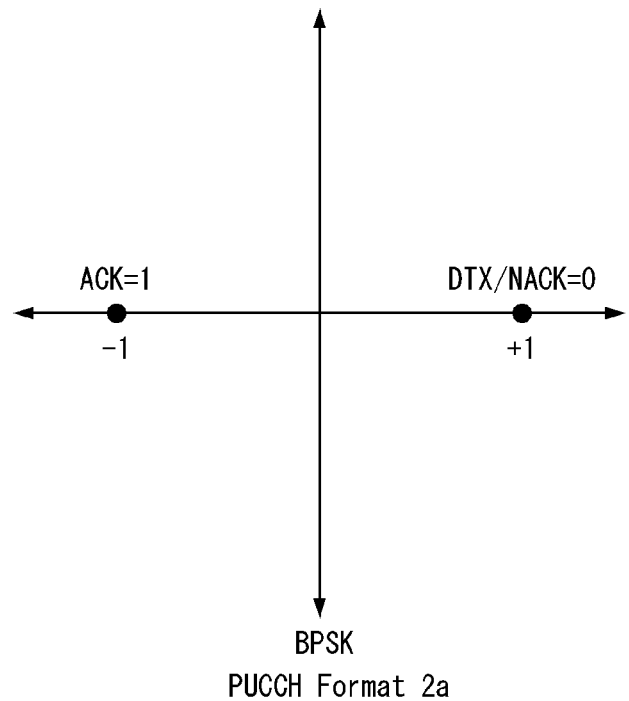
BPSK
PUCCH Format 2a
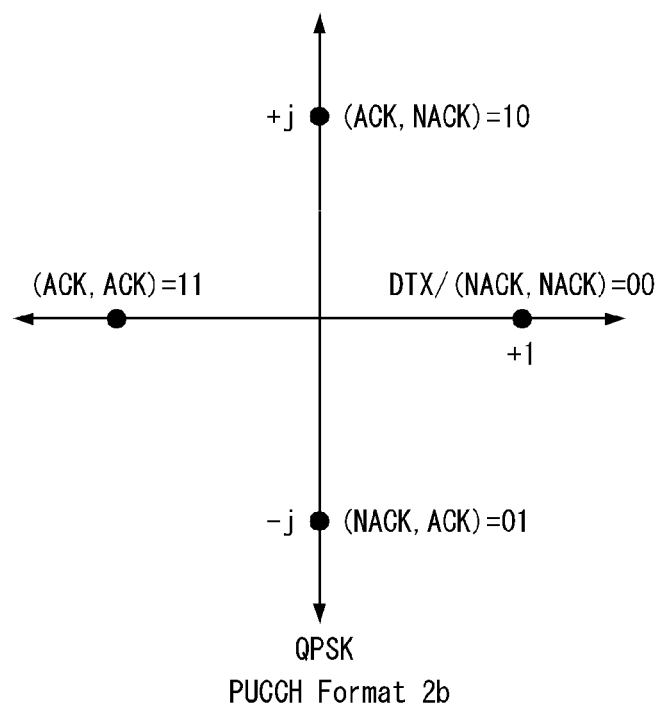
QPSK
PUCCH Format 2b

[FIG. 9]
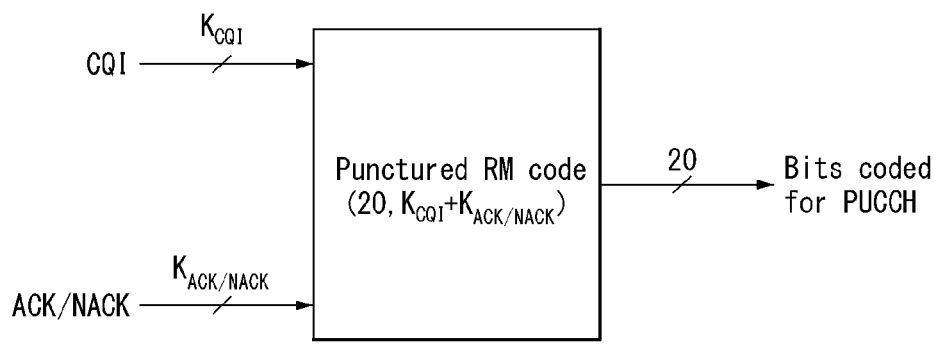
[FIG. 10]
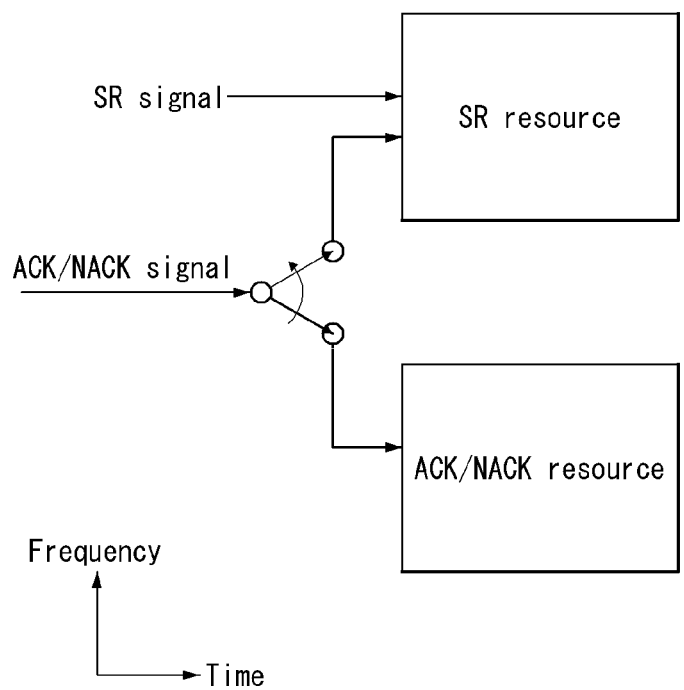

[FIG. 11]
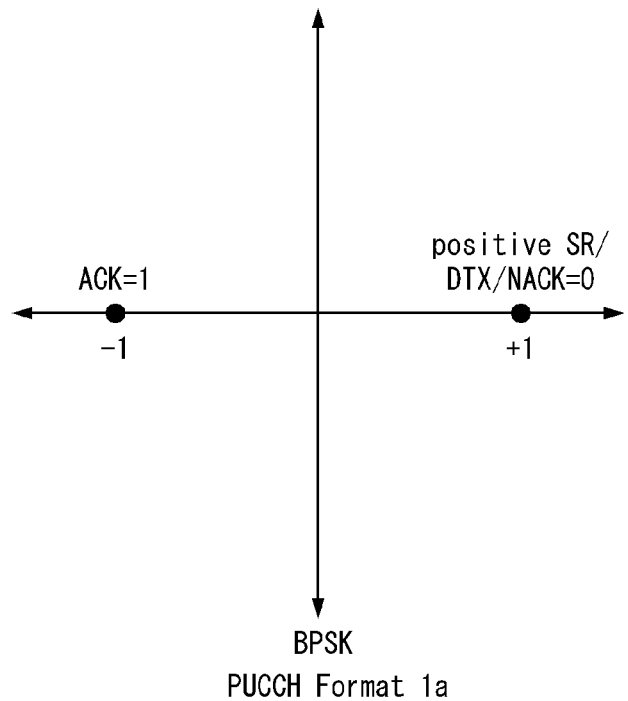
BPSK
PUCCH Format 1a
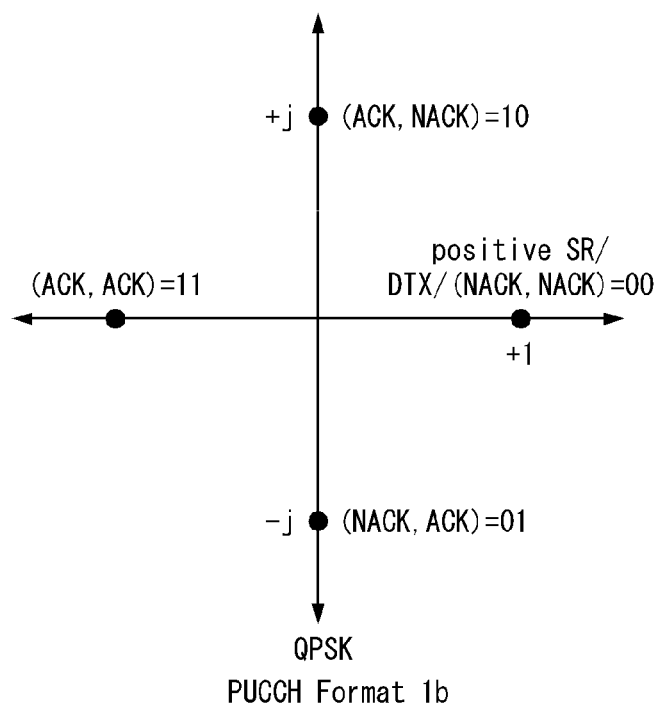
QPSK
PUCCH Format 1b

[FIG. 12]
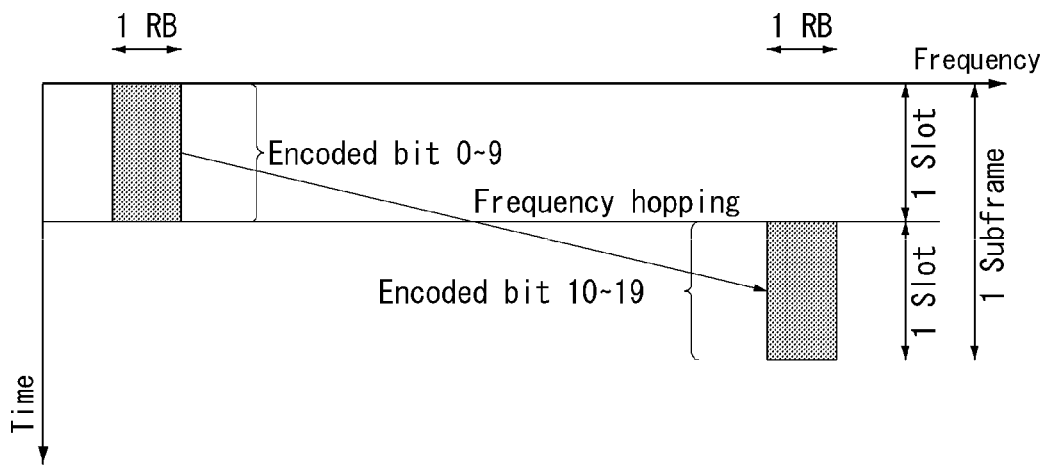
[FIG. 13]
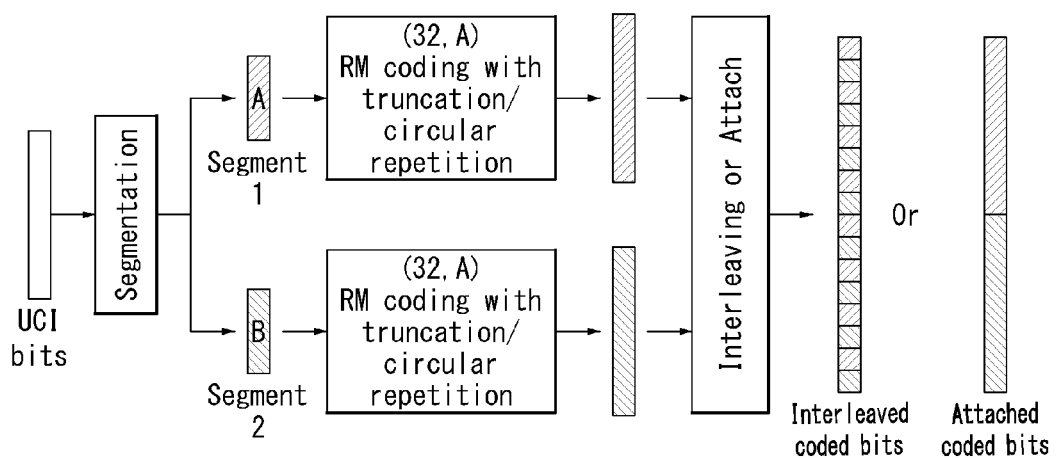

【FIG. 14】
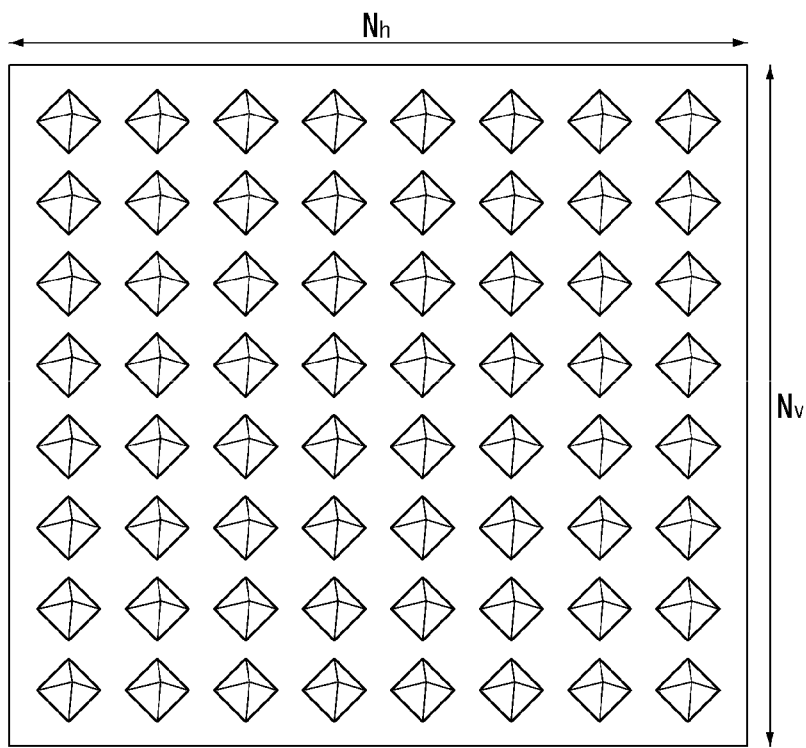
【FIG. 15】
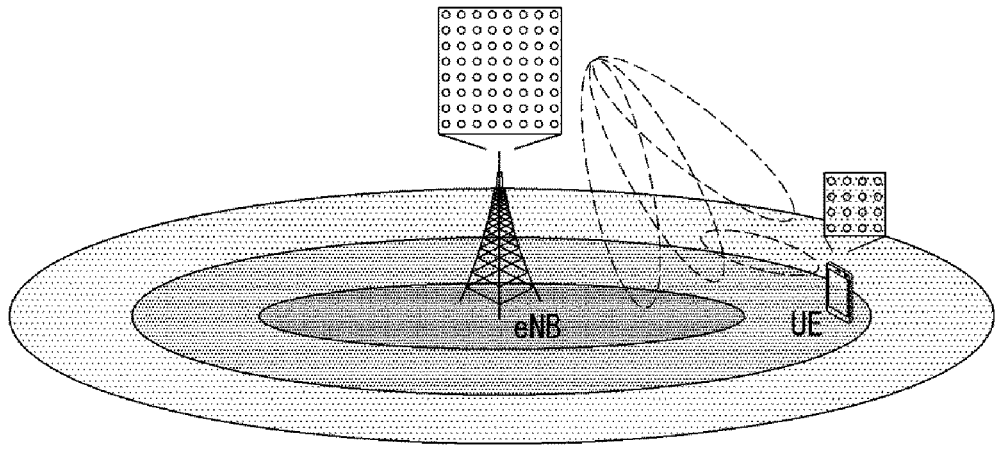

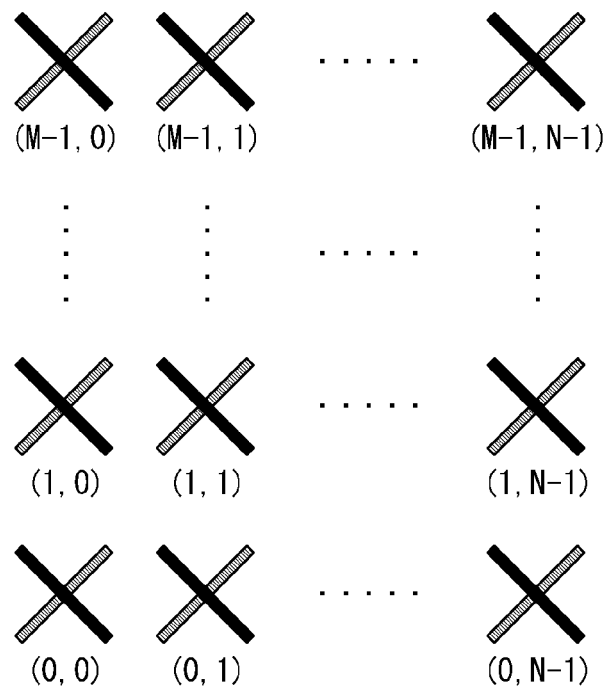
[FIG. 16]

[FIG. 17]
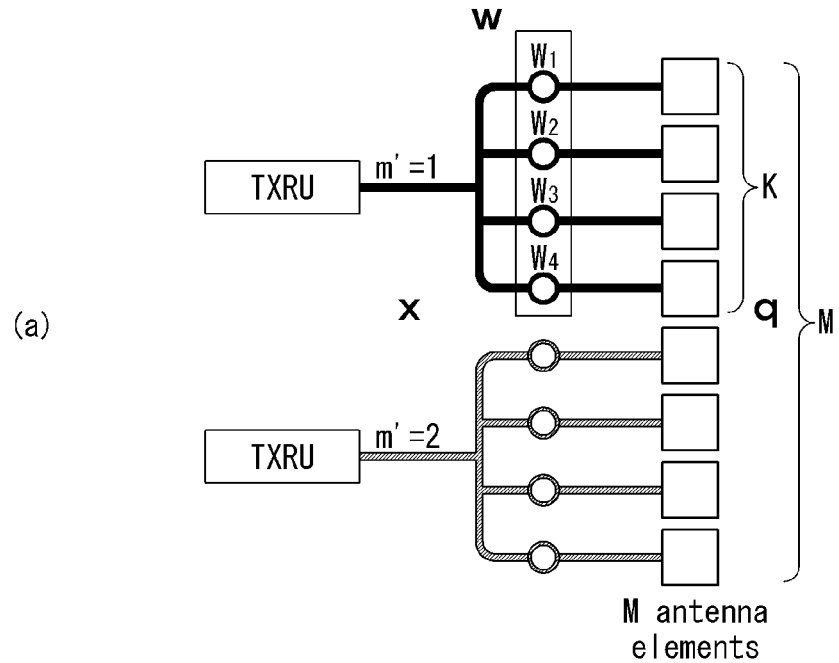
(a)
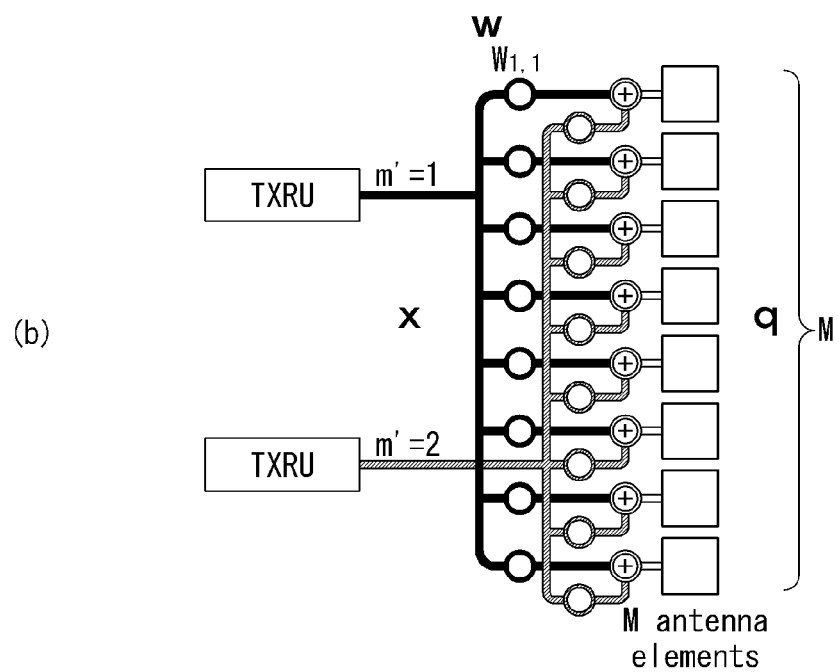
(b)

【FIG. 18】
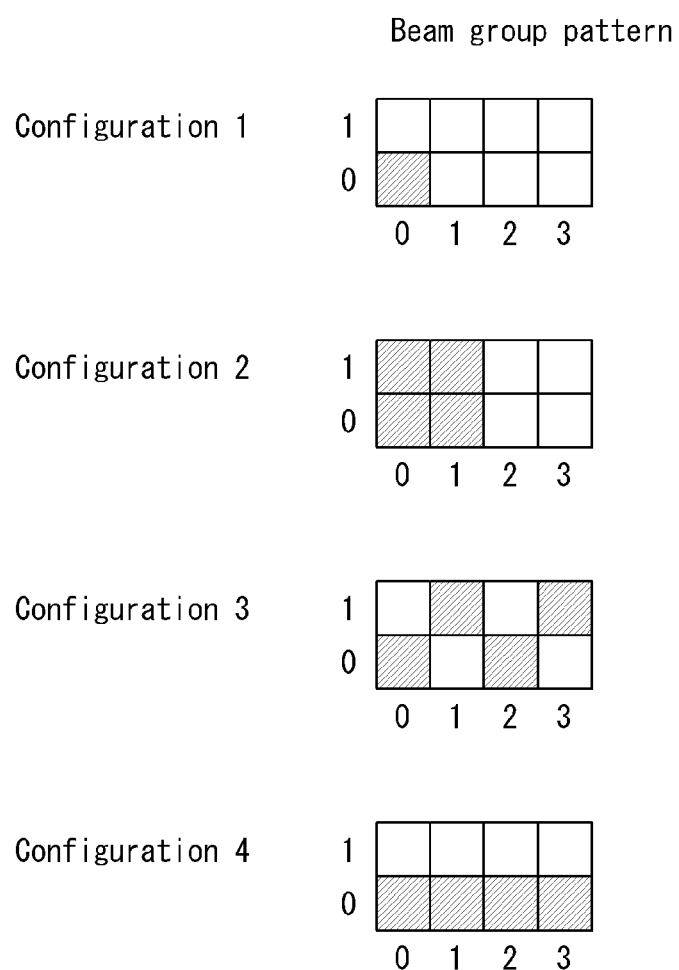

[FIG. 19]
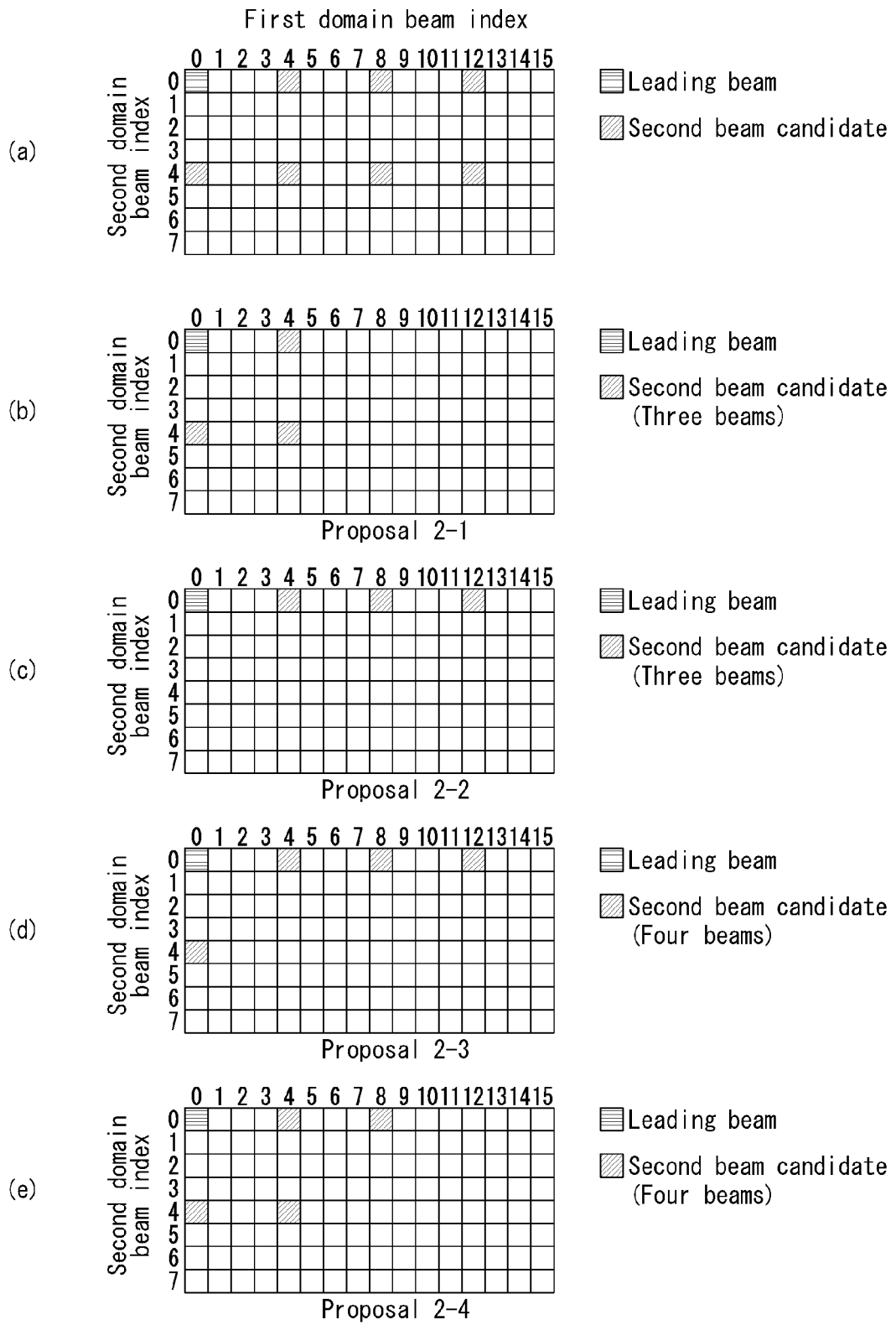

[FIG. 20]
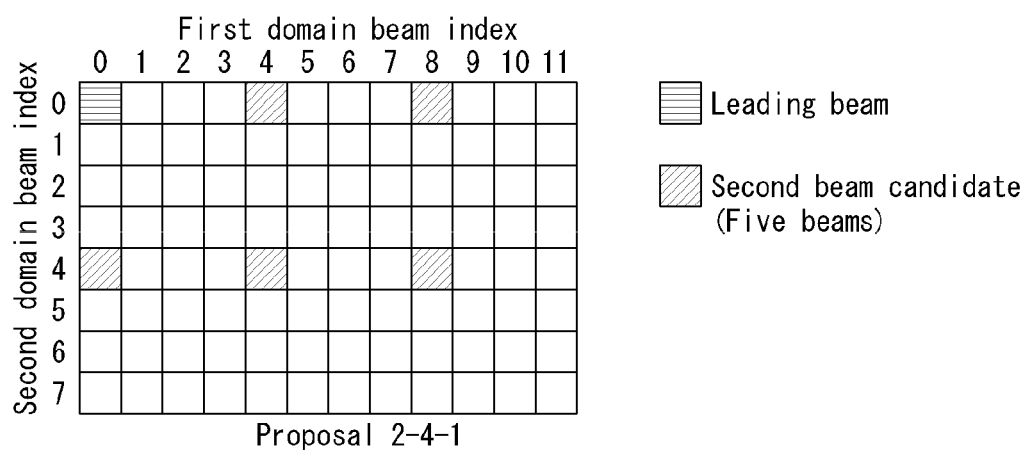

[FIG. 21]
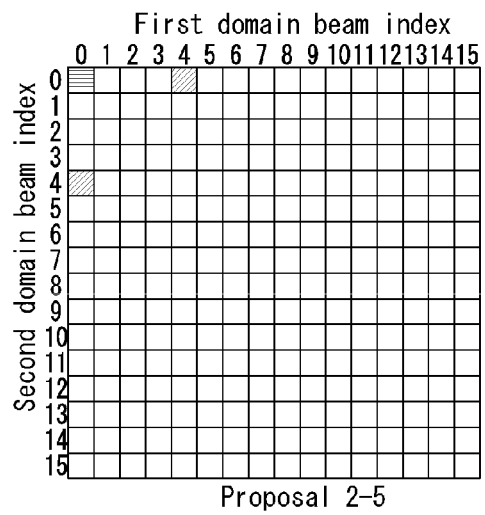
(a) Proposal 2-5
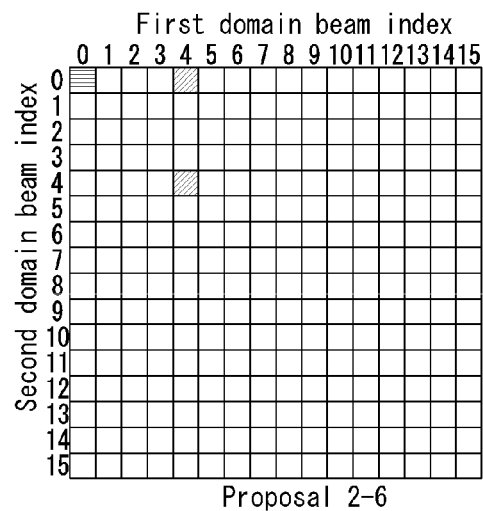
(b) Proposal 2-6
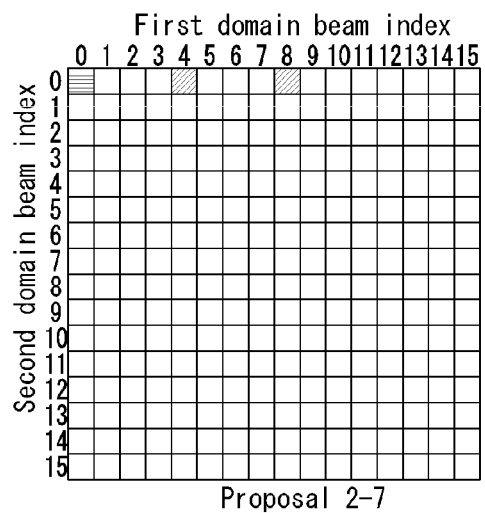
(c) Proposal 2-7
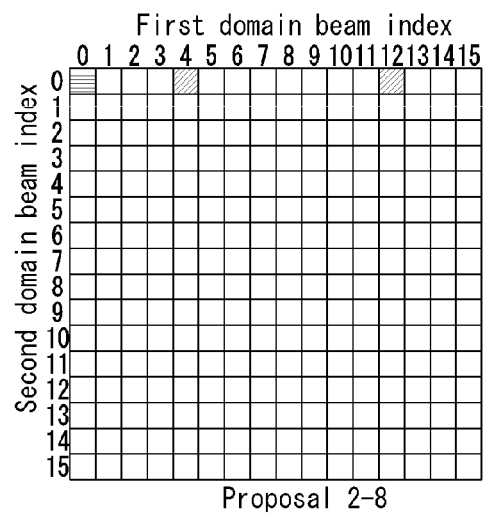
(d) Proposal 2-8

[FIG. 22]
(a) 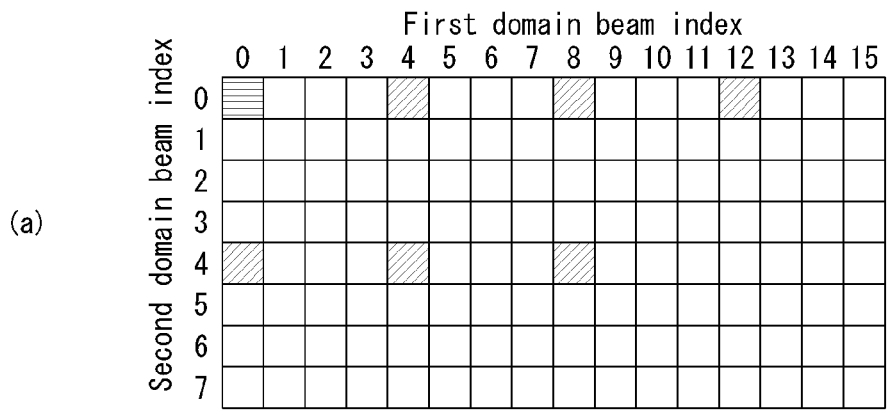
(b) 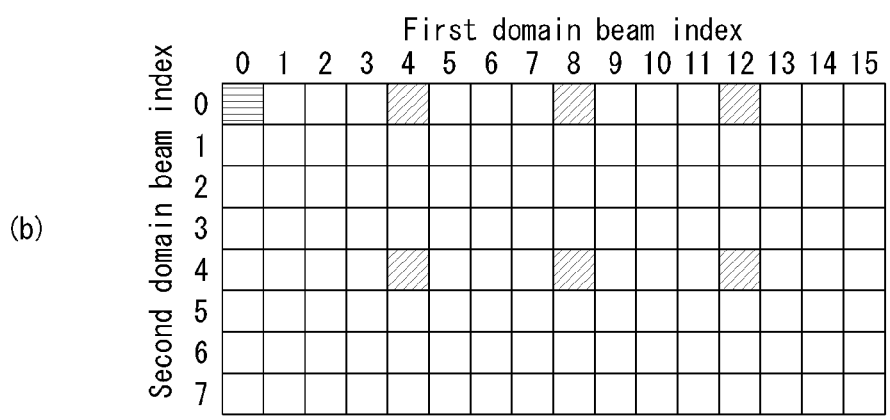

【FIG. 23】
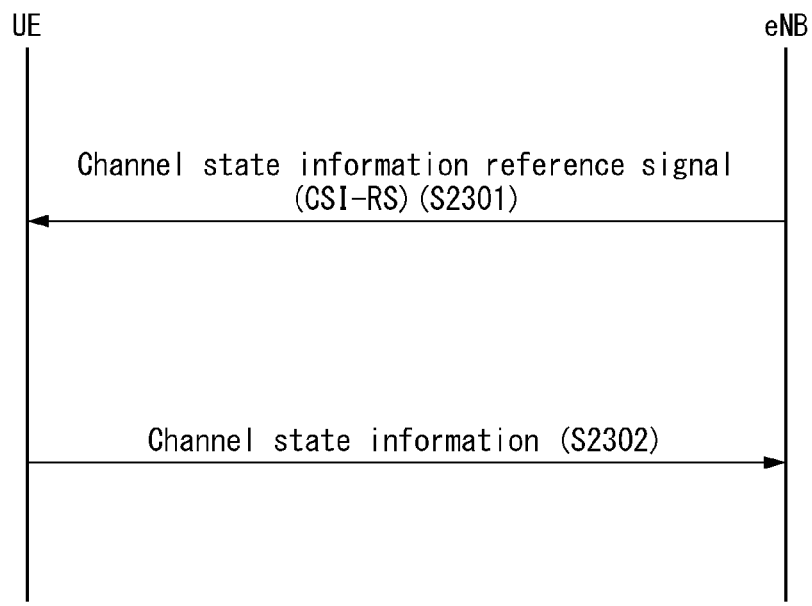
【FIG. 24】
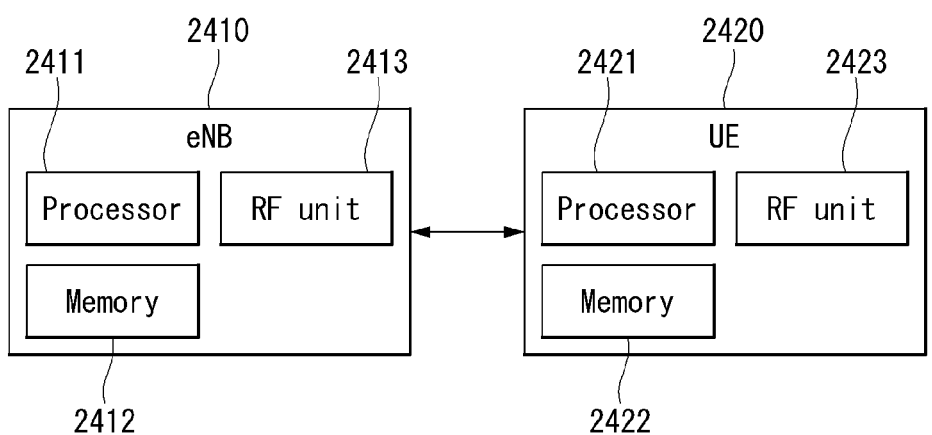

METHOD FOR TRANSMITTING/RECEIVING CHANNEL STATE INFORMATION IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2017/010613, filed on Sep. 26, 2017, which claims the benefit of U.S. Provisional Application No. 62/400,066, filed on Sep. 26, 2016, 62/417,257, filed on Nov. 3, 2016, 62/453,002, filed on Feb. 1, 2017, 62/454,879, filed on Feb. 5, 2017, the contents of which are all hereby incorporated by reference herein in their entirety.

TECHNICAL FIELD

The present invention relates to wireless communications, and more particularly, to a method for transmitting and receiving channel state information in a wireless communication system that supports multiple antenna system (particularly, 2 dimensional active antenna system (2D AAS)) and an apparatus for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for transmitting and receiving channel state information in a wireless communication system that supports multiple antenna system (e.g., 3-dimensional multi-input multi-output (3D-MIMO) system provided with 2D AAS, massive antenna port).

An object of the present invention is to propose a method for configuring a codebook for improving multi-user (MU) performance in a wireless communication system that supports multiple antenna system.

In addition, an object of the present invention is to propose a method for transmitting channel state information for a newly defined codebook by using Physical Uplink Control Channel (PUCCH) which is previously defined.

Technological objects to be achieved by the present invention are not limited to the aforementioned objects, and other objects that have not been described may be clearly understood by a person having ordinary skill in the art to which the present invention pertains from the following description.

Technical Solution

According to an aspect of the present invention, a method for reporting Channel State Information (CSI) performed by a user equipment (UE) in a wireless communication system may include receiving a Channel State Information Reference Signal (CSI-RS) through multiple antenna ports from a base station (BS); and reporting the CSI to the BS, and the CSI may include selection information indicating a plurality of codewords used for generating a precoding matrix in a codebook for reporting the CSI, after a power coefficient and a phase coefficient are applied to each of the plurality of codewords, the precoding matrix may be generated based on a linear combination of the plurality of codewords to which the power coefficient and the phase coefficient are applied, and the selection information and the information indicating the power coefficient may be transmitted in different CSI reporting instances.

According to another aspect of the present invention, a user equipment (UE) for reporting Channel State Information (CSI) in a wireless communication system may include a radio frequency (RF) unit for transmitting and receiving a radio signal; and a processor for controlling the RF unit, wherein the processor is configured to perform: receiving a Channel State Information Reference Signal (CSI-RS) through multiple antenna ports from a base station (BS) through the RF unit; and reporting the CSI to the BS through the RF unit, and the CSI may include selection information indicating a plurality of codewords used for generating a precoding matrix in a codebook for reporting the CSI, after a power coefficient and a phase coefficient are applied to each of the plurality of codewords, the precoding matrix may be generated based on a linear combination of the plurality of codewords to which the power coefficient and the phase coefficient are applied, and the selection information and the information indicating the power coefficient may be transmitted in different CSI reporting instances.

Preferably, the information indicating the power coefficient and the information indicating the phase coefficient may be transmitted in different CSI reporting instances.

Preferably, the CSI may include a rank indication (RI), and the information indicating the power coefficient may be transmitted in a same CSI reporting instance as the RI.

Preferably, the CSI may include a Precoding Matrix Indicator (PMI), and the selection information may be included in a first PMI, and the information indicating the phase coefficient may be included in a second PMI.

Preferably, the second PMI may be subsampled, and transmitted in 4 bits.

Preferably, the subsampling may not be performed when the RI is 1, and may be performed only when the RI is 2.

Preferably, when the RI is 2, the precoding matrix may include a first precoding vector for a first layer and a second precoding vector for a second layer, the first precoding vector may include a vector in which a first codeword and a second codeword are linearly combined for a first polarization and a vector in which a third codeword and a fourth codeword are linearly combined for a second polarization, and the second procoding vector may include a vector in which a fifth codeword and a sixth codeword are linearly combined for a first polarization and a vector in which a seventh codeword and an eighth codeword are linearly combined for a second polarization.

Preferably, phase coefficient values applied to the second codeword, the third codeword, the fourth codeword, the sixth codeword, the seventh codeword and the eighth codeword may be determined by the second PMI.

Preferably, a phase coefficient value applied to the second codeword may be determined by the second PMI within {1, −1, j, −j}.

Preferably, a phase coefficient value applied to the third codeword may be determined by the second PMI within {1, j}.

Preferably, phase coefficient values applied to the fourth codeword and the eighth codeword may be determined based on phase coefficient values applied to the third codeword and the seventh codeword.

Preferably, a phase coefficient value applied to the seventh codeword may be the same as the value of a phase coefficient value applied to the third codeword multiplied by −1.

Preferably, the CSI may be transmitted using Physical Uplink Control Channel (PUCCH) format 2/2a/2b.

Technical Effects

According to an embodiment of the present invention, the performance of MU transmission can be improved in a wireless communication system that supports multiple antenna system.

According to an embodiment of the present invention, more elaborated beam can be generated by reflecting multipath channel more accurately between a user equipment and a base station in a wireless communication system that supports multiple antenna system.

According to an embodiment of the present invention, the feedback overhead of channel state information can be reduced in a wireless communication system that supports multiple antenna system.

According to an embodiment of the present invention, the channel state information can be fed back by using a PUCCH format which is previously defined, without defining a new PUCCH format.

Effects which may be obtained by the present invention are not limited to the aforementioned effects, and other effects that have not been described may be clearly understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 illustrates an example of a type in which PUCCH formats are mapped to a PUCCH region of an uplink physical resource block in the wireless communication system to which the present invention may be applied.

FIG. 6 illustrates a structure of a CQI channel in the case of a normal CP in a wireless communication system to which the present invention may be applied.

FIG. 7 illustrates a structure of an ACK/NACK channel in the case of a normal CP in the wireless communication system to which the present invention may be applied.

FIG. 8 is a diagram illustrating a constellation mapping of HARQ ACK/NACK for a normal CP in the wireless communication system to which the present invention may be applied.

FIG. 9 is a diagram illustrating a joint encoding of HARQ ACK/NACK and CQI for an extended CP in the wireless communication system to which the present invention may be applied.

FIG. 10 illustrates multiplexing of SR and ACK/NACK in a wireless communication system to which the present invention may be applied.

FIG. 11 illustrates a constellation mapping of ACK/NACK and SR for PUCCH format 1/1a/1b in the wireless communication system to which the present invention may be applied.

FIG. 12 is a diagram for describing a resource mapping of an encoded bit according to an embodiment of the present invention.

FIG. 13 illustrates dual Reed-Muller in a wireless communication system to which the present invention may be applied.

FIG. 14 illustrates a 2-dimensional active antenna system having 64 antenna elements in a wireless communication system to which the present invention may be applied.

FIG. 15 illustrates a system in which an eNB or UE has a plurality of transmission/reception antennas capable of forming a 3D beam based on the AAS in a wireless communication system to which the present invention may be applied.

FIG. 16 illustrates a 2D antenna system having cross-polarizations in a wireless communication system to which the present invention may be applied.

FIG. 17 illustrates a transceiver unit model in a wireless communication system to which the present invention may be applied.

FIG. 18 is a diagram illustrating a configuration of codebook in a wireless communication system to which the present invention may be applied.

FIG. 19 is a diagram illustrating a subsampling method for a second beam selection according to an embodiment of the present invention.

FIG. 20 is a diagram illustrating a subsampling method for a second beam selection according to an embodiment of the present invention.

FIG. 21 is a diagram illustrating a subsampling method for a second beam selection according to an embodiment of the present invention.

FIG. 22 is a diagram illustrating subsampling for a second beam selection including 6 beams according to an embodiment of the present invention.

FIG. 23 is a diagram illustrating a method for transmitting and receiving channel state information according to an embodiment of the present invention.

FIG. 24 illustrates a block diagram of a wireless communication device according to an embodiment of the present invention.

BEST MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 illustrates the configuration of the special subframe (DwPTS/GP/UpPTS length).

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Reference Signal (RS)

In a wireless communication system, a signal may be distorted during transmission through a radio channel. In order for a reception end to accurately receive a distorted signal, the distortion of a received signal needs to be corrected using channel information. In order to detect channel information, channel estimation is performed by measuring the degree of the distortion of a signal known to both the transmission side and the reception side when they are transmitted through a channel and received. The aforementioned transmission signal is called a pilot signal or reference signal (RS). When data is transmitted and received using multiple antennas, an RS is transmitted through each transmission antenna, and a channel state between the transmission antenna and the reception antenna should be detected.

In a mobile communication system, an RS may be basically divided into two types depending on its purpose. There are an RS having a purpose of obtaining channel state information (CSI) and an RS used for data demodulation. The former has a purpose of obtaining CIS in the downlink by a UE. Accordingly, a corresponding RS should be transmitted in a wideband, and a UE should be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS should be transmitted in a region in which data is transmitted.

In LTE system, two types of downlink RS are defined for unicast service, which are a Cell-specific RS (CRS) and a UE-specific RS. The UE-specific RS is used only for data demodulation, and the CRS is used for all of the purposes of RRM measurement such as CSI acquisition and handover, and so on, as well as data demodulation. The CRS is transmitted in every subframe for the entire system band, and an RS for maximum four antenna ports is transmitted depending on the number of transmission antennas of an eNB. For example, in the case that there are two transmission antennas in an eNB, CRSs for 0 #and #1 antenna ports are transmitted. In the case that there are four transmission antennas in an eNB, CRSs for #0 to #3 antenna ports are transmitted.

In LTE-A system, maximum eight transmission antennas are supported in downlink of an eNB. When RSs for maximum eight transmission antennas are transmitted in every subframe throughout the entire band in the same way as the CRS of the conventional LTE, the RS overhead becomes excessively greater. Accordingly, in LTE-A system, an RS is divided into a CSI-RS for the purpose of CSI measurement for selecting Modulation and Coding Scheme (MCS), Precoding Matrix Indicator (PMI), and so on and a Demodulation-RS (DM-RS) for data demodulation, and accordingly, two RSs are added. The CSI-RS may also be used for the purpose of RRM measurement, but designed for the main purposed of CSI acquisition. The CSI-RS is not needed to be transmitted in every subframe since the CSI-RS is not used for data demodulation. Accordingly, in order to reduce the CSI-RS overhead, the CSI-RS is transmitted intermittently on a time axis. For data demodulation, the DM-RS is dedicatedly transmitted to a UE which is scheduled in a corresponding time-frequency domain. That is, the DM-RS of a specific UE is transmitted only in a domain in which the corresponding UE is scheduled, that is, the time-frequency domain in which data is received.

Control Signaling on Physical Uplink Control Channel (PUCCH)

The Uplink Control Information (UCI) transmitted through a PUCCH may include Scheduling Request (SR), HARQ ACK/NACK information and downlink channel measurement information as below.

Scheduling Request (SR): This is information used for requesting uplink UL-SCH resource. This is transmitted by using On-off Keying (OOK) scheme.

HARQ ACK/NACK: This is a response signal for downlink data packet on a PDSCH. This represents whether a downlink data packet is successfully received. In response to a single downlink codeword, ACK/NACK 1 bit is transmitted, and in response to two pieces of downlink codeword, ACK/NACK 2 bits are transmitted.

Channel State Information (CSI): This is feedback information for a downlink channel. The CSI may include at least one of Channel Quality Indicator (CQI), Rank Indicator (RI), Precoding Matrix Indicator (PMI) and Precoding Type Indicator (PTI). 20 bits are used for a subframe.

The HARQ ACK/NACK information may be generated according to whether decoding of downlink data packet is successful on a PDSCH. In the conventional wireless communication system, in response to a single downlink codeword transmission, 1 bit is transmitted as ACK/NACK information, and in response to two downlink codeword transmission, 2 bits are transmitted as ACK/NACK information.

The channel measurement information is referred to the feedback information in relation to Multiple Input Multiple Output (MIMO) technique, and may include Channel Quality Indicator (CQI), Precoding Matrix Indicator (PMI) and Rank Indicator (RI). These types of channel measurement information may be commonly called as CQI.

20 bits per subframe may be used for transmitting the CQI.

A PUCCH may be modulated by using Binary Phase Shift Keying (BPSK) and Quadrature Phase Shift Keying (QPSK) techniques. Control information of a plurality of UEs may be transmitted through a PUCCH. In order to distinguish a signal of each UE, Constant Amplitude Zero Autocorrelation (CAZAC) sequence of length 12 is mainly used in the case of performing Code Division Multiplexing (CDM). The CAZAC sequence has characteristics of maintaining a predetermined amplitude in a time domain and a frequency domain, thus having qualities appropriate for increasing coverage by lowering a peak-to-average power ratio (PAPR) or cubic metric (CM) of a UE. In addition, ACK/NACK information regarding transmission of DL data transmitted through a PUCCH is covered using an orthogonal sequence or orthogonal cover (OC).

In addition, the control information transmitted on a PUCCH may be discriminated using cyclically shifted sequences having different cyclic shift (CS) values. The cyclically shifted sequence may be generated by cyclically shifting a base sequence by a specific CS amount. The specific CS amount is indicated by a CS index. The number of available cyclic shifts may be varied depending on delay spreading of a channel. Various types of sequence may be used as a base sequence and the aforementioned CAZAC sequence is an example.

Further, an amount of control information a UE may transmit in a single subframe may be determined according to the number of SC-FDMA symbols (that is, SC-FDMA symbols excluding an SC-FDMA used for transmission of a reference signal (RS) for coherent detection of a PUCCH) which may be used for transmission of control information.

In the 3GPP LTE system, a PUCCH is defined by a total of eight different formats depending on transmitted control information, a modulation scheme, an amount of control information, and the like, and attributes of transmitted uplink control information (UCI) may be summarized according to PUCCH formats as shown in Table 3 below.

TABLE 3

| PUCCH Format | Uplink Control Information (UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

PUCCH format 1 is used for separate transmission of an SR. In the case of separate SR transmission, a non-modulated waveform is applied. This will be described in detail below.

PUCCH format 1a or 1b is used for transmission of HARQ ACK/NACK. In the case where HARQ ACK/NACK is individually transmitted in a certain subframe, PUCCH format 1a or 1b may be used. Alternatively, HARQ ACK/NACK and an SR may be transmitted in the same subframe using PUCCH format 1a or 1b.

PUCCH format 2 is used to transmit a CQI, and the PUCCH format 2a or 2b is used to transmit a CQI and HARQ ACK/NACK. In the case of an extended CP, the PUCCH format 2 may be used to transmit a CQI and HARQ ACK/NACK.

PUCCH format 3 is used for carrying encoded UCI of 48 bits. PUCCH format 3 may carry HARQ ACK/NACK of a plurality of serving cells, SR (if it is existed) and CSI report for a serving cell.

FIG. 5 illustrates an example of a type in which PUCCH formats are mapped to a PUCCH region of an uplink physical resource block in the wireless communication system to which the present invention may be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

1) CQI Transmission on PUCCH Format 2

PUCCH format 2/2a/2b is described. PUCCH format 2/2a/2b is a control channel for transmitting channel measurement feedback (CQI, PMI, and RI).

A reporting period of the channel measurement feedback (hereinafter, collectively expressed as CQI information) and a frequency unit (or, a frequency resolution) to be a target of measurement may be controlled by an eNB. In the time domain, periodic and aperiodic CQI reporting may be supported. PUCCH format 2 may be used for only the periodic reporting and a PUSCH may be used for aperiodic reporting. In the case of the aperiodic reporting, an eNB may instruct the terminal to transmit a scheduling resource loaded with individual CQI reporting for the uplink data transmission.

FIG. 6 illustrates a structure of a CQI channel in the case of a normal CP in a wireless communication system to which the present invention may be applied.

Among SC-FDMA symbols 0 to 6 of a single slot, SC-FDMA symbols 1 and 5 (second and sixth symbols) are used for transmission of a demodulation reference signal (DMRS) and CQI information may be transmitted in the other remaining SC-FDMA symbols. Meanwhile, in the case of an extended CP, one SC-FDMA symbol (SC-FDMA symbol 3) is used for DMRS transmission.

PUCCH formats 2/2a/2b supports modulation based on CAZAC sequence, and a QPSK-modulated symbol is multiplied to a CAZAC sequence having a length of 12. A CS of a sequence is changed between a symbol and a slot. Orthogonal covering is used for a DMRS.

A reference signal (DMRS) is carried in two SC-FDMA symbols spaced apart by a three SC-FDMA symbol interval, among seven SC-FDMA symbols included in one slot, and CQI information is carried in the other remaining five SC-FDMA symbols. Two RSs are used in one slot to support a high speed UE. In addition, each UE is distinguished using a CS sequence. CQI information symbols are modulated in the entire SC-FDMA symbols and transferred, and the SC-FDMA symbols are configured as one sequence. That is, a UE modulates a CQI to each sequence and transmits the same.

10 CQI information bits is channel-coded by (20, k) Reed-Muller (RM) code which is ½ rate punctured and 20 coded bits are generated. A coded bit is scrambled before QPSK constellation mapping (which is similar to the case that PUSH data is scrambled with Gold sequence of a length of 31).

The number of symbols that may be transmitted in one TTI is 10 symbols, and modulation of CQI information is determined to QPSK. In the case of using QPSK mapping for SC-FDMA symbols, a 2-bit CQI value may be carried, and thus, a 10-bit CQI value may be carried in one slot. Accordingly, a maximum of 20-bit CQI value may be carried in one subframe. In order to spread CQI information in a frequency domain, a frequency domain spreading code is used.

As the frequency domain spreading code, a CAZAC sequence having a length of 12 may be used. Each control channel may be distinguished by applying CAZAC sequence having a different cyclic shift value. IFFT is performed on frequency domain-spread CQI information.

12 different UEs may be orthogonally multiplexed on the same PUCCH RB by 12 cyclic shifts which are equally spaced from each other. In the case of a normal CP, a DMRS sequence on SC-FDMA symbols 1 and 5 (on SC-FDMA symbol 3 in the case of an extended CP) is similar to a CQI signal sequence on a frequency domain but the same modulation as that applied to CQI information is not applied.

A UE may be semi-statically set by higher layer signaling to periodically report different CQI, PMI, and RI types on the PUCCH resource indicated by PUCCH resource indices ($n_{PUCCH}^{(1,\tilde{p})}$, $n_{PUCCH}^{(2,\tilde{p})}$, $n_{PUCCH}^{(3,\tilde{p})}$). Here, the PUCCH resource index ($n_{PUCCH}^{(2,\tilde{p})}$) is information indicating a PUCCH region used for PUCCH format 2/2a/2b transmission and a cyclic shift (CS) value to be used.

2) HARQ ACK/NACK Transmission on PUCCH Format 1a/1b

In PUCCH format 1a/1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, . . . , N−1) having a length of N becomes y(0), y(1), y(2), . . . y(N−1). y(0), . . . y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

FIG. 7 illustrates a structure of an ACK/NACK channel in the case of a normal CP in the wireless communication system to which the present invention may be applied.

In FIG. 7, a PUCCH channel structure for transmitting the HARQ ACK/NACK without the CQI is exemplarily illustrated.

A reference signal (RS) is carried on three consecutive SC-FDMA symbols in a middle part among 7 SC-FDMA symbols and the ACK/NACK signal are carried on the remaining 4 SC-FDMA symbols.

Meanwhile, in the case of the extended CP, the RS may be carried on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

In the case of CQI transmission, a cyclic time shift of basic RS sequence of a length of 12 is applied before OFDM modulation (i.e., frequency domain CDM), and a single BPSK/QPSK modulation symbol is transmitted on each SC-FDMA data symbol.

When a control signal is transmitted in an allocated band, 2-dimensional spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different Cyclic Shifts (CSs) are applied to the ZC sequence which is the base sequence, and accordingly, multiplexing of different UEs or different control channels may be applied. The number of CS resources supported in an SC-FDMA symbol for PUCCH RBs for HARQ ACK/NACK transmission is set by a cell-specific higher-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

A plurality of UEs may be multiplexed by a code division multiplexing (CDM) scheme by using the CS resources in the frequency domain and the OC resources in the time domain described above. That is, ACK/NACK information and RSs of a lot of UEs may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of a normal CP, the ACK/NACK information may be transmitted in four symbols and not 4 but 3 orthogonal spreading codes are used for the ACK/NACK information, and this is because the number of RS transmitting symbols is limited to 3 to use only 3 orthogonal spreading codes for the RS.

In the case of the subframe of a normal CP, when 3 symbols are used for transmitting the RS and 4 symbols are used for transmitting the ACK/NACK information in one slot, for example, in the case that 6 CSs in the frequency domain and 3 orthogonal cover (OC) resources may be used, HARQ acknowledgement responses from a total of 18 different UEs may be multiplexed in one PUCCH RB. In the case of the subframe of the extended CP, when 2 symbols are used for transmitting the RS and 4 symbols are used for transmitting the ACK/NACK information in one slot, for example, in the case that 6 CSs in the frequency domain and 2 orthogonal cover (OC) resources may be used, the HARQ acknowledgement responses from a total of 12 different UEs may be multiplexed in one PUCCH RB.

Next, PUCCH format 1 is described. The scheduling request (SR) is transmitted by a scheme in which a UE requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of a normal CP, a sequence having a length of 7 is used and in the case of an extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The UE transmits the HARQ ACK/NACK through a resource allocated for the ACK/NACK in order to transmit a negative SR.

3) Multiplexing CQI and ACK/NACK from UE

A simultaneous transmission of HARQ ACK/NACK and CQI of a UE may be performed by UE-specific higher layer signaling. In the case that the simultaneous transmission is not available, a UE is required to transmit HARQ ACK/NACK on a PUCCH in a subframe which is the same subframe in which CQI report is set. In this case, CQI is dropped and only the HARQ ACK/NACK is transmitted by using PUCCH format 1a/1b. In the subframe in which an eNB scheduler allows a simultaneous transmission of CQI and HARQ ACK/NACK from a UE, the CQI and 1 or 2 bits ACK/NACK information are required to be multiplexed in the same PUCCH RB. As a result, low Cubic Metric (CM) single carrier characteristics of a signal may be maintained. The methods for attaining this are different for a normal CP and an extended CP.

FIG. 8 is a diagram illustrating a constellation mapping of HARQ ACK/NACK for a normal CP in the wireless communication system to which the present invention may be applied.

In the case of a normal CP, in order to transmit 1 or 2 bits HARQ ACK/NACK together with CQI (format 2a/2b), ACK/NACK bit (not scrambled) is modulated in BPSK/QPSK scheme as exemplified in FIG. 8. As a result, a single HARQ ACK/NACK modulation symbol (dHARQ) is generated.

ACK is encoded by binary '1' and NACK is encoded by binary '0'. Next, the single HARQ ACK/NACK modulation symbol (dHARQ) is used for modulating the second RS symbol (SC-FDMA symbol 5) in each CQI slot. That is, ACK/NACK is signaled by using an RS.

As shown in FIG. 8, in the modulation mapping, NACK (or NACK, NACK for two downlink MIMO codewords) is mapped to +1, and as a result, in the case of not ACK nor NACK like the case that a UE fails to detect a downlink grant on a PDCCH (referred to Discontinuous Transmission; DTX), a basic NACK is transmitted. In other words, DTX (no RS modulation) is interpreted as NACK that triggers downlink retransmission by an eNB.

FIG. 9 is a diagram illustrating a joint encoding of HARQ ACK/NACK and CQI for an extended CP in the wireless communication system to which the present invention may be applied.

In the case of an extended CP (including one RS symbol per slot), 1 or 2 bits HARQ ACK/NACK is joint-encoded, and a single RM based block code (20, kCQI+kA/N) is generated. 20 bits codeword is transmitted by using the CQI channel structure of FIG. 6 on a PUCCH.

The joint encoding of ACK/NACK and CQI is performed as shown in FIG. 9.

The maximum number of information bit supported by a block code is 13, and this corresponds to kCQI=11 bit and kA/N=2 bit (for transmitting two codewords in downlink).

4) Multiplexing SR and ACK/NACK from UE

FIG. 10 illustrates multiplexing of SR and ACK/NACK in a wireless communication system to which the present invention may be applied.

Referring to FIG. 10, when SR signal and ACK/NACK signal are generated in the same subframe, a UE transmits ACK/NACK on an allocated SR PUCCH resource in the case of positive SR, or transmits ACK/NACK on an allocated ACK/NACK PUCCH resource in the case of negative SR.

FIG. 11 illustrates a constellation mapping of ACK/NACK and SR for PUCCH format 1/1a/1b in the wireless communication system to which the present invention may be applied.

The constellation mapping for a simultaneous transmission of ACK/NACK and SR is as shown in FIG. 11.

5) HARQ ACK/NACK Transmission for TDD

In the case of Time Division Multiplexing (TDD), a UE may receive PDSCHs during multiple subframes, and accordingly, the UE may feedback HARQ ACK/NACK for multiple PDSCHs to an eNB. There are two types of HARQ ACK/NACK transmissions for TDD as below.

ACK/NACK Bundling

ACK/NACK for multiple data units is combined by logical AND function using ACK/NACK bundling. For example, when a receiver (RX) node decodes all data units successfully, the RX node transmits ACK by using a single ACK/NACK unit. Otherwise, when the RX node is failed to decode (or detect) any one of the data units transmitted to the RX node, the RX node may transmit NACK by using a single ACK/NACK unit or may not transmit both of ACK and NACK.

ACK/NACK Multiplexing

Using ACK/NACK multiplexing, the contents of ACK/NACK response to multiple data units are distinguished into a combination of ACK/NACK unit used for actual ACK/NACK transmission and QPSK modulation symbol (referred to as the contents of transmitted ACK/NACK). For example, assuming that a single ACK/NACK unit carries 2 bits and maximum two data units are transmitted (here, it is assumed that HARQ operation for each data unit is managed by a single ACK/NACK bit), ACK/NACK result may be distinguished in a transmitter (TX) node as represented in Table 4.

Table 4 exemplifies ACK/NACK multiplexing based on a single ACK/NACK unit selection.

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 4, HARQ-ACK(i) indicates ACK/NACK result for data unit i (in this example, maximum two data units, i.e., data unit 0 and data unit 1 are existed). In Table 4, DTX means that there is no data unit transmitted for the corresponding HARQ-ACK(i) or the RX node fails to detect the existence of the data unit corresponding to HARQ-ACK(i). $n_{PUCCH,X}^{(1)}$ indicates ACK/NACK unit used for actual ACK/NACK transmission, and here, maximum two ACK/NACK units, i.e., $n_{PUCCH,0}^{(1)}$ and $n_{PUCCH,1}^{(1)}$ are existed. b(0), b(1) indicates 2 bits that are forwarded by the selected ACK/NACK unit. The modulation symbol transmitted through the ACK/NACK unit is determined according to a bit. For example, in the case that the RX node receives and decodes two data units successfully, the RX node should transmit 2 bits (1, 1) by using ACK/NACK unit $n_{PUCCH,1}^{(1)}$. As another example, in the case that the RX nodes receives two data units, fails to decode (or loses) the first data unit (corresponding to HARQ-ACK(0)) and decodes the second data unit (corresponding to HARQ-ACK(1)) successfully, the RX node should transmit (0, 0) by using $n_{PUCCH,1}^{(1)}$. By the link between actual ACK/NACK contents, ACK/NACK unit selection and a combination of actual bit contents in ACK/NACK transmitted, ACK/NACK transmission is available by using a single ACK/NACK unit for multiple data units. The example described above may be generalized, and extended to ACK/NACK transmission of two or more data units.

In the ACK/NACK multiplexing method, basically, when at least one ACK is existed for all data units, NACK and DTX are combined with NACK/DTX as represented in Table 4. This is because the combination between ACK/NACK unit and QPSK symbol is not sufficient to cover all ACK/NACK hypotheses based on separation of NACK and DTX. On the contrary, in the case that ACK is not existed for all data unit (in other words, either one of NACK or DTX is existed for all data units), a single explicit NACK case is defined like the case that only one of HARQ-ACK(i) is separated from DTX. In this case, the ACK/NACK unit linked to the data unit corresponding to the single explicit NACK may be reserved for transmitting multiple ACK/NACK signals.

Focused on ACK/NACK multiplexing approach, when the number of maximum data units that may be transmitted in an amount of given physical resources becomes greater, the ACK/NACK hypotheses required for ACK/NACK multiplexing for all data units may increase geometrically. When the maximum number of data units and the number of corresponding ACK/NACK units are represented as N and $N_A$, respectively, $2^N$ ACK/NACK hypotheses are required for ACK/NACK multiplexing even in the case that DTX case is excluded. On the other hand, when a single ACK/NACK unit selection is applied as described in the above example, only maximum $4N_A$ ACK/NACK hypotheses are supported. In other words, as the number of data units is increased, a single ACK/NACK unit selection requires relatively large amount of ACK/NACK units, and this increases overhead of control channel resource required for transmitting a signal for multiple ACK/NACK. For example, in the case that maximum five data units (N=5) are available to be transmitted, since the number of required ACK/NACK hypotheses for ACK/NACK multiplexing is $2^N=32$ ($=4N_A$), eight ACK/NACK unit ($N_A=8$) should be usable for ACK/NACK transmission.

Uplink Channel Coding for LTE PUCCH Format 2

In LTE uplink transmission, a specific control channel is encoded by utilizing a linear block code as represented in Table 5 below. Input bits to the linear block code are represented as $a_0, a_1, a_2, \ldots, a_4$, and bits are represented as $b_0, b_1, b_2, \ldots, b_B$ after encoding.

Here, B=20 and $$b_i = \left( \sum_{n=0}^{A-1} (a_n \cdot M_{i,n}) \right) \mod 2$$

(here, i=0, 1, 2, . . . , B−1)

Table 5 illustrates basis sequences for (20, A) code.

TABLE 5

| i | Mi, 0 | Mi, 1 | Mi, 2 | Mi, 3 | Mi, 4 | Mi, 5 | Mi, 6 | Mi, 7 | Mi, 8 | Mi, 9 | Mi, 10 | Mi, 11 | Mi, 12 |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |

TABLE 5-continued

| i | Mi, 0 | Mi, 1 | Mi, 2 | Mi, 3 | Mi, 4 | Mi, 5 | Mi, 6 | Mi, 7 | Mi, 8 | Mi, 9 | Mi, 10 | Mi, 11 | Mi, 12 |
|---|---|---|---|---|---|---|---|---|---|---|---|---|---|
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 0 | 0 | 1 | 1 | 1 | 0 | 1 | 0 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 0 | 1 | 0 | 0 | 0 | 1 | 0 | 1 |
| 15 | 1 | 1 | 0 | 0 | 1 | 1 | 1 | 0 | 1 | 0 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

FIG. 12 is a diagram for describing a resource mapping of an encoded bit according to an embodiment of the present invention.

As shown in FIG. 12, an encoded bit is mapped to code-time-frequency resource. First ten encoded bits are mapped to specific code-time-frequency resources, and the last ten encoded bits are mapped to different code-time-frequency resources. Here, frequency separation between the first ten encoded bits and the last ten encoded bits are great, generally. This is designed for attain frequency diversity for encoded bit.

Uplink Channel Coding in LTE-A

As described above, in LTE-Rel. 8, when UCI is transmitted in PUCCH format 2, CSI of maximum 13 bits is RM-coded of (20, A) represented in Table 5 above. On the other hand, when UCI is transmitted in PUSCH, CQI of maximum 11 bits is RM-coded of (32, A) represented in Table 6 below, and in order to match the code rate to be transmitted to a PUSCH, truncation or circular repetition is performed.

Table 6 exemplifies basis sequences for (32, O) code.

TABLE 6

| i | Mi, 0 | Mi, 1 | Mi, 2 | Mi, 3 | Mi, 4 | Mi, 5 | Mi, 6 | Mi, 7 | Mi, 8 | Mi, 9 | Mi, 10 |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

FIG. 13 illustrates dual Reed-Muller in a wireless communication system to which the present invention may be applied.

In LTE-A, in order to transmit UCI (A/N and SR) bit of maximum 21 bits, PUCCH format 3 is introduced. In a normal CP situation of PUCCH format 3, coded bits of 48 bits may be transmitted.

Accordingly, when the number of UCI bits is 11 or less, the RM coding is used, and circular repetition is used for elongating the coded bit in accordance with the number of coded bits coded in PUCCH format 3.

On the other hand, in the case that the number of UCI bits exceeds 11, since the number of basis sequences of (32, A) RM code of Table 6 above is in short, two coded bits are generated (this is referred to as Dual RM) by using two (32, A) RM coding blocks as shown in FIG. 13. The two coded bits are truncated and interleaved in order to be elongate in accordance with the number of coded bits in PUCCH format 3.

In the case that such UCI of maximum 21 bits is transmitted in a PUSCH, when the number of UCI bits is 11 or less, in the same way of the existing Rel-8, in order to match the code rate transmitted in a PUSCH by using (32, A) RM coding, truncation or circular repetition is performed. On the contrary, in the case that the number of UCI bits exceeds 11, two coded bits are made by using the Dual RM and truncation or circular repetition is performed in order to match these to the code rate to be transmitted in a PUSCH.

In describing bit configuration order for each UCI content in more detail, in the case that use of PUCCH format 3 is set in SR transmission subframe, when SR and A/N are transmitted in PUCCH format 3 or PUSCH, A/N is preferentially disposed, and SR is disposed next to A/N, and thus, UCI bit is configured.

Periodic CSI Reporting

A UE is configured to feedback different CSI components (CQI, PMI, PTI and/or RI) periodically and semi-statically by a higher layer by using the reporting mode determined in Table 7 below.

Table 7 exemplifies CQI and PMI feedback types for PUCCH CSI reporting mode.

TABLE 7

|  |  | PMI feedback type | |
|---|---|---|---|
|  |  | No PMI | Single PMI |
| PUCCH CQI Feedback type | Wideband (wideband CQI) | Mode 1-0 | Mode 1-1 |
|  | UE Selected (subband CQI) | Mode 2-0 | Mode 2-1 |

In each transmission mode, the following reporting modes are supported on a PUCCH.

Transmission mode 1: Mode 1-0, 2-0
Transmission mode 2: Mode 1-0, 2-0
Transmission mode 3: Mode 1-0, 2-0
Transmission mode 4: Mode 1-1, 2-1
Transmission mode 5: Mode 1-1, 2-1
Transmission mode 6: Mode 1-1, 2-1
Transmission mode 7: Mode 1-0, 2-0
Transmission mode 8: Mode 1-1, 2-1, when a UE is configured to transmit PMI/RI; Mode 1-0, 2-0, when a UE is not configured to transmit PMI/RI
Transmission mode 9: Mode 1-1, 2-1, when a UE is configured to transmit PMI/RI and the number of CSI-RS ports exceeds 1; Mode 1-0, 2-0, when a UE is not configured to transmit PMI/RI and the number of CSI-RS ports is 1

Table 8 exemplifies transmission modes.

TABLE 8

| Transmission mode | PDSCH transmission technique corresponding to PDCCH |
|---|---|
| Mode 1 | Single antenna port, port 0 |
| Mode 2 | Transmit diversity |
| Mode 3 | Great delay Cyclic Delay Diversity (CDD) or transmission diversity |
| Mode 4 | Closed-loop spatial multiplexing or transmission diversity |
| Mode 5 | transmission diversity or multi-user MIMO |
| Mode 6 | transmission diversity or closed-loop spatial multiplexing using a single transmission layer |
| Mode 7 | When the number of Physical Broadcast Channel (PBCH) antenna ports is 1, single antenna port, port 1 is used, otherwise, single antenna port, port 5 |
| Mode 8 | When the number of PBCH antenna ports is 1, single antenna port, port 0 is used, otherwise, transmission diversity dual layer transmission, ports 7 and 8 or single antenna port, port 7 or 8 |
| Mode 9 | Non Multicast Broadcast Signal Frequency Network (Non-MBSFN) subframe: When the number of PBCH antenna ports is 1, single antenna port, port 0 is used, otherwise, transmission diversity. MBSFN subframe: single antenna port, port 7, maximum 8 layer transmission, ports 7-14 |

Periodic CSI reporting mode for each serving cell is configured by higher layer signaling. Mode 1-1 is configured by sub mode 1 or sub mode 2 through higher layer signaling that uses parameter "PUCCH_format1-1_CSI_reporting_mode".

In UE-selected subband CQI, CQI reporting in a specific subframe in a specific serving cell represents the channel quality for particular part or a part (parts) of bandwidth of a serving cell which is described as a Bandwidth Part (BP) or BPs. An index is provided to a BP in an order of starting from the lowest frequency which is increased without increasing bandwidth size.

For each serving cell, a system bandwidth given by $N_{RB}^{DL}$ may be divided into N subbands. Here, the subband of $\lfloor N_{RB}^{DL}/k \rfloor$ number has size k. In the case that $\lceil N_{RB}^{DL}/k \rceil - \lfloor N_{RB}^{DL}/k \rfloor > 0$, a size of one of subbands is $N_{RB}^{DL} - k \cdot \lfloor N_{RB}^{DL}/k \rfloor$.

BP 'j' is frequency-consecutive, and includes $N_j$ subband. BP 'J' may be determined throughout subband set (S) given in Table 9 below or $N_{RB}^{DL}$. When J=1, $N_j$ is $\lceil N_{RB}^{DL}/k/J \rceil$. When J>1, $N_j$ is $N_{RB}^{DL}$, $\lceil N_{RB}^{DL}/k/J \rceil$ or $\lceil N_{RB}^{DL}/k/J \rceil - 1$ depending on k and J.

Each BP(j) (0≤j≤J−1) is scanned by a consecutive order according to increasing frequency. In UE selected single subband feedback, a single subband is selected among $N_j$ subbands together with L bit label indexed in an increasing order of frequency. Here, L=$\lceil \log_2 \lceil N_{RB}^{DL}/k/J \rceil \rceil$.

Table 9 exemplifies subband size (k), bandwidth parts ('J'), and downlink system bandwidth.

TABLE 9

| System bandwidth $N_{RB}^{DL}$ | Subband size k (RBs) | Bandwidth parts (J) |
| --- | --- | --- |
| 6-7 | NA | NA |
| 8-10 | 4 | 1 |
| 11-26 | 4 | 2 |
| 27-63 | 6 | 3 |
| 64-110 | 8 | 4 |

The following CQI/PMI and RI reporting type support PUCCH CSI reporting modes with respective distinguished periods and offsets.

Type 1 reporting supports CQI feedback for UE-selected subband.

Type 1a reporting supports subband CQI and W2 (i.e., a second PMI) feedback.

Type 2, type 2b and type 2c reporting support wideband CQI and PMI feedback.

Type 2a reporting supports wideband PMI feedback.

Type 3 reporting supports RI feedback.

Type 4 reporting supports wideband CQI.

Type 5 reporting supports RI and wideband PMI feedback.

Type 6 reporting supports RI and PTI feedback.

Type 7 reporting supports CSI-RS Resource Indicator (CRI) and RI feedback.

Type 8 reporting supports CRI, RI and wideband PMI feedback.

Type 9 reporting supports CRI, RI and PTI feedback.

Type 10 reporting supports CRI feedback.

In each serving cell, periodicity $N_{pd}$ for CQI/PMI reporting (in subframes) and offset $N_{OFFSET,CQI}$ (in subframes) are determined based on parameter 'cqi-pmi-ConfigIndex' ($I_{CQI/PMI}$). The periodicity $M_{RI}$ for RI reporting and relative offset $N_{OFFSET,RI}$ is determined based on parameter 'ri-ConfigIndex' ($I_{RI}$). Both of 'cqi-pmi-ConfigIndex' and 'ri-ConfigIndex' are configured by higher layer signaling. A value of the relative reporting offset $N_{OFFSET,RI}$ for RI is determined from set $\{0, -1, \ldots, -(N_{pd}-1)\}$. When a UE is configured to report in a single CSI subframe set or more, each of parameters 'cqi-pmi-ConfigIndex' and 'ri-ConfigIndex' corresponds to relative reporting offset for CQI/PMI and RI periodicity and frame set 1, and each of parameters 'cqi-pmi-ConfigIndex2' and 'ri-ConfigIndex2' corresponds to relative reporting offset for CQI/PMI and RI periodicity and frame set 2.

First, only wideband CQI/PMI reporting is configured, the subframe in which wideband CQI/PMI reporting is transmitted is determined by Equation 1 below.

$$(10 \times n_f + \lfloor n_s/2 \rfloor - N_{OFFSET,CQI}) \bmod (N_{pd}) = 0 \quad \text{[Equation 1]}$$

In Equation 1, $n_f$ represents a system frame number, and $n_s$ represents a slot number in a radio frame.

When RI reporting is configured, reporting interval of the RI reporting is a multiple of $M_{RI}$ integer of $N_{pd}$, and subframe in which RI reporting is transmitted is determined by Equation 2 below.

$$(10 \times n_f + \lfloor n_s/2 \rfloor - N_{OFFSET,CQI} - N_{OFFSET,RI}) \bmod (N_{pd} \cdot M_{RI}) = 0 \quad \text{[Equation 2]}$$

In Equation 2, relative offset $N_{OFFSET,RI}$ for RI reporting and period $M_{RI}$ are determined by higher layer signaling.

In the case that both of the wideband CQI/PMI reporting and the subband CQI reporting are configured, the subframe in which the wideband CQI/PMI reporting and the subband CQI reporting are transmitted is determined as represented in Equation 3 below.

$$(10 \times n_f + \lfloor n_s/2 \rfloor - N_{OFFSET,CQI}) \bmod N_{pd} = 0 \quad \text{[Equation 3]}$$

In the case that PTI is not transmitted (since it is not configured) or when PTI which is the most recently transmitted is 1, the period of the wideband CQI/wideband PMI reporting (or wideband CQI/wideband a first PMI reporting for transmission mode 9) is $H \cdot N_{pd}$, and the transmitted subframe is determined as represented in Equation 4 below.

$$(10 \times n_f + \lfloor n_s/2 \rfloor - N_{OFFSET,CQI}) \bmod (H \cdot N_{pd}) = 0 \quad \text{[Equation 4]}$$

Herein, H satisfies the relation $H=J*K+1$, and J represents the number of BPs.

Between two consecutive wideband CQI/wideband PMI (or wideband CQI/wideband a first PMI reporting for transmission mode 9) reports, the remaining J*K reporting instance is used for consecutive subband CQI reporting on K entire cycles of BPs. However, in the case that an interval between two consecutive wideband CQI/wideband PMI reports is smaller than the J*K reporting instance owing to system frame number transition to 0, between two consecutive wideband CQI/wideband PMI (or wideband CQI/wideband a first PMI reporting for transmission mode 9) reports, a UE does not transmit the remaining subband CQI reporting which was not transmitted before the second time. The entire cycle of each BP is started from 0 and increases up to BP J−1. Parameter K is configured by higher layer signaling.

When PTI which is the most recently transmitted is 1, the wideband first PMI reporting has period $H' \cdot N_{pd}$, and the reporting subframe is determined as represented in Equation 5 below.

$$(10 \times n_f + \lfloor n_s/2 \rfloor - N_{OFFSET,CQI}) \bmod (H' \cdot N_{pd}) = 0 \quad \text{[Equation 5]}$$

Here, H' is signaled by a higher layer.

Between every two consecutive wideband first PMI reports, the remaining reporting instance is used for wideband second PMI together with wideband CQI as described below.

When RI reporting is configured, the reporting interval of the RI is $M_{RI}$ multiple of wideband CQI/PMI period $H \cdot N_{pd}$, and the RI is reported on the same PUCCH cyclic shift resource as all of the wideband CQI/PMI and subband CQI reports.

The subframe in which the RI is reported is determined as represented in Equation 6 below.

$$(10 \times n_f + \lfloor n_s/2 \rfloor - N_{OFFSET,CQI} - N_{OFFSET,RI}) \bmod (H \cdot N_{pd} \cdot M_{RI}) = 0 \quad \text{[Equation 6]}$$

In the case that the CSI reporting of CSI type 3, 5 or 6 of a serving cell collides with the CSI reporting of CSI type 1, 1a, 2, 2a, 2b, 2c or 4 of the same serving cell, the CSI reporting of CSI type 1, 1a, 2, 2a, 2b, 2c or 4 has lower priority, and thus dropped.

When one or more serving cells are configured for a UE, the UE transmits CSI reporting of only one serving cell in a given subframe. In the case that the CSI reporting of CSI type 3, 5, 6 or 2a of a serving cell collides with the CSI reporting of CSI type 1, 1a, 2, 2b, 2c or 4 of another serving cell, the CSI reporting of CSI type 1, 1a, 2, 2b, 2c or 4 has lower priority, and thus dropped. In addition, in a given subframe, in the case that the CSI reporting of CSI type 2, 2b, 2c or 4 of a serving cell collides with the CSI reporting of CSI type 1 or 1a of another serving cell, the CSI reporting of CSI type 1 or 1a has lower priority, and thus dropped.

In a given subframe, a collision occurs between CSI reports of different serving cells of the CSI type that has the same priority, the CSI of a serving call that has the lowest ServCellIndex is reported, and the CSI of all of other serving cells are dropped.

Aperiodic CSI Reporting

Aperiodic CSI reporting includes a control signal (aperiodic CQI request) that requests to transmit CQI through PUSCH scheduling control signal (UL grant) transmitted in PDCCH.

Table 10 represents modes when CQI/PMI/RI is transmitted through a PUSCH.

TABLE 10

|  |  | PMI feedback type | | |
| --- | --- | --- | --- | --- |
|  |  | No PMI | Single PMI | Multiple PMI |
| PUSCH CQI feedback type | Wideband (wideband CQI) |  |  | Mode 1-2 |
|  | UE Selected (subband CQI) | Mode 2-0 |  | Mode 2-2 |
|  | Higher Layer-configured (subband CQI) | Mode 3-0 | Mode 3-1 |  |

The transmission modes of Table 10 are selected by a higher layer and all of CQI/PMI/RI are transmitted in the same PUSCH subframe.

1-1) Mode 1-2

Under the assumption that data is transmitted through subband only for each subband, a precoding matrix is selected.

A UE generates CQI for the entire band (set S) designated by system bandwidth or a higher layer by assuming the precoding matrix selected above.

The UE transmits CQI and PMI value of each band. At this time, a size of each subband may be changed depending on a size of system bandwidth.

1-2) Mode 2-0

A UE selects M preferred subbands for a band (set S) designated by system bandwidth or a higher layer.

The UE generates a CQI value by assuming that data is transmitted for the selected M subbands.

The UE generates a CQI (wideband CQI) value for system bandwidth or set S additionally.

In the case that there is a plurality of codewords for the selected M subbands, the CQI value for each codeword is defined as differential format.

Differential CQI=index that corresponds to CQI value for the selected *M* subbands–wideband CQI index The UE transmits information of a position of the selected M subbands, a CQI value for the selected M subbands, and CQI value generated for the entire band or set S. At this time, subband size and M value may be changed according to a size of system bandwidth.

1-3) Mode 2-2

Under the assumption that data is transmitted through M preferred subbands, a UE selects a position of the M preferred subbands a single precoding matrix for the M preferred subbands simultaneously.

The CQI value for the M preferred subbands is defined for each codeword.

The UE generates wideband CQI value for system bandwidth or set S additionally.

The UE transmits information of a position of the selected M subbands, a CQI value for the selected M subbands, a single precoding matrix for the M preferred subbands, wideband precoding matrix index, and wideband CQI value. At this time, subband size and M value may be changed according to a size of system bandwidth.

1-4) Mode 3-0

A UE generates wideband CQI value.

The UE generates CQI value for each subband under the assumption that data is transmitted through each subband. At this time, even in the case that RI>1, the CQI value indicates only the CQI value for the first codeword.

1-5) Mode 3-1

A UE generates a single precoding matrix for system bandwidth or set S.

The UE generates subband CQI for each codeword by assuming the single precoding matrix generated above for each subband.

The UE generates wideband CQI by assuming the single precoding matrix.

The CQI value of each subband is represented as differential format.

Subband CQI=subband CQI index–wideband CQI index

Here, subband size may be changed according to a size of system bandwidth.

PUCCH Format 3

According to LTE-A standard, PUCCH format 3 is used for ACK/NACK feedback use for DL data by a UE. According to LTE standard, a UE was able to transmit maximum 2 bits ACK/NACK information to an eNB through PUCCH format 1a/1b. However, while TDD system and Carrier Aggregation (CA) environment are constructed, overhead of ACK/NACK information is increased, and PUCCH format 3 of greater capacity is introduced in order to solve the increased overhead.

For example, in TDD system, since UL/DL subframe ratio is asymmetric as 1:4 in UL/DL configuration 2 (refer to Table 1 above), a UE should report ACK/NACK information that corresponds one UL subframe and four DL subframes. In addition, in the case that CA for n component carriers (CCs) is applied, a UE should report ACK/NACK information that corresponds to maximum 4n DL subframes in a single UL subframe. That is, in the case of 5 CC CA, a UE should report ACK/NACK information that corresponds to 20 DL subframes.

Even in the case that a UE perform spatial bundling of ACK/NACK information for two codewords transmitted simultaneously in a subframe and reports by compressing 2-bit information to 1-bit, when 5 CC CA is applied in UL/DL configuration as exemplified above, maximum 20 bits ACK/NACK information should be reported through a single UL subframe. As a result, in LTE-A, PUCCH format 3 of maximum 22 bits capacity is defined, and an eNB may notify use of PUCCH format 3 to a UE through an RRC configuration.

In the case that the CSI feedback periodically transmitted in PUCCH format 2 collides with ACK/NACK information reporting of PUCCH format 3 in a UL subframe, operates as follows according to current LTE-A standard. In the case that in the entire 22 bits capacity of PUCCH 3, the spare capacity of PUCCH 3 except ACK/NACK payload (in the case that SR information is existed, payload size 1 bit of the SR information is also added and calculated) is CSI payload size or greater, the ACK/NACK and the CSI are transmitted through PUCCH 3. Otherwise, the CSI is not transmitted (i.e., CSI is dropped) but only ACK/NACK is transmitted.

Definition of Precoding Matrix Indicator (PMI)

In transmission modes 4, 5 and 6, precoding feedback is used for channel dependent codebook based precoding and dependent upon UE(s) that reports PMI. In transmission mode 8, a UE reports the PMI. In transmission modes 9 and 10, PMI/RI reporting is configured, and when CSI-RS port is greater than 1, a UE reports the PMI. A UE reports the PMI based on feedback mode. In other transmission modes, the PMI reporting is not supported.

In the case of two antenna ports, each PMI value corresponds to codebook index represented in Table 11 below.

In the case that two antenna ports are {0, 1} or {15, 16}, and the related RI value is 1, the PMI value corresponds to codebook index n when $\upsilon=1$ in Table 11 below (n∈{0, 1, 2, 3}).

In the case that two antenna ports are {0, 1} or {15, 16}, and the related RI value is 2, the PMI value corresponds to codebook index n+1 when $\upsilon=2$ in Table 11 below (n∈{0, 1}).

Table 11 exemplifies a codebook for a transmission on antenna port {0, 1} and CSI reporting based on antenna port {0, 1} or {15, 16}.

TABLE 11

| Codebook index | Number of layers ($\upsilon$) | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |

TABLE 11-continued

| Codebook index | Number of layers ($\upsilon$) | |
|---|---|---|
| | 1 | 2 |
| 3 | $\frac{1}{\sqrt{2}}\begin{bmatrix}1\\-j\end{bmatrix}$ | — |

In the case that four antenna ports are {0, 1, 2, 3} or {15, 16, 17, 18}, each PMI value corresponds to the codebook index provided in Table 12 below or corresponds to a pair of codebook indexes provided in Tables 13 to 16 below.

PMI value may correspond to codebook index n provided in Table 12 below for the associated RI value and the same $\upsilon$ (n∈{0, 1, ..., 15}).

Alternatively, each PMI value may correspond to a pair of codebook indexes provided in Tables 13 to 16 below. Here, in Table 13 and Table 16, $\varphi_n$, $\varphi'_n$ and $v'_m$ are as represented in Equation 7 below.

$\varphi_n = e^{j\pi n/2}$ $\varphi'_n = e^{j2\pi n/32}$ $v'_m = [1\ e^{j2\pi n/32}]^T$     [Equation 7]

A first PMI value $i_1 \in \{0, 1, \ldots, f(\upsilon)-1\}$ and a second PMI value $i_2 \in \{0, 1, \ldots, g(\upsilon)-1\}$ correspond to codebook indexes $i_1$ and $i_2$ provided in Table j for associated RI value and the same $\upsilon$, respectively. Herein, when $\upsilon=\{1, 2, 3, 4\}$, $f(\upsilon)=\{16, 16, 1, 1\}$ and $g(\upsilon)=\{16, 16, 16, 16\}$, j corresponds to 8, 9, 10 and 11, respectively.

In Table 15 and Table 16, $W_n^{\{s\}}$ represents a matrix defined by columns provided by set $\{s\}$ $W_n = I - 2u_n u_n^H / u_n^H u_n$. Herein, I is a 4×4 unit matrix, and vector $u_n$ is determined in Table 7. And, $n = i_2$.

In some cases, codebook subsampling is supported.

Table 12 exemplifies a codebook for a transmission on antenna ports {0, 1, 2, 3} and CSI reporting based on antenna ports {0, 1, 2, 3} or {15, 16, 17, 18}.

TABLE 12

| Codebook $u_n$ | | Numbers of layers ($\upsilon$) | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (-1+j)/\sqrt{2}\ -j\ (1+j)/\sqrt{2}]$ | $W_6^{\{1\}}$ | $W_6^{\{13\}}/\sqrt{2}$ | $W_6^{\{134\}}/\sqrt{3}$ | $W_6^{\{1234\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Table 13 exemplifies a codebook for 1 layer CSI reporting using antenna ports 0 to 3 or 15 to 18.

TABLE 13

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ |

$$W_{m,n}^{(1)} = \frac{1}{2}\begin{bmatrix} v'_m \\ \varphi_n v'_m \end{bmatrix}$$

Table 14 exemplifies a codebook for 2 layer CSI reporting using antenna ports 0 to 3 or 15 to 18.

TABLE 14

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | $i_2$ | | | |
|---|---|---|---|---|
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | $i_2$ | | | |
|---|---|---|---|---|
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | $i_2$ | | | |
|---|---|---|---|---|
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

$$W_{m,m',n}^{(2)} = \frac{1}{\sqrt{8}}\begin{bmatrix} v'_m & v'_{m'} \\ \varphi_n v'_m & -\varphi_n v'_{m'} \end{bmatrix}$$

Table 15 exemplifies a codebook for 3-layer CSI report using antenna ports 15 to 18.

TABLE 15

| $i_1$ | $i_2$ | | | | | | | |
|---|---|---|---|---|---|---|---|---|
| | 0 | 1 | 2 | 3 | 4 | 5 | 6 | 7 |
| 0 | $W_0^{\{124\}}/\sqrt{3}$ | $W_1^{\{123\}}/\sqrt{3}$ | $W_2^{\{123\}}/\sqrt{3}$ | $W_3^{\{123\}}/\sqrt{3}$ | $W_4^{\{124\}}/\sqrt{3}$ | $W_5^{\{124\}}/\sqrt{3}$ | $W_6^{\{134\}}/\sqrt{3}$ | $W_7^{\{134\}}/\sqrt{3}$ |

| $i_1$ | $i_2$ | | | | | | | |
|---|---|---|---|---|---|---|---|---|
| | 8 | 9 | 10 | 11 | 12 | 13 | 14 | 15 |
| 0 | $W_8^{\{124\}}/\sqrt{3}$ | $W_9^{\{134\}}/\sqrt{3}$ | $W_{10}^{\{123\}}/\sqrt{3}$ | $W_{11}^{\{134\}}/\sqrt{3}$ | $W_{12}^{\{123\}}/\sqrt{3}$ | $W_{13}^{\{123\}}/\sqrt{3}$ | $W_{14}^{\{123\}}/\sqrt{3}$ | $W_{15}^{\{123\}}/\sqrt{3}$ |

Table 16 exemplifies a codebook for 4-layer CSI report using antenna ports 15 to 18.

TABLE 16

| | $i_2$ | | | | | | | |
|---|---|---|---|---|---|---|---|---|
| $i_1$ | 0 | 1 | 2 | 3 | 4 | 5 | 6 | 7 |
| 0 | $W_0^{\{1234\}}/2$ | $W_1^{\{1234\}}/2$ | $W_2^{\{3214\}}/2$ | $W_3^{\{3214\}}/2$ | $W_4^{\{1234\}}/2$ | $W_5^{\{1234\}}/2$ | $W_6^{\{1324\}}/2$ | $W_7^{\{1324\}}/2$ |
| | $i_2$ | | | | | | | |
| $i_1$ | 8 | 9 | 10 | 11 | 12 | 13 | 14 | 15 |
| 0 | $W_8^{\{1234\}}/2$ | $W_9^{\{1234\}}/2$ | $W_{10}^{\{1324\}}/2$ | $W_{11}^{\{1324\}}/2$ | $W_{12}^{\{1234\}}/2$ | $W_{13}^{\{1324\}}/2$ | $W_{14}^{\{3214\}}/2$ | $W_{15}^{\{1234\}}/2$ |

In the case of 8 antenna ports, each PMI value corresponds to a pair of codebook indexes given by Table 17 to Table 24 below. Herein, $\varphi_n$ and $v_m$ are as represented in Equation 8 below.

$$\varphi_n = e^{j\pi n/2}$$

$$v_m = [1\, e^{j2\pi n/32}\, e^{j4\pi n/32}\, e^{j6\pi n/32}]^T \quad \text{[Equation 8]}$$

In the case of 8 antenna ports {15, 16, 17, 18, 19, 20, 21, 22}, a first PMI value ($i_1 \in \{0, 1, \ldots, f(\upsilon)-1\}$) and a second PMI value ($i_2 \in \{(0, 1, \ldots, g(\upsilon)-1\}$) correspond to codebook indexes $i_1$ and $i_2$, respectively, given by Table j with respect to the same $\upsilon$ as the related RI value. Here, j=$\upsilon$, f($\upsilon$)={16, 16, 4, 4, 4, 4, 4, 1} and, g($\upsilon$)={16, 16, 16, 8, 1, 1, 1, 1}.

Table 17 exemplifies a codebook for 1-layer CSI report using antenna ports 15 to 22.

TABLE 17

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{2i_1, 0}^{(1)}$ | $W_{2i_1, 1}^{(1)}$ | $W_{2i_1, 2}^{(1)}$ | $W_{2i_1, 3}^{(1)}$ | $W_{2i_1+1, 0}^{(1)}$ | $W_{2i_1+1, 1}^{(1)}$ | $W_{2i_1+1, 2}^{(1)}$ | $W_{2i_1+1, 3}^{(1)}$ |
| | $i_2$ | | | | | | | |
| $i_1$ | 8 | 9 | 10 | 11 | 12 | 13 | 14 | 15 |
| 0-15 | $W_{2i_1+2, 0}^{(1)}$ | $W_{2i_1+2, 1}^{(1)}$ | $W_{2i_1+2, 2}^{(1)}$ | $W_{2i_1+2, 3}^{(1)}$ | $W_{2i_1+3, 0}^{(1)}$ | $W_{2i_1+3, 1}^{(1)}$ | $W_{2i_1+3, 2}^{(1)}$ | $W_{2i_1+3, 3}^{(1)}$ |

$$W_{m,n}^{(1)} = \frac{1}{\sqrt{8}} \begin{bmatrix} v_m \\ \varphi_n v_m \end{bmatrix}$$

Table 18 exemplifies a codebook for 2-layer CSI report using antenna ports 15 to 22.

TABLE 18

| $i_1$ | $i_2$ | | | |
|---|---|---|---|---|
| | 0 | 1 | 2 | 3 |
| 0-15 | $W^{(2)}_{2i_1, 2i_1, 0}$ | $W^{(2)}_{2i_1, 2i_1, 1}$ | $W^{(2)}_{2i_1+1, 2i_1+1, 0}$ | $W^{(2)}_{2i_1+1, 2i_1+1, 1}$ |
| $i_1$ | $i_2$ | | | |
| | 4 | 5 | 6 | 7 |
| 0-15 | $W^{(2)}_{2i_1+2, 2i_1+2, 0}$ | $W^{(2)}_{2i_1+2, 2i_1+2, 1}$ | $W^{(2)}_{2i_1+3, 2i_1+3, 0}$ | $W^{(2)}_{2i_1+3, 2i_1+3, 1}$ |
| $i_1$ | $i_2$ | | | |
| | 8 | 9 | 10 | 11 |
| 0-15 | $W^{(2)}_{2i_1, 2i_1+1, 0}$ | $W^{(2)}_{2i_1, 2i_1+1, 1}$ | $W^{(2)}_{2i_1+1, 2i_1+2, 0}$ | $W^{(2)}_{2i_1+1, 2i_1+2, 1}$ |
| $i_1$ | $i_2$ | | | |
| | 12 | 13 | 14 | 15 |
| 0-15 | $W^{(2)}_{2i_1, 2i_1+3, 0}$ | $W^{(2)}_{2i_1, 2i_1+3, 1}$ | $W^{(2)}_{2i_1+1, 2i_1+3, 0}(2)$ | $W^{(2)}_{2i_1+1, 2i_1+3, 1}$ |

$$W^{(2)}_{m,m',n} = \frac{1}{4}\begin{bmatrix} v_m & v_{m'} \\ \varphi_n v_m & -\varphi_n v_{m'} \end{bmatrix}$$

Table 19 exemplifies a codebook for 3-layer CSI report using antenna ports 15 to 22.

TABLE 19

| $i_1$ | $i_2$ | | | |
|---|---|---|---|---|
| | 0 | 1 | 2 | 3 |
| 0-3 | $W^{(3)}_{8i_1, 8i_1, 8i_1+8}$ | $W^{(3)}_{8i_1+8, 8i_1, 8i_1+8}$ | $\tilde{W}^{(3)}_{8i_1, 8i_1+8, 8i_1+8}$ | $\tilde{W}^{(3)}_{8i_1+8, 8i_1, 8i_1}$ |
| $i_1$ | $i_2$ | | | |
| | 4 | 5 | 6 | 7 |
| 0-3 | $W^{(3)}_{8i_1+2, 8i_1+2, 8i_1+10}$ | $W^{(3)}_{8i_1+10, 8i_1+2, 8i_1+10}$ | $\tilde{W}^{(3)}_{8i_1+2, 8i_1+10, 8i_1+10}$ | $\tilde{W}^{(3)}_{8i_1+10, 8i_1+2, 8i_1+2}$ |
| $i_1$ | $i_2$ | | | |
| | 8 | 9 | 10 | 11 |
| 0-3 | $W^{(3)}_{8i_1+4, 8i_1+4, 8i_1+12}$ | $W^{(3)}_{8i_1+12, 8i_1+4, 8i_1+12}$ | $\tilde{W}^{(3)}_{8i_1+4, 8i_1+12, 8i_1+12}$ | $\tilde{W}^{(3)}_{8i_1+12, 8i_1+4, 8i_1+4}$ |
| $i_1$ | $i_2$ | | | |
| | 12 | 13 | 14 | 15 |
| 0-3 | $W^{(3)}_{8i_1+6, 8i_1+6, 8i_1+14}$ | $W^{(3)}_{8i_1+14, 8i_1+6, 8i_1+14}$ | $\tilde{W}^{(3)}_{8i_1+6, 8i_1+14, 8i_1+14}$ | $\tilde{W}^{(3)}_{8i_1+14, 8i_1+6, 8i_1+6}$ |

$$W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix}, \tilde{W}^{(3)}_{m,m',m''} = \frac{1}{\sqrt{24}}\begin{bmatrix} v_m & v_{m'} & v_{m''} \\ v_m & v_{m'} & -v_{m''} \end{bmatrix}$$

Table 20 exemplifies a codebook for 4-layer CSI report using antenna ports 15 to 22.

TABLE 20

| | $i_2$ | | | |
|---|---|---|---|---|
| $i_1$ | 0 | 1 | 2 | 3 |
| 0-3 | $W^{(4)}_{8i_1, 8i_1+8, 0}$ | $W^{(4)}_{8i_1, 8i_1+8, 1}$ | $W^{(4)}_{8i_1+2, 8i_1+10, 0}$ | $W^{(4)}_{8i_1+2, 8i_1+10, 1}$ |
| | $i_2$ | | | |
| $i_1$ | 4 | 5 | 6 | 7 |
| 0-3 | $W^{(4)}_{8i_1+4, 8i_1+12, 0}$ | $W^{(4)}_{8i_1+4, 8i_1+12, 1}$ | $W^{(4)}_{8i_1+6, 8i_1+14, 0}$ | $W^{(4)}_{8i_1+6, 8i_1+14, 0}$ |

$$W^{(4)}_{m,m',n} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$$

Table 21 exemplifies a codebook for 5-layer CSI report using antenna ports 15 to 22.

TABLE 21

| | $i_2$ |
|---|---|
| $i_1$ | 0 |
| 0-3 | $W^{(5)}_{i_1} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 22 exemplifies a codebook for 6-layer CSI report using antenna ports 15 to 22.

TABLE 22

| | $i_2$ |
|---|---|
| $i_1$ | 0 |
| 0-3 | $W^{(6)}_{i_1} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 23 exemplifies a codebook for 7-layer CSI report using antenna ports 15 to 22.

TABLE 23

| | $i_2$ |
|---|---|
| $i_1$ | 0 |
| 0-3 | $W^{(7)}_{i_1} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 24 exemplifies a codebook for 8-layer CSI report using antenna ports 15 to 22.

TABLE 24

| | $i_2$ |
|---|---|
| $i_1$ | 0 |
| 0 | $W^{(8)}_{i_1} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

FIG. 14 illustrates a 2-dimensional active antenna system having 64 antenna elements in a wireless communication system to which the present invention may be applied.

FIG. 14 illustrates a common 2D antenna array. A case where $N_t=N_v \cdot N_h$ antennas has a square form as in FIG. 14 may be considered. In this case, $N_h$ indicates the number of antenna columns in a horizontal direction, and $N_v$ indicates the number of antenna rows in a vertical direction.

When the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

FIG. 15 illustrates a system in which an eNB or UE has a plurality of transmission/reception antennas capable of forming a 3D beam based on the AAS in a wireless communication system to which the present invention may be applied.

FIG. 15 is a diagram of the aforementioned example and illustrates a 3D MIMO system using a 2D antenna array (i.e., 2D-AAS).

From the point of view of a transmission antenna, in the case that a 3D beam pattern is used, a semi-static or dynamic beam may be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB may receive a signal from a UE through a plurality of antennas. In this case, there is an advantage in that the UE may set its transmission power very low by considering the gain of the massive reception antenna in order to reduce an interference influence.

FIG. 16 illustrates a 2D antenna system having cross-polarizations in a wireless communication system to which the present invention may be applied.

A 2D planar antenna array model in which polarization is considered may be diagrammed as shown in FIG. 16.

Unlike the existing MIMO system according to a passive antenna, a system based on an active antenna may dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 16, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 16, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmission diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

FIG. 17 illustrates a transceiver unit model in a wireless communication system to which the present invention may be applied.

In the 1D TXRU virtualization, $M_{TXRU}$ TXRUs are related to M antenna elements configured in a single column antenna array having the same polarization.

In the 2D TXRU virtualization, a TXRU model configuration corresponding to the antenna array model configuration (M, N, P) of FIG. 12 may be represented by ($M_{TXRU}$, N, P). In this case, $M_{TXRU}$ means the number of TXRUs present in the 2D same column and same polarization, and always satisfies $M_{TXRU} \leq M$. That is, the total number of TXRUs is the same as $M_{TXRU} \times N \times P$.

A TXRU virtualization model may be divided into a TXRU virtualization model option-1: sub-array partition model as in FIG. 17(a) and a TXRU virtualization model option-2: full connection model as in FIG. 17(b) depending on a correlation between an antenna element and a TXRU.

Referring to FIG. 17(a), in the case of the sub-array partition model, an antenna element is partitioned into multiple antenna element groups, and each TXRU is connected to one of the groups.

Referring to FIG. 17(b), in the case of the full-connection model, the signals of multiple TXRUs are combined and transferred to a single antenna element (or the arrangement of antenna elements).

In FIG. 17, q is the transmission signal vectors of antenna elements having M co-polarizations within one column. W is a wideband TXRU virtualization vector, and W is a wideband TXRU virtualization matrix. X is the signal vectors of $M_{TXRU}$ TXRUs.

In this case, mapping between an antenna port and TXRUs may be one-to-one or one-to-many.

In FIG. 17, mapping between a TXRU and an antenna element (TXRU-to-element mapping) shows one example, but the present invention is not limited thereto. From the point of view of hardware, the present invention may be identically applied to mapping between a TXRU and an antenna element which may be implemented in various forms.

CSI Reporting

In current 3GPP Rel-13, it is defined a CSI-RS operation (or CSI reporting operation) (each CSI process may be associated with a single CSI-RS resource and a single CSI-IM resource) of non-precoded scheme defined as Class A and CSI-RS operation (or CSI reporting operation) (each CSI process may be associated with one or more CSI-RS resources and one or more CSI-IM resources) of beam-formed scheme defined as Class B.

1) Class a CSI Reporting

In Full Dimension (FD)-MIMO (or may also referred to as Massive-MIMO, enhanced-MIMO, Large-Scale Antenna System, Very Large MIMO, Hyper-MIMO, etc.) system, an eNB may configure several CSI-RS resources in a single CSI process to a UE. In this case, the UE does not regard the CSI-RS resource configured in a single CSI process as an independent channel, but a single (huge) CSI-RS resource by aggregating the corresponding resources. In addition, the UE calculates CSI from the single CSI-RS resource and feedbacks it to the eNB. For example, the eNB configures three 4-port CSI-RS resources in a single CSI process to the UE, and the UE aggregates these and assumes a single 12-port CSI-RS resource. The UE calculates CSI by using 12-port PMI from the resource, and feedbacks it to the eNB.

2) Class B CSI Reporting

In FD MIMO system, an eNB may configure several CSI-RS resources in a single CSI process to a UE. For example, an eNB may configure eight CSI-RS resources in a single CSI process, and each of the eight CSI-RS processes may include 4-port CSI-RS. Different virtualization is applied to each of the eight 4-port CSI-RS resources, and different beamforming is applied. For example, vertical beamforming is applied to the CSI-RS resource that corresponds to the first with a zenith angle of 100 degrees, and CSI-RS is configured with an interval of a zenith angle of 5 degrees sequentially in each CSI-RS resource, and vertical beamforming is applied to the CSI-RS resource that corresponds to the eighth with a zenith angle of 135 degrees.

A UE assumes each CSI-RS resource as an independent channel. The UE selects one of the CSI-RS resources, and calculates CSI based on the selected resource, and then reports it to an eNB. That is, a UE selects a CSI-RS resource of which channel is strong among the eight CSI-RSs, and calculates CSI based on the selected CSI-RS resource, and then reports it to the eNB. At this time, the UE reports the selected CSI-RS resource additionally to the eNB using CSI-RS resource indicator (CRI) value. For example, in the case that the channel of the first CSI-RS is the strongest, the UE may report it to the eNB by configuring CRI=0.

In order to represent the characteristics above efficiently, the following variables may be defined for the CSI process in Class B. K means the number of CSI-RS resources existed in the CSI process. $N_k$ means the number of CSI-RS ports of $k^{th}$ CSI-RS resource. In the above example, K=8 and $N_k$ is set to 4 regardless of k value.

In current 3GPP Rel-13, CRI indicates a specific CSI-RS resource, but in the future, it may be further concretized that CRI indicates a specific port combination for a specific CRI-RS resource.

For example, it may be concretized that CRI selects one of eight CRI-RSs in a CSI-RS process, and additionally, selects combination of ports 15 and 16 in the selected CSI-RS resource. As such, when one of combination of ports 15 and 16 or ports 17 and 18 is available to be selected in each CSI-RS, the CRI indicates one value among 16 values. Combination of ports 15 and 16 of the first CSI-RS resource is mapped to CRI=0, combination of ports 17 and 18 of the first CSI-RS resource is mapped to CRI=1, combination of ports 15 and 16 of the second CSI-RS resource is mapped to CRI=2, combination of ports 17 and 18 of the second CSI-RS resource is mapped to CRI=3, and combination of ports 17 and 18 of the last eighth CSI-RS resource may be finally mapped to CRI=15.

3GPP Rel-13 codebook follows the dual structure of Rel-10 and Rel-12 codebooks. That is, with the properties of $W_1$ (W1) (long-term, wideband, beam group selection) and $W_2$ (W2) (short-term, subband, beam selection+co-phasing), a codebook is finally constructed by multiplication of two elements (i.e., multiplication of $W_1$ and $W_2$).

However, difference from Rel-10 and Rel-12 codebooks is that each of the beams that construct a codebook is shown as Kronecker product of a vertical beam and a horizontal beam since the considered antenna port layout includes 2 dimension (2D). 3GPP Rel-13 Rank 1-2 codebook is represented as Equation 9 below.

$$W = W_1 W_2 \quad \text{[Equation 9]}$$

$$W^{(1)}_{m_1,m_2,n} = \frac{1}{\sqrt{2N_1N_2}} \begin{bmatrix} v_{m_1} \otimes u_{m_2} \\ \varphi_n v_{m_1} \otimes u_{m_2} \end{bmatrix},$$

$$\varphi_n = \exp\left(\frac{j2\pi n}{4}\right), n = 0, 1, 2, 3$$

$$W^{(2)}_{m_1,m_2,n} = \frac{1}{\sqrt{2N_1N_2}} \begin{bmatrix} v_{m_1} \otimes u_{m_2} & v_{m_1} \otimes u_{m_2} \\ \varphi_n v_{m_1} \otimes u_{m_2} & -\varphi_n v_{m_1} \otimes u_{m_2} \end{bmatrix},$$

$$\varphi_n = \exp\left(\frac{j2\pi n}{4}\right), n = 0, 1$$

$$v_{m_1} = \left[1 \exp\left(j\frac{2\pi m_1}{o_1 N_1}\right) \ldots \exp\left(j\frac{2\pi m_1(N_1-1)}{o_1 N_1}\right)\right]^T$$

$$u_{m_2} = \left[1 \exp\left(j\frac{2\pi m_2}{o_2 N_2}\right) \ldots \exp\left(j\frac{2\pi m_2(N_2-1)}{o_2 N_2}\right)\right]^T$$

In Equation 9, $W^{(1)}$ represents the final format of Rank 1 codebook, and $W^{(2)}$ represents the final format of Rank 2 codebook.

Here, $N_1$ and $N_2$ are the number of antenna ports for each polarization in the first dimension and the second dimension, respectively. $o_1$ and $o_2$ are oversampling factors in the first dimension and the second dimension, respectively.

Further, $m_1$ and $m_2$ represents a selection method of Discrete Fourier Transform (DFT) vector in a horizontal and vertical (or $1^{st}$ and $2^{nd}$ domain). Using $m_1$ ($m_1$ and $m'_1$, for Rank 2) and $m_2$ ($m_2$ and $m'_2$, for Rank 2), specific W1 (i.e., first PMI) 2D beam group (i.e., codebook configurations 1 to 4) may be configured. And, subscript n represents co-phasing.

That is, it can be seen that Rel-10 8Tx (8 ports transmission) codebook is extended to 3GPP Rel-13 codebook using Kronecker product operation.

In addition, 3GPP Rel-13 codebook may form closely spaced beams.

Further, it can be seen that 3GPP Rel-13 codebook is continued constant modulus codebook. That is, this means that all of the amplitudes of elements constructing vectors (i.e., v and u) are 1, and only angles are changed in circular manner.

In addition, 3GPP Rel-13 codebook corresponds to a scalable codebook using $N_1$, $N_2$, $o_1$ and $o_2$ parameters.

Furthermore, 3GPP Rel-13 codebook may be classified into four types of configurations.

FIG. 18 is a diagram illustrating a configuration of codebook in a wireless communication system to which the present invention may be applied.

FIG. 18 exemplifies beam group patterns for each codebook configuration.

Configuration 1 (Config 1) codebook represents a beam group pattern including a single beam (i.e., (x, y), herein, x represents the first dimensional (e.g., horizontal dimension) index and y represents the second dimensional (e.g., vertical dimension) index). That is, a beam is selected by $W_1$, and accordingly, a beam selection is not existed in $W_2$.

Configuration 2 (Config 2) codebook represents a beam group pattern which is configured with four beams in square shape (i.e., (x, y), (x, y+1), (x+1, y), (x+1, y+1), herein, x represents the first dimensional (e.g., horizontal dimension) index and y represents the second dimensional (e.g., vertical dimension) index). This may be applied to medium angle spread in both of the first dimension and the second dimension.

Configuration 3 (Config 3) codebook represents a beam group pattern which is configured with four beams in zigzag shape (i.e., (x, y), (x+1, y+1), (x+2, y), (x+3, y+1), herein, x represents the first dimensional (e.g., horizontal dimension) index and y represents the second dimensional (e.g., vertical dimension) index). This may be applied to large angle spread and medium angle spread in each of the first dimension and the second dimension.

Configuration 4 (Config 4) codebook represents a beam group pattern which is configured with four beams in rectangular (line) shape (i.e., (x, y), (x+1, y), (x+2, y), (x+3, y), herein, x represents the first dimensional (e.g., horizontal dimension) index and y represents the second dimensional (e.g., vertical dimension) index). This may be applied to large angle spread and small angle spread in each of the first dimension and the second dimension.

Here, the performance difference among the four codebook configurations is very small in 3GPP Rel-13 codebook (within 5%).

Further, the nested property is not satisfied in 3GPP Rel-13 codebook. That is, Rank 1 and Rank 2 have different beam patterns.

In addition, in 3GPP Rel-13 codebook, the codebook applicable for the first dimension is configuration 1 (Config 1) and configuration 4 (Config 4).

CSI Feedback Method for Linear Combination (LC) Codebook

With the introduction of FD-MIMO, an eNB may perform 3D-beamforming with N (N>>1, e.g., 8, 12, 16, 20, 24, 28, 32) antenna ports (or "elements" according to a specific port-to-element virtualization, hereinafter, it is described commonly referred as "port", for the convenience of description), and accordingly, throughput of a system may be improved. In the existing 3GPP LTE and LTE-A, a codebook based on a DFT matrix is used for the purpose of Single User-MIMO (SU-MIMO).

It is important to form a fine beam more accurately for the MU-MIMO, but there is a disadvantage that resolution is not enough when a codebook is configured only with the number of antenna ports and oversampling factors. Furthermore, since all of the sizes of DFT matrixes are 1, there is a disadvantage that is it difficult in reflecting channel information precisely.

Accordingly, a linear combination (LC) codebook has been discussed for more precise CSI feedback for the purpose of enhancing Multi User-MIMO (MU-MIMO).

Hereinafter, LC codebook will be described.

The LC codebook means a codebook of extending unit/granularity of a beam by configuring a beam group of wideband/longterm property with W1 (or $W_1$) (i.e., first PMI), and linearly combining beams that construct W1 when subband/short term reporting W2 (or $W_2$) (i.e., second PMI) in dual codebook structure.

Here, W1 may be used by applying W1 of dual-stage codebook represented by Class A codebook, W1 newly designed for Linear combination, or the legacy codebook (e.g., 3GPP Rel-8 4Tx) of a single state.

LC codebook is represented by Equation 10.

$$W_{k,n}^{(1)} = \frac{1}{\sqrt{2\|a_k\|^2}} \begin{bmatrix} a_k \\ \varphi_n a_k \end{bmatrix}, \varphi_n = \exp\left(\frac{j2\pi n}{4}\right), n = 0, 1, 2, 3 \quad \text{[Equation 10]}$$

$$W_{k,n}^{(2)} = \frac{1}{\sqrt{2\|a_k\|}} \begin{bmatrix} a_k & a_k \\ \varphi_n a_k & -\varphi_n a_k \end{bmatrix}, \varphi_n = \exp\left(\frac{j2\pi n}{4}\right), n = 0, 1$$

where $$a_k = \sum_{i=1}^{N} c_{i,k} \exp(j\theta_{i,k}) b_i, c_{i,k} (0 \leq c_{i,k} \leq 1)$$

is an amplitude coefficient, N is a number of beams in $W_1$, $\theta_i$ is a phase coefficient, $b_i \in \{(m_1, m_2) | v_{m_1} \otimes u_{m_2}\}$ is an DFT vector from $W_1$.

In Equation 10, $c_{i,k}$ ($0 \leq c_{i,k} \leq 1$) is an amplitude coefficient, N is the number of beams in $W_1$, $\theta_i$ is a phase coefficient, and are DFT vectors belonged to $W_1$. $\otimes$ means Kronecker product.

In Equation 10, for a given W1, the components that a UE should report in W2 may include followings.

i) Index involved in a selection of the best L beams used in an LC operation among N beams, ii) Index in relation to the number of LCs (e.g., phase, amplitude or phase+amplitude), iii) Index in relation to co-phase component of cross polarization (X-pol) antenna.

Here, in the description of the present invention, for the convenience of description, it is described that the first dimension/domain is referred to as horizontal/domain mainly and the second dimension/domain is referred to as vertical/domain mainly, in 2D antenna array, but the present invention is not limited thereto.

Further, in the following description of the present invention, unless otherwise specified, the same variables used in the respective equations can be represented by the same symbols and can be interpreted in the same way.

In addition, hereinafter, in the description of the present invention, a beam may be interpreted as a precoding matrix (or precoding vector or codeword) for generating the corresponding beam, and a beam group may be interpreted as the same meaning as a set of precoding matrixes (or a set of precoding vectors).

Furthermore, hereinafter, in the description of the present invention, 3GPP TS 36.213 v13.6.0 document is incorporated by reference in the present disclosure.

A. CSI Feedback Method Using PUCCH Format 2 or PUCCH Format 3

Hereinafter, the present invention proposes a method of feedback of the components described above using PUCCH format 2 or PUCCH format 3 defined in the current standard.

Table 25 is a table exemplifying the number of codewords in LC codebook.

TABLE 25

| | Number of beams (L) | Beam selection | LC coefficients Phase | LC coefficients Amplitude | Co-phase |
|---|---|---|---|---|---|
| Rank 1 | 2 | 6 ($_4C_2$) | 4^2 | 4^2 | QPSK |
| | 4 | 1 | 4^4 | 4^4 | QPSK |
| Rank 2 | 2 | 6 ($_4C_2$) | 4^2 | 4^2 | BPSK |
| | 4 | 1 | 4^4 | 4^4 | BPSK |

In the example of Table 25, it is assumed the case that a beam group of W1 includes four beams, Phase Coefficients are {1, j, −1, −j}, and Amplitude Coefficients are {0.25, 0.5, 0.75, 1}. That is, when the number of beams (L) is 2 in Rank 1, the beam selects two among four beams belonged to the beam group, and there are 6 ($_4C_2$) number of cases. In addition, Phase Coefficient and Amplitude Coefficient may have four cases for each beam, there are total 4^2 number of cases.

When this is generalized, using N (the number of beams in W1), P (the number of phase coefficients, and A (the number of amplitude coefficients), $_NC_L$ may represent a beam selection, P^L may represent a size of phase coefficient, and A^L may represent a size of amplitude coefficient.

In addition, the LC is performed, $$a_k = \sum_{i=1}^{N} c_{i,k} \exp(j\theta_{i,k}) b_i$$

in Equation 10 above is changed and applied as represented in Equation 11, and accordingly, a size of payload may be reduced.

$$a_k = b_i + \sum_{i=2}^{N} c_{i,k} \exp(j\theta_{i,k}) b_i \quad \text{[Equation 11]}$$

When the term is changed as represented in Equation 11, the LC is performed based on a beam of $b_1$ which is a reference. That is, according to Equation 10, any beam included in W1 beam group may be selected for the LC, but according to Equation 11, a specific beam belonged to W1 beam group may be selected as a beam for the LC among the remaining beams in a specific situation.

Accordingly, in comparison with the case of applying the entire LC codebook size (i.e., the case of Equation 10 above), the LC may be applied without significant performance loss.

It may be configured to a UE by higher layer signaling (e.g., RRC signaling) whether the LC codebook is configured by using Equation 10 or Equation 11 (i.e., the scheme that Equation 10 is applied to Equation 11), and an eNB and the UE may make promise in advance.

Hereinafter, a CSI feedback method on PUCCH format 2/2a/2b will be described.

In the legacy system, in the case of submode 1 of periodic CSI (P-CSI) mode 1-1 (refer to Table 7 above), a CSI feedback is supported as below.

A single entire report includes three reporting times/instances on PUCCH format 2/2a/2b.

First instance: RI
Second instance: W1
Third instance: CQI+W2

That is, a UE may report RI to an eNB in the first instance, report W1 to an eNB in the second instance, and report CQI and W2 to an eNB in the third instance.

In P-CSI mode 1-1 submode 1, it is assumed 3GPP Rel-13 Class A codebook (i.e., Table 7.2.4-10, 7.2.4-11, 7.2.4-12, 7.2.4-13, 7.2.4-14, 7.2.4-15, 7.2.4-16, or 7.2.4-17 of 3GPP TS 36.213 v13.6.0) of Configuration given by RRC.

Codebook subsampling is not required.

W1 feedback periodicity is $H'*N_{pd}$.

Herein, $N_{pd}$ period (within subframe) is determined based on a value of Table 7.2.2-1A of 3GPP TS 36.213 v13.6.0 according to a given parameter "cqi-pmi-ConfigIndex" ($I_{CQI/PMI}$), and H' is an integer value signaled by a higher layer.

Class A codebook of 3GPP Rel-13 is 9 bits for Rank 1-2 when Config1 of maximum bit width of W1 is used. Since oversampling factor is (8, 4) in maximum 32 antenna ports configuration supported in 3GPP Rel-14, the codebook may have bit width of maximum 9 bits.

According to the present invention, in the case of LC codebook, the LC codebook of submode 1 of P-CSI mode 1-1 may be as represented below.

First, hereinafter, for the convenience of description of the present invention, i2 may be defined as below.

i21: beam selection (L beams among N beams)
i22: index for LC coefficient
i23: index for Co-phase That is, in order to generate a precoding matrix according to an embodiment of the present invention, it is distinguished selection information (i.e., i21) for indicating a beam (i.e., codeword) used for the LC, information (i.e., i22) for indicating an LC coefficient applied to each beam (i.e., codeword) when applying the LC, and information (i.e., i23) for indicating Co-phase of a beam transmitted in each polarization (i.e., domain) in cross polarization antenna layout. Here, the phase coefficient and the co-phase described as an example of the LC coefficient may be indicated as a phase coefficient.

As described below, i21, i22 and i23 may be transmitted in each independent CSI reporting time/instance. Hereinafter, this will be described in more detail.

Submode 1 of P-CSI mode 1-1 proposed in the present invention may be considered as below.

Proposal A. 1) a single entire report includes three reporting times/instances on PUCCH format 2/2a/2b.

First instance: RI
Second instance: W1+W2 (i21)
Third instance: CQI+W2 (i22+i23)

That is, a UE may report RI to an eNB in the first instance, report W1 and W2 (i21) to an eNB in the second instance, and report CQI and W2 (i22+i23) to an eNB in the third instance.

In the above example, a period of each higher instance may be an integer multiple of a period the next lower instance. For example, a period of the second instance may be an integer multiple of a period of the third instance.

When the method proposed in the present invention is used, considering that a size of payload is 11 bits, it is preferable that a restriction of the LC codebook is accompanied as below.

A UE may not expect that Class A codebook Configuration 1 is setup when the LC codebook is configured. In addition, it is setup as L=2 applied to the LC, and in order to match a feedback bit size of W2 of the third instance to 4 bits (since CQI=7 in Rank 2), it may be restricted to apply Equation 11 (i.e., Equation 11 is applied to Equation 10) considering that either one of Phase or Amplitude is fed back.

Alternatively, in order to use a payload size of PUCCH format 2 efficiently, the LC codebook of different units/granularities may be used for each Rank (Rank 1 or 2).

That is, in the case of Rank 1, since a payload size of CQI is 4 bits, a UE may be configured to report PMI (i22+i23) that corresponds to 7 bits. For example, LC codebook may be considered that whereas both of Phase and Amplitude are considered in i22 for Rank 1, only Phase (or amplitude subsampled with Phase) is considered in i22 for Rank 2. In the same way, this may be interpreted that Rank 1 and Rank 2 use the LC codebook of the same beam granularity, but when Rank 2 reporting, only the codebook i22 index that corresponds to a specific coefficient in Rank 1 i22 is subsampled.

Alternatively, in Rank 1, i22 considering either one of feedback between Equation 10 above, Phase or Amplitude may be used, and in Rank 2, i22 considering either one of feedback between Equation 11 above, Phase or Amplitude may be used.

As another example, the component of W2 which is joint-encoded with W1 in the second instance is i23 and W2 which is joint-encoded with CQI in the second instance is configured with i21 and i22, which is as represented in proposal A. 1-1) below.

Proposal A. 1-1) a single entire report includes three reporting times/instances on PUCCH format 2/2a/2b.
 First instance: RI
 Second instance: W1+W2 (i23)
 Third instance: CQI+W2 (i21+i22)

That is, a UE may report RI to an eNB in the first instance, report W1 and W2 (i23) to an eNB in the second instance, and report CQI and W2 (i21+i22) to an eNB in the third instance.

In the above example, a period of each higher instance may be an integer multiple of a period the next lower instance. For example, a period of the second instance may be an integer multiple of a period of the third instance.

In the embodiment described above, the amplitude component and the phase component are transmitted with being joint-encoded with i22 component, but different from this, as another example, i22 component may be divided into the amplitude component and the phase component, and transmitted in different instances.

Hereinafter, for the convenience of description, it is assumed that the amplitude coefficient is i221, and the phase coefficient is i222. The modified proposal is as represented in proposal A. 1-2) and proposal A. 1-3) below.

The current LTE codebook for X-pol antenna structure reports the co-phase information (i.e., change of the phase component). This means that in a channel difference from Horizontal slant (H-slant) and Vertical slant (V-slant) antennas, a difference of the phase component is dominant. Accordingly, this is also reflected on the LC codebook, and the amplitude is reported with relatively longer period than the phase. Through such a feedback method, an effect of reducing feedback overhead may be obtained.

Proposal A. 1-2) a single entire report includes three reporting times/instances on PUCCH format 2/2a/2b.
 First instance: RI
 Second instance: W1+W2 (i221+i21)
 Third instance: CQI+W2 (i222+i23)

That is, a UE may report RI to an eNB in the first instance, report W1 and W2 (i221+i21) to an eNB in the second instance, and report CQI and W2 (i222+i23) to an eNB in the third instance.

In the above example, a period of each higher instance may be an integer multiple of a period the next lower instance. For example, a period of the second instance may be an integer multiple of a period of the third instance.

Proposal A. 1-3) a single entire report includes three reporting times/instances on PUCCH format 2/2a/2b.
 First instance: RI
 Second instance: W1+W2 (i221)
 Third instance: CQI+W2 (i21+i222+i23)

That is, a UE may report RI to an eNB in the first instance, report W1 and W2 (i221) to an eNB in the second instance, and report CQI and W2 (i21+i222+i23) to an eNB in the third instance.

In the above example, a period of each higher instance may be an integer multiple of a period the next lower instance. For example, a period of the second instance may be an integer multiple of a period of the third instance.

Submode 1 of P-CSI mode 1-1 proposed in the present invention may be considered as below.

Proposal A. 2) a single entire report includes four reporting times/instances on PUCCH format 2/2a/2b.
 First instance: RI
 Second instance: W1
 Third instance: W2 (i21+i22)
 Fourth instance: CQI+W2 (i23)

That is, a UE may report RI to an eNB in the first instance, report W1 to an eNB in the second instance, report W2 (i21+i22) to an eNB in the third instance, and report CQI and W2 (i23) to an eNB in the fourth instance.

In the above example, a period of each higher instance may be an integer multiple of a period the next lower instance. For example, a period of the second instance may be an integer multiple of a period of the third instance.

In the case of proposal A. 2), like proposal A. 1) described above, there may be no restriction in the codebook configuration. In addition, a new codebook that has a feedback bit of W1 like Config1 may also be included (i.e., a UE may be configured/applied S1=S2=1 that means a spacing of W1 beam group). Furthermore, in the case of the third instance, the LC may be configured by considering Phase and Amplitude (or only phase).

As another example, the component of i22 is divided into amplitude and phase components and transmitted in different instances.

Hereinafter, for the convenience of description, it is assumed that amplitude coefficient is i221, and phase coefficient is i222.

Proposal A. 2-1) a single entire report includes four reporting times/instances on PUCCH format 2/2a/2b.

First instance: RI
Second instance: W1+W2 (i221)
Third instance: W2 (i21+i222)
Fourth instance: CQI+W2 (i23)

That is, a UE may report RI to an eNB in the first instance, report W1 and W2 (i221) to an eNB in the second instance, report W2 (i21+i222) to an eNB in the third instance, and report CQI and W2 (i23) to an eNB in the fourth instance.

In the above example, a period of each higher instance may be an integer multiple of a period the next lower instance. For example, a period of the second instance may be an integer multiple of a period of the third instance.

Next, P-CSI mode 2-1 (refer to Table 7 above) is described.

In the legacy system, the CSI feedback is supported to P-CSI mode 2-1 as below.

Proposal A. 3) a single entire report includes three reporting times/instances on PUCCH format 2/2a/2b.
First instance: RI+PTI=0
Second instance: W1
Third instance: CQI+WB W2

That is, a UE may report RI and PTI to an eNB in the first instance. At this time, in the case that PTI=0, a UE may report W1 to an eNB in the second instance, and report CQI and Wideband (WB) W2 to an eNB in the third instance.

First instance: RI+PTI=1
Second instance: WB CQI+W2
Third instance: SB CQI+W2+L'

Alternatively, a UE may report RI and PTI to an eNB in the first instance. At this time, in the case that PTI=1, a UE may report WB CQI and W2 to an eNB in the second instance, and report subband (SB) CQI, W2 and L' to an eNB in the third instance.

Here, L' is not the number of selected beams described above, and represents SB selection index of bandwidth part (BP).

In the case that PTI=0, the schemes of proposal A. 1) and proposal A. 2) described above may be reused without any change. The difference is that RI and PTI are fed back in the first instance.

Proposal A. 3-1) a single entire report includes four reporting times/instances on PUCCH format 2/2a/2b.

At this time, in the case that PTI=1, the following modes may be considered.
First instance: RI+PTI
Second instance: W2 (i21+i23)
Third instance: WB CQI+W2 (i23)
Fourth instance: SB CQI+W2 (i23)+L'

That is, a UE may report RI and PTI to an eNB in the first instance. At this time, in the case that PTI=1, a UE may report W2 (i21+i22) to an eNB in the second instance, report WB CQI and W2 (i23) to an eNB in the third instance, and report SB CQI, W2 (i23) and L' to an eNB in the fourth instance.

In the above example, a period of each higher instance may be an integer multiple of a period the next lower instance. For example, a period of the second instance may be an integer multiple of a period of the third instance.

In the second instance, the LC may be constructed by considering Phase and Amplitude (or phase only). It is apparent that the proposed method may be extendedly applied to the case that LC coefficients are distinguished for Wideband/Subband, for example, Power amplitude is considered for Wideband and Phase coefficient is considered for Subband.

Alternatively, a UE configured/applied with the LC codebook may not report CSI to an eNB in the case that it is PUCCH based P-CSI report accompanying PTI=1.

As another example, the component of i22 is divided into amplitude and phase components and transmitted in different instances.

Hereinafter, for the convenience of description, it is assumed that amplitude coefficient is i221, and phase coefficient is i222.

Proposal A. 3-2) a single entire report includes three reporting times/instances on PUCCH format 2/2a/2b.
First instance: RI+PTI=0
Second instance: W1+W2 (i21+i221)
Third instance: CQI+W2 (i222+i23)

That is, a UE may report RI and PTI to an eNB in the first instance. At this time, in the case that PTI=0, a UE may report W1 and W2 (i21+i221) to an eNB in the second instance, and report CQI and W2 (i222+i23) to an eNB in the third instance.

First instance: RI+PTI=1
Second instance: WB CQI+W2 (i21+i221)
Third instance: SB CQI+W2 (i222+i23)+L'

Alternatively, a UE may report RI and PTI to an eNB in the first instance. At this time, in the case that PTI=1, a UE may report WB CQI and W2 (i21+i221) to an eNB in the second instance, and report SB CQI, W2 (i222+i23) and L' to an eNB in the third instance.

In the above example, a period of each higher instance may be an integer multiple of a period the next lower instance. For example, a period of the second instance may be an integer multiple of a period of the third instance.

Alternatively, a use of PTI may be used for indicating amplitude coefficient and phase coefficient. That is, in the case of configured/applied with PTI=0, a use of i21 is restricted that W2 includes amplitude coefficient and/or beam selection component, and in case of configured/applied with PTI=1, W2 may include phase coefficient and co-phase component.

Proposal A. 3-3) a single entire report includes three reporting times/instances on PUCCH format 2/2a/2b.
First instance: RI+PTI=0
Second instance: W1
Third instance: CQI+WB W2 (i21+i221)

That is, a UE may report RI and PTI to an eNB in the first instance. At this time, in the case that PTI=0, a UE may report W1 to an eNB in the second instance, and report CQI and WB W2 (i21+i221) to an eNB in the third instance.

First instance: RI+PTI=1
Second instance: WB CQI+W2 (i222+i23)
Third instance: SB CQI+W2 (i222+i23)+L'

Alternatively, a UE may report RI and PTI to an eNB in the first instance. At this time, in the case that PTI=1, a UE may report WB CQI and W2 (i222+i23) to an eNB in the second instance, and report SB CQI, W2 (i222+i23) and L' to an eNB in the third instance.

In the above example, a period of each higher instance may be an integer multiple of a period the next lower instance. For example, a period of the second instance may be an integer multiple of a period of the third instance.

Hereinafter, a CSI feedback method on PUCCH format 3 is described.

In the case of the LC codebook described above, owing to a size of coefficient of LC, the feedback size may become greater significantly. Accordingly, for this, PUCCH format 3 that has capacity of maximum 32 bits may be used.

Hereinafter, a method is described for periodic reporting the CSI of large capacity using the LC codebook through PUCCH format 3.

Proposal A. 4) In the case of P-CSI mode 1-1 submode 1, a single entire report includes three reporting times/instances on PUCCH format 3.

First instance: RI
Second instance: W1
Third instance: CQI+W2 (i21+i22+i23)

That is, a UE may report RI to an eNB in the first instance, report W1 to an eNB in the second instance, and report CQI and W2 (i21+i22+i23) to an eNB in the third instance.

In the above example, a period of each higher instance may be an integer multiple of a period the next lower instance. For example, a period of the second instance may be an integer multiple of a period of the third instance.

In addition, there may be no restriction in the codebook configuration reported in the second instance. In addition, a new codebook that has a feedback bit of W1 like Config1 may also be included (i.e., a UE may be configured/applied S1=S2=1 that means a spacing of W1 beam group).

Furthermore, W2 of the third instance may include all of i21+i22+i23 described above, and considering both of phase and amplitude, an index of maximum W2 is 18 bits. In this case, since CQI may be 7 bits, this exceeds the payload size of 22 bits. In order to prevent this, when i22 is calculated, it may be premised between an eNB and a UE to apply Equation 11 (i.e., Equation 11 is applied to Equation 10), or the LC codebook considering phase only (or amplitude only) may be used.

In addition, in order for a UE to perform feedback adaptively with a given payload size, an index indicating a size of coefficient applied to the LE is added (e.g., i24), and accordingly, more flexible feedback operation may be performed. For example, amplitude coefficient may be adjusted by considering 1 bit i24. That is, when i24=0, amplitude LC coefficients of {0.25, 0.5, 0.75, 1} are used, and when i24=1, amplitude LC coefficients of {0.5, 1} may be used. Similarly, this may be applied to phase in the same way. For example, when i24=0, in the case of QPSK, i24=1, phase weighting of 8 Phase Shift Keying (PSK) may be considered. An index for LC coefficient may be applied independently or collectively for phase and amplitude. This new index is used for use of subsampling of the LC codebook, and there is an advantage that PUCCH format 3 is more efficiently used.

Furthermore, by introducing a new index described above, in addition to the method for perform feedback of CSI flexibly, similar to proposal A. 1), it may be promised between an eNB and a UE such that i22 is subsampled for each rank. For example, LC codebook may be considered that whereas both of Phase and Amplitude are considered in i22 for Rank 1, only Phase (or amplitude subsampled with Phase) is considered in i22 for Rank 2.

Considering a scheme of dividing components of i22 into amplitude and phase components and transmitting these in different instances, proposal A. 4) may be modified as below.

Proposal A. 4-1) In the case of P-CSI mode 1-1 submode 1, a single entire report includes three reporting times/instances on PUCCH format 3.

First instance: RI
Second instance: W1+W2 (i21+i221)
Third instance: CQI+W2 (i222+i23)

That is, a UE may report RI to an eNB in the first instance, report W1 and W2 (i21+i221) to an eNB in the second instance, and report CQI and W2 (i222+i23) to an eNB in the third instance.

In the above example, a period of each higher instance may be an integer multiple of a period the next lower instance. For example, a period of the second instance may be an integer multiple of a period of the third instance.

Proposal A. 5) In the case of P-CSI mode 1-1 submode 1, a single entire report includes two reporting times/instances on PUCCH format 3.

First instance: RI
Second instance: CQI+W1+W2 (i21+i22+i23)

That is, a UE may report RI to an eNB in the first instance and report CQI, W1 and W2 (i21+i22+i23) to an eNB in the second instance.

In the above example, a period of each higher instance may be an integer multiple of a period the next lower instance. For example, a period of the first instance may be an integer multiple of a period of the second instance.

In the case of proposal A. 5), since both of W1 and W2 are reported in the second instance, in order to match the payload size of maximum 22 bits, a UE may not expect that codebook Config1 or a codebook of the same size as Config1 is configured. In addition, in this case, the LC codebook based on feedback from either one of Phase or Amplitude may be used.

Proposal A. 6) In the case of P-CSI mode 2-1, a single entire report includes three reporting times/instances on PUCCH format 3.

First instance: RI+PTI=0
Second instance: W1
Third instance: CQI+W2 (i21+i22+i23)

That is, a UE may report RI and PTI to an eNB in the first instance. At this time, in the case that PTI=0, a UE may report W1 to an eNB in the second instance, and report CQI and W2 (i21+i22+i23) to an eNB in the third instance.

First instance: RI+PTI=1
Second instance: WB CQI+W2 (i21+i22+i23)
Third instance: SB CQI+W2 (i21+i22+i23)+L'

Alternatively, a UE may report RI and PTI to an eNB in the first instance. At this time, in the case that PTI=1, a UE may report WB CQI and W2 (i21+i22+i23) to an eNB in the second instance, and report SB CQI, W2 (i21+i22+i23) and L' to an eNB in the third instance.

In the above example, a period of each higher instance may be an integer multiple of a period the next lower instance. For example, a period of the second instance may be an integer multiple of a period of the third instance.

In the case that PTI=0, it is apparent that it may operate in the similar way of proposal A. 4). That is, the difference is that the scheme described in proposal A. 4) above may be applied in the same way in addition to the fact that RI and PTI are fed back in the first instance. For example, when i22 is calculated, it may be premised between an eNB and a UE to apply Equation 11 (i.e., Equation 11 is applied to Equation 10), or the LC codebook considering phase only (or amplitude only) may be used. In addition, an index indicating a size of coefficient applied to the LC is added (e.g., i24), and accordingly, more flexible feedback operation may be performed.

In addition, even in the case that PTI=1, the scheme described in proposal A. 4) above may be identically applied to W2. For example, when i22 is calculated, it may be premised between an eNB and a UE to apply Equation 11 (i.e., Equation 11 is applied to Equation 10), or the LC codebook considering phase only (or amplitude only) may be used.

As another example, in the case that PTI=1, the following operation may be performed.

First instance: RI+PTI=1
Second instance: WB CQI+W2 (i2')
Third instance: SB CQI+W2 (i21+i22+i23)+L'

Herein, i2' represents i2 index (4 bits index including only beam selector and co-phase) of Class A codebook which is a basis of the LC codebook. The example is characterized that WB and SB have codebooks of different units/granularities.

When a UE is configured/applied as such, there is an advantage of reducing complexity in WB reporting. In addition, the methods of proposal A. 3-1), proposal A. 3-2) and proposal A. 3-3) proposed in PUCCH format 2 may be applied to PUCCH format 3 without any change. For example, like the description of proposal A. 3-1), the LC may be configured by considering Phase and Amplitude (or phase only). As another example, like the description of proposal A. 3-2), components of i22 are divided into amplitude and phase components and transmitted in different instances. As another example, like the description of proposal A. 3-3), the use of PTI may be used for the use of indicating amplitude coefficient and phase coefficient.

As described above, since PUCCH format 3 has a greater container size than PUCCH format 2, a UE configured/applied with the LC codebook may be configured/applied to be used with PUCCH format 3 only.

PUCCH format 3 is used for a use that a UE ACK/NACK feedbacks for DL data. A payload size of ACK/NACK is determined by the number of component carriers (CCs) and the number of codewords that are carrier-aggregated (CA).

Here, in order to prevent a collision between CSI and ACK/NACK information of the LC codebook, an eNB may configure by distinguishing PUCCH format 3 for ACK/NACK transmission and PUCCH format 3 for CSI transmission. Further, even in the case that an instance of transmitting ACK/NACK information collides with an instance of transmitting CSI, a UE may transmit the corresponding information simultaneously sing two PUCCH format 3s. In the case that in the entire 22 bits capacity of PUCCH format 3, the spare capacity of PUCCH format 3 except ACK/NACK payload (in the case that SR information is existed, payload size 1 bit of the SR information is also added and calculated) is CSI payload size or greater, the ACK/NACK and the CSI are transmitted through PUCCH format 3. Otherwise, the CSI is not transmitted (i.e., CSI is dropped) but only ACK/NACK is transmitted.

B. Subsampling Method of W1 Codebook

As described above, the LC codebook is newly defined in LTE Rel-14, when PMI is fed back using PUCCH format ⅔, a problem occurs that PMI payload exceeds the maximum transmission capacity.

In order to solve it, the present invention proposes various subsampling techniques of W1 codebook that configures the LC codebook.

W1 (first PMI) is in orthogonal basis, and non-equal combining (using 2 bits) is wideband, and two beam selections are wideband.

First, maximum eight uniform spaced orthogonal beam groups are selected. Next, in the group, two beams are selected.

In the case of W2 (second PMI), beams are combined in W2 using QPSK, and independently encoded for each layer. The LC codebook is represented as Equation 12 below.

$$W_1 = \begin{bmatrix} B & 0 \\ 0 & B \end{bmatrix}, B = \begin{bmatrix} p_0 b_{k_1^{(0)}, k_2^{(0)}}, \ldots, p_{L-1} b_{k_1^{(L-1)}, k_2^{(L-1)}} \end{bmatrix}$$ [Equation 12]

For rank 1: $W = \begin{bmatrix} \tilde{w}_{0,0} \\ \tilde{w}_{1,1} \end{bmatrix} = W_1 W_2$, and $W_2 = \begin{bmatrix} c_{0,0} \\ c_{1,0} \end{bmatrix}$ For rank 2: $W = \begin{bmatrix} \tilde{w}_{0,0} & \tilde{w}_{0,1} \\ \tilde{w}_{1,1} & \tilde{w}_{1,1} \end{bmatrix} = W_1 W_2$, and $W_2 = \begin{bmatrix} c_{0,0} & c_{0,1} \\ c_{1,0} & c_{1,1} \end{bmatrix}$ $c_{r,l} = [c_{r,l,0}, \ldots, c_{r,l,L-1}]^T, r = 0, 1, l = 0, 1$ $\tilde{w}_{r,i} = \sum_{i=0}^{L-1} b_{k_1^{(i)}, k_2^{(i)}} \cdot p_i \cdot c_{r,l,i}; r = 0, 1, l = 0, 1$ In Equation 12, L (=2) is a coefficient of a beam. $b_{k_1,k_2}$ is oversampled grid 2 dimension (2D) DFT beam (herein, $k_1=0, 1, \ldots, N_1O_1-1, k_2=0, 1, \ldots, N_2O_2-1$). Herein, each of $N_1$ and $N_2$ is the number of antenna ports in the first dimension and the second dimension, respectively. Each of $O_1$ and $O_2$ is oversampling factors in the first dimension and the second dimension, respectively. $p_i$ is a beam power adjustment/scaling factor for beam i ($0 \leq p_i \leq 1$). $C_{r,l,i}$ is beam combining coefficient on polarization r and layer l for beam i.

i) W1 Beam Selection $O_1=O_2=4$ (in the case that $N_2=1$, $O_2=1$)

$2N_1N_2 \in \{4, 8, 12, 16, 20, 24, 28, 32\}$

Leading (stronger) beam index: $k_1^\wedge(0)=0, 1, \ldots, N_1O_1-1$; $k_2^\wedge(0)=0, 1, \ldots, N_2O_2-1$ The second (weaker) beam index: $k_1^\wedge(1)=k_1^\wedge(0)+O_1d_1$; $k_2^\wedge(1)=k_2^\wedge(0)+O_2d_2$; $d_1 \in \{0, \ldots, \min(N_1,L_1)-1\}$, $d_2 \in \{0, \ldots, \min(N_2,L_2)-1\}$; $(d_1,d_2) \neq (0,0)$; herein, $L_1$, $L_2$ are defined as below.

In the case that $N_1 \geq N_2$ and $N_2 \neq 1$, $L_1=4, L_2=2$; in the case that $N_1 < N_2$, $N_1 \neq 1$, $L_2=4, L_1=2$; in the case that $N_2=1$, $L_1=8$, $L_2=1$ ii) W1 Beam Power The second beam power is quantized by 2 bits.

$p_0=1$, $p_1 \in \{1, \sqrt{0.5}, \sqrt{0.25}, 0\}$ iii) W2

$c_{0,0,0}=c_{0,1,0}=1$, for all cases $C_{r,l,i} \in \{1, j, -1, -j\}$, $\forall i, r, l$ iv) Codebook Payload In the case that $N_1=N_2=4$, W1 overhead is as represented below, and as represented in Table 26 below when it is arranged for a subband.

Overhead for indicating leading beam: $\lceil \log_2 N_1N_2O_1O_2 \rceil = \lceil \log_2 16 N_1N_2 \rceil = 8$ bit Overhead for indicating second beam:

$$\left\lceil \binom{7}{1} \right\rceil = 3 \text{ bits}$$

Relative power of weaker beam: 2 bits

Table exemplifies W1 and W2 overhead for each Rank for a subband in the case that $N_1=N_2=4$.

TABLE 26

| Rank | W1 (bit) | W2 (bit) |
|---|---|---|
| 1 | 13 | 6 |
| 2 | 13 | 12 |

Referring to Table 26, W1 requires 13 bits regardless of rank as described above, and W2 require 6 bits (i.e., since $c_{0,0,0}=1$, a bit it not required, and each 2 bits for each of $c_{1,0,0}$, $c_{0,0,1}$, $c_{101}$) or 12 bits (i.e., since $c_{0,0,0}=c_{0,1,0}=1$, a bit is not required, and each 2 bits for each of $c_{1,0,0}$, $c_{0,0,1}$, $c_{1,0,1}$, $c_{1,1,0}$, $c_{0,1,1}$, $c_{1,1,1}$). This is because power coefficient is commonly applied regardless of a layer for W1, and co-phase is independently applied for each layer for W2. Particularly, for W2, like the description of embodiment A. above, the phase component of i22 and the co-phase component of i23 are combined and represented as one co-phase component.

Currently, a periodic PUCCH feedback has been used for LTE PMI feedback, and at this time, using PUCCH format 2 (PF2), CSI is encoded by a UE and decoded by an eNB.

PF2 may transmit payload of maximum 11 bits in a normal CP, and this is increased to maximum 13 bits in an extended CP. According to the current standard, when PMI or PMI and other CSI is transmitted simultaneously using PF2, there is a problem the codebook size is too big, and exceeds 11 bits. In order to solve it, codebook subsampling is applied, and accordingly, the size does not exceed 11 bits.

In the present invention, such W1 codebook subsampling technique is proposed.

For the LC codebook supported in Rel-14, up to Rank 2 can be supported, and Rank 1 and Rank 2 use a beam group of the same W1.

In the LC codebook, the components that construct W1 may include a leading beam index, a beam selection and a power combining coefficient.

The following feedback is supported in Class A codebook, in the case of CSI (Periodic CSI; P-SCI) mode 1-1 submode 1.

A single entire report includes three reporting times/instances on PUCCH format 2/2a/2b.

First instance: RI

Second instance: W1

Third instance: CQI+W2

That is, a UE may report RI to an eNB in the first instance, report W1 to an eNB in the second instance, and report CQI and W2 to an eNB in the third instance.

In addition, for the case of PTI=0 of P-CSI mode 2-1 in which Class A codebook is supported, almost similar to P-CSI mode 1-1, W1 is separately reported in the second instance.

Accordingly, the present invention proposes a method for reporting W1 that constructs the LC codebook through submode 1 of P-CSI mode 1-1 or PTI=1 of P-CSI mode 2-1, and particularly, proposes W1 subsampling technique in accordance with 11 bits payload of a normal CP of PUCCH format 2.

Proposal 1) Leading Beam Index Subsampling

In the case of W1 of the LC codebook proposed in Rel-14, a payload size corresponding to a leading beam index corresponds to $\lceil \log_2 N_1 N_2 O_1 O_2 \rceil$. For example, this has a value of 8 bits which is a maximum value in 2D 32-port layout.

As an example for reducing this to 6 bits, a subsampling technique is proposed as represented in Table 27 below.

Table 27 represents a method of exemplifying subsampling for X-port (i.e., cross polarization) antenna.

TABLE 27

| X = 2N1N2 | 1D-layout | 2D-layout |
|---|---|---|
| 4-port | Subsampling is not performed | N/A |
| 8-port | Subsampling is not performed | Subsampling is not performed |
| 12-port | N/A | $O_1 = 4, O_2 = 2$ or $O_1 = 2, O_2 = 4$ |
| 16-port | Subsampling is not performed | |
| 20-port | Subsampling is not performed | $O_1 = 4, O_2 = 1$ or $O_1 = 2, O_2 = 2$ |
| 24-port | Subsampling is not performed | |
| 28-port | Subsampling is not performed | $O_1 = 1, O_2 = 4$ |
| 32-port | Subsampling is not performed | |

As represented in Table 27, for X-port (X>=12) that supports the LC codebook, the subsampling is required for the case of including 2-D layout.

Accordingly, this proposal is characterized that subsampling is performed by configuring/applying oversampling values which are different depending on X value, which is a port number that a UE support the LC codebook.

In addition, it may be configured which $O_1$, $O_2$ combination is used for the purpose of subsampling to a UE by higher layer signaling (e.g., RRC and/or MAC control element (CE)).

As another embodiment, a subsampling method is proposed as represented in Table 28 below, in which $N_1$, $N_2$ values are tied with $O_1$, $O_2$ values.

Table 28 exemplifies ($O_1$, $O_2$) combination for subsampling the LC codebook having $2N_1N_2 \geq 12$.

TABLE 28

| | ($O_1$, $O_2$) |
|---|---|
| $N_1 > N_2$ | (4, 2) for 12-port, 16-port<br>(4, 1) for 20-port, 24-port, 32-port |
| $N_1 < N_2$ | (2, 4) for 12-port, 16-port<br>(1, 4) for 20-port, 24-port, 32-port |
| $N_1 = N_2$ | (2, 2) |

In the case of proposal 1) described above, the subsampling may be independently applied to each port number.

Proposal 2) Second Beam Selection Subsampling

In the LC codebook, for a second beam selection for linear combination, a UE may select one of maximum 7 beams, which is orthogonal to a leading beam based on the leading beam (i.e., a beam corresponding to an index in which superscript is (0) in Equation 13 below). Accordingly, the feedback bit number required for a beam selection is $$\left\lceil \log_2 \binom{7}{1} \right\rceil,$$

and corresponds to maximum 3 bits.

In order to solve it, proposal 2) proposes a method of selecting a second beam (a beam corresponding to an index in which superscript is (1) in Equation 13 below). That is, it is proposed 1 bit second beam selection technique by subsampling a payload of the second beam selection.

FIG. 19 is a diagram illustrating a subsampling method for a second beam selection according to an embodiment of the present invention.

FIG. 19 exemplifies the case that $N_1=4$, $N_2=2$, $O_1=4$, $O_2=4$.

In FIG. 19(a), among seven orthogonal beams with respect to a given leading beam, a UE may select a most preferred second beam.

In the LC codebook, such a beam set is determined as represented in Equation 13 below.

$$k_1^{(1)} = k_1^{(0)} + O_1 d_1$$

$$k_2^{(1)} = k_2^{(0)} + O_1 d_2$$

$$d_1 \in \{0, \ldots, \min(N_1, L_1) - 1\}$$

$$d_2 \in \{0, \ldots, \min(N_2, L_2) - 1\}$$

$$(d_1, d_2) \neq (0, 0) \quad \text{[Equation 13]}$$

Where $L_1$, $L_2$ are defined as:
$N_1 \geq N_2$ and $N_2 \neq 1$
$L_1 = 4$, $L_2 = 2$
If $N_1 < N_2$ and $N_1 \neq 1$
$L_2 = 4$, $L_1 = 2$
If $N_2 = 1$
$L_1 = 8$, $L_2 = 1$ In Equation 13, $k_1^{(0)} = 0, 1, \ldots, N_1 O_1 - 1$, $k_2^{(0)} = 0, 1, \ldots, N_2 O_2 - 1$.

Accordingly, the present proposal proposes a method of reducing a size of orthogonal beam set for selecting a second beam.

In the case of 12-port and 16-port, a payload size of beam selection may be subsampled with 2 bits. Accordingly, for the case of 12-port and 16-port configured/applied with 2D antenna array, various subsampling methods are proposed as shown in FIG. 19(b) to FIG. 19(e).

Proposals 2-1 and 2-2 mean the methods of changing values of $L_1$ and $L_2$ in Equation 13 above.

By using the methods, a size of second beam selection may be reduced to $$\left\lceil \log_2 \binom{3}{1} \right\rceil = 2 \text{ bits.}$$

Proposed method 2-1 is exemplified in FIG. 9(b) and Table 29 below, and proposed method 2-2 is exemplified in FIG. 9(c) and Table 30 below.

Table 29 exemplifies $(L_1, L_2)$ combination for subsampling the LC codebook of $2N_1N_2=12$ and $2N_1N_2=16$.

TABLE 29

|  | $(L_1, L_2)$ |
|---|---|
| $N_1 \geq N_2$, $N_2 \neq 1$ | (2, 2) |
| $N_1 < N_2$, $N_1 \neq 1$ | |

Table 30 exemplifies $(L_1, L_2)$ combination for subsampling the LC codebook of $2N_1N_2=12$ and $2N_1N_2=16$.

TABLE 30

|  | $(L_1, L_2)$ |
|---|---|
| $N_1 \geq N_2$, $N_2 \neq 1$, $k_2^{(0)} = k_2^{(1)}$ | (4, 1) |
| $N_1 < N_2$, $N_1 \neq 1$, $k_1^{(0)} = k_1^{(1)}$ | (1, 4) |

For proposed method 2-2, in the case that a component that constructs a channel is more dependent upon a specific side domain (e.g., a first domain and a second domain), that is, in the case that the angular spread is greater for a domain at one side, there may be characteristics that an orthogonal basis is configured only with the specific domain.

However, in the case of 12-port, considering that the number of maximum orthogonal bases are 3, a second beam selection corresponds to $$\left\lceil \log_2 \binom{2}{1} \right\rceil = 1 \text{ bit,}$$

and thus, the performance may be degraded. In addition, for proposals 2-1 and 2-2, a second beam selection is selected among three beams, and accordingly, one state may be wasted.

Accordingly, in order to solve this, proposal 2-3 and proposal 2-4 propose a beam selection method of selecting a second beam among four orthogonal beams.

Proposed method 2-3 is exemplified in FIG. 9(d) and Table 31 below.

Table 31 exemplifies $(d_1, d_2)$ combination for subsampling the LC codebook of $2N_1N_2=12$ and $2N_1N_2=16$.

TABLE 31

|  | For 12-port, $(d_1, d_2)$ | For 16-port, $(d_1, d_2)$ |
|---|---|---|
| $N_1 \geq N_2$, $N_2 \neq 1$ | (1, 0), (2, 0), (0, 1) | (1, 0), (2, 0), (3, 0), (0, 1) |
| $N_1 < N_2$, $N_1 \neq 1$ | (0, 1), (0, 2), (1, 0) | (0, 1), (0, 2), (0, 3), (1, 0) |

However, even in proposed method 2-3, in the case of 12-port, a second beam is still selected among three beams. In order to prevent this, proposed method 2-4 is exemplified in FIG. 9(e) and Table 32 below.

Table 32 exemplifies $(d_1, d_2)$ combination for subsampling the LC codebook of $2N_1N_2=12$ and $2N_1N_2=16$.

TABLE 32

|  | $(d_1, d_2)$ |
|---|---|
| $N_1 \geq N_2$, $N_2 \neq 1$ | (1, 0), (2, 0), (0, 1), (1, 1) |
| $N_1 < N_2$, $N_1 \neq 1$ | (0, 1), (0, 2), (1, 0), (1, 1) |

The method of orthogonal beam selection arranged in Tables 29, 30, 31 and 32 above may be independently applied according to each port number.

In the case that a leading beam index and a second beam selection are joint-encoded for 12-port, subsampling may not be required.

FIG. 20 is a diagram illustrating a subsampling method for a second beam selection according to an embodiment of the present invention.

FIG. 20 exemplifies the case that $N_1=3$, $N_2=2$, $O_1=4$, $O_2=4$.

As shown in FIG. 20, a second beam selection is selected among five beam candidates, and accordingly, a bit size for the second beam selection corresponds to $$\left\lceil \log_2 N_1 N_2 O_1 O_2 + \log_2 \binom{5}{1} \right\rceil = \left\lceil \log_2 6 * 4 * 4 * \binom{5}{1} \right\rceil = 9 \text{ bit.}$$

Accordingly, even in the case of considering a power combining coefficient 2 bits, this corresponds to total 11 bits, and thus, subsampling is not required.

Therefore, in the case of 12-port, it is preferable that a leading beam index and a second beam selection are joint-encoded.

Next, 20-port, 24-port, 28-port and 32-port are described.

First, the case is described that the components (i.e., a leading beam index, a second beam selection and a power combining coefficient) that construct W1 are independently encoded, not joint-encoded.

In this case, since a bit number occupied by a leading beam index is 8 bits and a bit number occupied by a power combining is 2 bits, in the case of a second beam selection, subsampling of 1 bit is required.

In this case, the proposed various subsampling methods are arranged in FIG. 21 and Table 33.

FIG. 21 is a diagram illustrating a subsampling method for a second beam selection according to an embodiment of the present invention.

FIG. 21 exemplifies the case that $N_1=4$, $N_2=4$, $O_1=4$, $O_2=4$.

Table 33 exemplifies ($d_1$, $d_2$) combination for subsampling the LC codebook of $2N_1N_2>16$.

TABLE 33

| | ($d_1$, $d_2$) | | | |
|---|---|---|---|---|
| | Proposal 2-5 | Proposal 2-6 | Proposal 2-7 | Proposal 2-8 |
| $N_1 \geq N_2$, $N_2 \neq 1$ | (1, 0), (0, 1) | (1, 0), (1, 1) | (1, 0), (2, 0) | (1, 0), (3, 0) |
| $N_1 < N_2$, $N_1 \neq 1$ | | (0, 1), (1, 1) | (0, 1), (0, 2) | (0, 1), (0, 3) |

In the case that a leading beam index and a second beam selection are joint-encoded, the number of beam candidates that construct subsampling of a required second beam selection for each port may be changed as below.

For 20-port, a performance may be more improved by performing 3-beam subsampling (e.g., proposal 2-1 or proposal 2-2), not 2-beam subsampling shown in FIG. 21. That is, a second beam selection may be subsampled with a bit size, $$\left\lceil \log_2 N_1 N_2 O_1 O_2 + \log_2 \binom{3}{1} \right\rceil = \left\lceil \log_2 10 * 4 * 4 * \binom{3}{1} \right\rceil = 9 \text{ bit.}$$

Table 34 below enumerates the number of second beam candidates required when performing subsampling for a second beam selection in 2D port layout in which subsampling is required, and represents numbers of the case of joint-encoding and independently encoding a leading beam selection and a second beam selection. Here, the example of second beam candidates corresponding to each number may include the examples of FIG. 19 to FIG. 21.

In addition, it may be configured which value/pattern of second beam candidates is used for the purpose of subsampling to a UE by higher layer signaling (e.g., RRC and/or MAC CE).

Table 34 exemplifies a maximum number of second beam candidates for 2D X-port layout.

TABLE 34

| X | Joint encoding | Independent encoding |
|---|---|---|
| 12-port | Subsampling is not performed | 4 |
| 16-port | 4 | 4 |
| 20-port | 3 | 2 |
| 24-port | 2 | 2 |
| 28-port | 2 | 2 |
| 32-port | 2 | 2 |

Proposal 3) Power Combining Coefficient Index Subsampling

In the LC codebook, a power coefficient of a second beam is $p_1 \in \{1, \sqrt{0.5}, \sqrt{0.25}, 0\}$, and has a payload size of 2 bits. In order to match W1 payload with 11 bits using only Power coefficient subsampling, 1 bit payload may be used for 12-port and 16-port, and 0 bit payload may be used for 20-port, 24-port, 28-port and 32-port.

1 bit payload size is configured with $p_1 \in \{1, 0\}$, and may be used for on-off of a coupled beam. For example, in the case that p1=0, the LC codebook operates with Class A codebook Config1, and in the case that p1=1, the LC codebook operates with phase-only LC codebook.

As another example, it may be configured to operate with $p_1 \in \{1, \sqrt{0.5}\}$. In this case, both of two beams participating in a coupling progress coupling with a (non-zero) specific amplitude value, it may be more beneficial in multi-path environment.

For the cases of 20-port, 24-port, 28-port and 32-port, in order to match 0 bit payload, it may be configured to operate with phase-only LC by configuring/applying 1 as a second beam power.

Alternatively, it may be configured which value of p1 or p1 combination is used for the purpose of subsampling to a UE by higher layer signaling (e.g., RRC and/or MAC CE).

Proposal 4) Combination of Proposals 1 to 3

In the case that proposals 1-3 are used separately, subsampling of a specific factor applies excessively, and a performance of the LC codebook may be degraded.

Accordingly, the present proposal proposes a method for mating a payload size of W1 with 11 bits by performing subsampling with a combination of the proposed methods.

In the case of 12-port and 16-port, only 1 bit subsampling is required, and thus, proposal 1, proposal 2 or proposal 3 described above may be applied separately.

Proposal 4-1) Proposal 1+Proposal 2

In the case of 2D antenna layout 20-port, 24-port, 28-port and 32-port, a method for configuring subsampling is as represented in Table 35 below.

Table 35 exemplifies subsampling for $2N_1N_2>16$.

TABLE 35

| | ($O_1$, $O_2$) | Maximum number of second beam candidates |
|---|---|---|
| $N_1 \geq N_2$ | (4, 2) | 4 |
| $N_1 < N_2$ | (2, 4) | 4 |

In Table 35, the maximum number of second beam candidates may include the example of proposals 2-1, 2-2, 2-3 and 2-4.

Proposal 4-2) Proposal 1+Proposal 3

In the case of 2D antenna layout 20-port, 24-port, 28-port and 32-port, a method for configuring subsampling is as represented in Table 36 below.

Table 36 exemplifies subsampling for $2N_1N_2>16$.

TABLE 36

|  | $(O_1, O_2)$ | Number of Second beam power coefficients |
|---|---|---|
| $N_1 \geq N_2$ | (4, 2) | 2 |
| $N_1 < N_2$ | (2, 4) | 2 |

In Table 36, the number of second beam power coefficients may include the example of $p_1 \in \{1, \sqrt{0.5}\}$ or $p_1 \in \{1, 0\}$ corresponding to proposal 3 described above.

Proposal 4-3) Proposal 2+Proposal 3

In the case of 2D antenna layout 20-port, 24-port, 28-port and 32-port, a method for configuring subsampling is as represented in Table 37 below.

Table 37 exemplifies subsampling for $2N_1N_2 > 16$.

TABLE 37

| Maximum number of second beam candidates | Number of Second beam power coefficients |
|---|---|
| 4 | 2 |

In Table 37, the maximum number of second beam candidates may include the example of proposals 2-1, 2-2, 2-3 and 2-4. In addition, the number of second beam candidates may include the example of $p_1 \in \{1, \sqrt{0.5}\}$ or $p_1 \in \{1, 0\}$ corresponding to proposal 3 described above.

Proposal 4-4) Proposal 1+Proposal 2+Proposal 3

The case of proposal 4-4 corresponds to the case that all or two of a leading beam index, a second beam selection and a power coefficient are joint-encoded. Examples of proposal 4-4 are arranged in Table 38 below.

Table 38 exemplifies subsampling for $2N_1N_2 > 16$.

TABLE 38

|  |  | $(O_1, O_2)$ | Maximum number of second beam candidates | Number of Second beam power coefficients |
|---|---|---|---|---|
| 20-port | $N_1 \geq N_2$ | (4, 2) | 6 (or 7) | 4 (or 3) |
|  | $N_1 < N_2$ | (2, 4) |  |  |
| 24-port | $N_1 \geq N_2$ | (4, 2) | 7 | 3 |
|  | $N_1 < N_2$ | (2, 4) |  |  |
| 28-port | $N_1 \geq N_2$ | (4, 2) | 6 | 3 |
|  | $N_1 < N_2$ | (2, 4) |  |  |
| 32-port | $N_1 \geq N_2$ | (4, 2) | 5 | 3 |
|  | $N_1 < N_2$ | (2, 4) |  |  |

In Table 38, the case that the number of second beam candidates is 7 and the case that the number of second beam candidates is 4 correspond to the case that the corresponding factor is not subsampled.

In the cases that the number of second beam candidates is 6 and 5, the beam patterns shown in FIG. 22 and FIG. 20 may be considered, respectively.

FIG. 22 is a diagram illustrating subsampling for a second beam selection including 6 beams according to an embodiment of the present invention.

FIG. 22 exemplifies the case that $N_1=4$ (or 3), $N_2=2$, $O_1=4$, $O_2=4$, for the convenience of description, but apparently, the corresponding beam patterns may be extendedly applied to other $N_1$ and $N_2$ values.

In addition, the case that a second beam power coefficient is 3 may include $p_1 \in \{1, \sqrt{0.5}, 0\}$.

The proposed method above corresponds to the invention for a method of subsampling with 11 bits in the case of reporting W1 separately.

However, since subsampling causes performance degradation, a new reporting type may be defined as one of a method of avoiding subsampling. That is, it may be assumed that the components constructing W1 are divided into W11, W12 and W13, which are indexes corresponding to a leading beam index, a second beam selection and a power coefficient, respectively.

That is, the leading beam index (i.e., W11) indicating a leading beam (i.e., codeword) used in the LC, the second beam selection (i.e., W12) indicating a second beam (i.e., codeword) used in the LC, the power coefficient (i.e., W13) indicating a power applied to each beam when performing the LC, and the phase coefficient (i.e., W2) indicating a phase applied to each beam when performing the LC may be reported to an eNB in different CSI reporting times/instances independently.

According to an embodiment of the present invention, P-CSI mode 1-1 submode 1 modified for the LC is as below.

First instance: RI+W13
Second instance: W11+W12
Third instance: CQI+W2

A UE may report RI and W13 to an eNB in the first instance, report W11 and W12 to an eNB in the second instance, and report CQI and W2 to an eNB in the third instance.

In the above example, a period of each higher instance may be an integer multiple of a period the next lower instance. For example, a period of the second instance may be an integer multiple of a period of the third instance.

Alternatively, P-CSI mode 1-1 submode 1 modified for the LC is as below.

First instance: RI+W12
Second instance: W11+W13
Third instance: CQI+W2

A UE may report RI and W12 to an eNB in the first instance, report W11 and W13 to an eNB in the second instance, and report CQI and W2 to an eNB in the third instance.

In the above example, a period of each higher instance may be an integer multiple of a period the next lower instance. For example, a period of the second instance may be an integer multiple of a period of the third instance.

Alternatively, P-CSI mode 1-1 submode 1 modified for the LC is as below.

First instance: RI+W11
Second instance: W12+W13
Third instance: CQI+W2

A UE may report RI and W11 to an eNB in the first instance, report W12 and W13 to an eNB in the second instance, and report CQI and W2 to an eNB in the third instance.

In the above example, a period of each higher instance may be an integer multiple of a period the next lower instance. For example, a period of the second instance may be an integer multiple of a period of the third instance.

In the method described above, a new reporting type (e.g., type 5a, RI+W13 or RI+W12 or RI+W11) may be considered. Among the methods, for more secure protection of RI, W13 is more preferable as a factor joint-encoded with RI.

As a modified example of the method described above,
First instance: RI+W11
Second instance: W12+W13+W22 (or W21)
Third instance: CQI+W21 (or W22)

A UE may report RI and W11 to an eNB in the first instance, report W12+W13 and W22 (or W21) to an eNB in the second instance, and report CQI and W21 (or W22) to an eNB in the third instance.

In the above example, a period of each higher instance may be an integer multiple of a period the next lower instance. For example, a period of the second instance may be an integer multiple of a period of the third instance.

In the above example, W21 represents PMI of layer 1 in the case of Rank 1, and W22 represents PMI of layer 2 in the case of Rank 2.

Here, each of W21 and W22 may have a payload of 6 bits on the LC codebook configuration. In this case, since RI is 3 bits, W11 may have 8-bit payload, and subsampling may be applied to reduce 1 bit, as in the embodiment of $O_1=4$, $O_2=2$, and the like for the X-port that exceeds 16-port.

In the case of the second instance, there are total 10 bits as 2 bits+2 bits+6 bits, and thus, subsampling is not required. In the case of the second instance, there are total 10 bits in Rank 1, and thus, subsampling is not required. However, in Rank 2, subsampling is required with 4-bit by reducing 2 bits.

There may be various methods for reducing 2 bits, for example, 2 bits may be reduced by removing one value among three of Phase combining coefficients $c_{r,l,i} \in \{1, j, -1, -j\}$, $r \in \{0,1\}$, $l \in \{0,1\}$, $i \in \{0,1\}$ when configuring the LC codebook. Herein, r represents an index for distinguishing X-pol antennas, l is an index for distinguishing layers, and i represents an index for distinguishing a beam order of combining.

As a more particular example, it may be configured that only the co-phase role of the LTE codebook is performed by configuring $c_{1,0,i} = -c_{1,1,i}$.

Alternatively, generality is not lost, and the final Rank 2 codebook may be determined as Equation 14 below.

$$\begin{bmatrix} b_1 + c_{0,0,1}*p_1*b_2 & b_1 + c_{0,1,1}*p_1*b_2 \\ c_{1,0,0}*b_1 + c_{1,0,1}*p_1*b_2 & c_{1,1,0}*b_1 + c_{1,1,1}*p_1*b_2 \end{bmatrix}$$ [Equation 14]

In addition, in this case, as a method, W2 structure may be used as in Class A. In other words, $c_{0,0,1}$ may have QPSK alphabet (i.e., 1, j, -1, -j), and it may be that $c_{1,0,0} \in \{1,j\}$ and, $a \in \{1,j\}$. And, other values may be determined such as $c_{1,0,1} = c_{1,0,0}*c_{0,0,1}$, $c_{0,1,1} = a*c_{0,0,1}$, $c_{1,1,0} = -c_{1,0,0}$, $c_{1,1,1} = -a*c_{1,0,0}*c_{0,0,1} = -a*c_{1,0,1}$.

The final Rank 2 codebook for this case is as represented in Equation 15 below.

$$\begin{bmatrix} b_1 + c_{0,0,1}*p_1*b_2 & b_1 + a*c_{0,0,1}*p_1*b_2 \\ c_{1,0,0}(b_1 + c_{0,0,1}*p_1*b_2) & -c_{1,0,0}(b_1 + a*c_{0,0,1}*p_1*b_2) \end{bmatrix}$$ [Equation 15]

According to Equation 15, the final W2 payload size for Rank 2 is 4 bits.

In such a way, the orthogonality between two layers may be guaranteed. In addition, the same beam may be used for both of H-slant and V-slant, and co-phase may be controlled by $c_{1,0,0}$. Further, $a \in \{1,j\}$ determines whether a result of two beams per polarization is the same or different. In such a way, W2 subsampling may be considered.

In describing in more detail by exemplifying Equation 15, in the case of Rank 2, a precoding matrix may include a first precoding vector (i.e., $$\begin{bmatrix} b_1 + c_{0,0,1}*p_1*b_2 \\ c_{1,0,0}(b_1 + c_{0,0,1}*p_1*b_2) \end{bmatrix})$$

for a first layer and a second precoding vector (i.e., $$\begin{bmatrix} b_1 + a*c_{0,0,1}*p_1*b_2 \\ -c_{1,0,0}(b_1 + a*c_{0,0,1}*p_1*b_2) \end{bmatrix})$$

for a second layer.

In addition, the first precoding vector may include a vector (i.e., $[b_1+c_{0,0,1}*p_1*b_2]$) which is a linear combination of a first codeword (i.e., $[b_1]$) and a second codeword (i.e. $[c_{0,0,1}*p_1*b_2]$) for a first polarization, and a vector (i.e., $[c_{1,0,0}(b_1+c_{0,0,1}*p_1*b_2)]$) which is a linear combination of a third codeword (i.e., $[c_{1,0,0}*b_1]$) and a fourth codeword (i.e. $[c_{1,0,0}*c_{0,0,1}*p_1*b_2]$) for a second polarization.

Further, the second precoding vector may include a vector (i.e., $[b_1+a*c_{0,0,1}*p_1*b_2]$) which is a linear combination of a fifth codeword (i.e., $[b_1]$) and a sixth codeword (i.e., $[a*c_{0,0,1}*p_1*b_2]$) for a first polarization, and a vector (i.e., $[-c_{1,0,0}*a*c_{0,0,1}*p_1*b_2]$) which is a linear combination of a seventh codeword (i.e., $[-c_{1,0,0}*b_1]$) and a eighth codeword (i.e., $[-c_{1,0,0}*a*c_{0,0,1}*p_1*b_2]$) for a second polarization.

At this time, a phase coefficient may be predefined as 1, which is applied to a codeword (i.e., the first codeword $[b_1]$ and the fifth codeword $([b_1])$) corresponding to a leading beam in the precoding vector (i.e., the first precoding vector and the second precoding vector) for each layer.

In addition, for example, the phase coefficient (i.e., $c_{0,0,1}$) may be indicated by 2 bits (e.g., QPSK alphabet (i.e., 1, j, -1, -j), which is applied to the codeword (e.g., the second codeword $([c_{0,0,1}*p_1*b_2])$) corresponding to one of beams among second beams in the precoding vector (i.e., the first precoding vector and/or the second precoding vector) for each layer. That is, a value of phase coefficient applied to the codeword corresponding to one of beams among second beams in the precoding vector for each layer may be determined by the second PMI within $\{1, j, -1, -j\}$.

Furthermore, each the phase coefficients (i.e., $c_{1,0,0}$ and a) may be indicated by 1 bit (e.g., $\{1, j\}$), which are applied to the codeword (e.g., third codeword $([c_{1,0,0}*b_1])$ and the sixth codeword $([a*c_{0,0,1}*p_1*b_2])$) corresponding to two beams among second beams in the precoding vector (i.e., the first precoding vector and/or the second precoding vector) for each layer. That is, the phase coefficient applied to the codeword corresponding to two beams among second beams in the precoding vector for each layer may be determined by the second PMI within two elements (e.g., $\{1, j\}$).

In summary, the phase coefficient may be indicated by 2 bits (e.g., QPSK alphabet (i.e., 1, j, -1, -j) of W2, which is applied to the codeword corresponding to one of beams among second beams except a leading beam. In addition, each of the phase coefficients applied to the codeword corresponding to two beams among second beams may be indicated by 1 bit of W2. The phase coefficient applied to the codeword corresponding to the except the remaining second beam may be determined by combining the phase coefficients applied to the three second beams according to a predetermined rule. In such a way, W2 is subsampled, and there is an effect of reducing bits of W2 into 4 bits, totally.

Here, as an example of the predetermined rule, the phase coefficient value ($c_{1,0,0}*c_{0,0,1}$) applied to the fourth codeword may be determined based on the phase coefficient value ($c_{1,0,0}$) applied to the third codeword. Likewise, the phase coefficient value ($-c_{1,0,0}*a*c_{0,0,1}$) applied to the eighth codeword may be determined based on the phase coefficient value ($-c_{1,0,0}$) applied to the seventh codeword. For example, each of the phase coefficient values applied to the fourth codeword and the eighth codeword may be determined by a product of the phase coefficient values applied to the third codeword and the seventh codeword and the values predetermined by the second PMI.

As another example, the phase coefficient value $(-c_{1,0,0})$ applied to the seventh codeword may be the same as a value of the phase coefficient value $(c_{1,0,0})$ applied to the third codeword multiplied by $-1$.

Particularly, the higher performance may be attained when all of polarizations have a span of the same unit/granularity, and the phase coefficient of a first beam for a first polarization is fixed to 1 for each layer, and accordingly, the phase coefficient of a second beam for a first polarization of each layer may have QPSK alphabet (i.e., 1, j, $-1$, $-j$). In addition, each of phase coefficients of the first beam and the second beam for a second polarization of each layer is indicated by 1 bit, and there is an effect of having QPSK phase coefficient even for the second polarization.

For more secure protection of RI, the following modified example may be considered.

First instance: RI+W12+W13
Second instance: W11+W22 (or W21)
Third instance: CQI+W21 (or W22)

A UE may report RI, W12 and W13 to an eNB in the first instance, report W12+W13 and W22 (or W21) to an eNB in the second instance, and report CQI and W21 (or W22) to an eNB in the third instance.

In the above example, a period of each higher instance may be an integer multiple of a period the next lower instance. For example, a period of the second instance may be an integer multiple of a period of the third instance.

In this case, as an example of subsampling, similar to the method described above (e.g., removing one value of Phase combining coefficients), W22 (or W21) may be reduced to 4 bits.

In addition, by using the method described above (e.g., applying subsampling for reducing by 1 bit as the example of $O_1=4$, $O_2=2$, etc. for X-port that exceeds 16-port), W11 may be reduced to 7 bits.

Further, for more secure protection of RI, by adding one instance, the following modified example may be considered.

First instance: RI
Second instance: W11
Third instance: W12+W13+W22 (or W21)
Fourth instance: CQI+W21 (or W22)

A UE may report RI to an eNB in the first instance, report W11 to an eNB in the second instance, report W12+W13 and W22 (or W21) in the third instance, and report CQI and W21 (or W22) to an eNB in the fourth instance.

In the above example, a period of each higher instance may be an integer multiple of a period the next lower instance. For example, a period of the second instance may be an integer multiple of a period of the third instance.

Like the examples described above, a new reporting type in which W1 and W2 are combined may be defined. In the modified example described above, a new reporting type should be defined, and a UE may transmit by presuming the third instance and the fourth instance as alternative relation. That is, the third instance and the fourth instance may be transmitted alternately with the same period/offset.

In addition, the following modified example may be considered.

First instance: RI
Second instance: W1
Third instance: W2 (or CQI)
Fourth instance: CQI (or W2)

A UE may report RI to an eNB in the first instance, report W1 to an eNB in the second instance, report W2 (or CQI) in the third instance, and report CQI (or W2) to an eNB in the fourth instance.

In the above example, a period of each higher instance may be an integer multiple of a period the next lower instance. For example, a period of the second instance may be an integer multiple of a period of the third instance.

The example is an embodiment including four reporting instances, and in this case, since the attributes of the third and fourth CSIs are similar, the third instance and the fourth instance correspond to alternative relation with each other. Accordingly, the third instance and the fourth instance may be transmitted alternately with the same period/offset.

Similar to the method described above, a new reporting type (e.g., type 6a, RI+PTI+W13 or RI+PTI+W12) is defined and operates as below even in P-CSI mode 2-1.

In the case of P-CSI mode 2-1 PTI=0, the following reporting operation may be performed.

First instance: RI+PTI=0+W13
Second instance: W11+W12
Third instance: CQI+W2

A UE may report RI and PTI to an eNB in the first instance. In addition, in the case that PTI=0, a UE may report W11 and W12 to an eNB in the second instance, and report CQI and W2 to an eNB in the third instance.

In the above example, a period of each higher instance may be an integer multiple of a period the next lower instance. For example, a period of the second instance may be an integer multiple of a period of the third instance.

Alternative, in the case of P-CSI mode 2-1 PTI=0, the following reporting operation may be performed.

First instance: RI+PTI=0+W12
Second instance: W11+W13
Third instance: CQI+W2

A UE may report RI, PTI and W12 to an eNB in the first instance. In addition, in the case that PTI=0, a UE may report W11 and W13 to an eNB in the second instance, and report CQI and W2 to an eNB in the third instance.

In the above example, a period of each higher instance may be an integer multiple of a period the next lower instance. For example, a period of the second instance may be an integer multiple of a period of the third instance.

In the method, for PTI, it is promised between an eNB and a UE such that only PTI=0 is applied always, and may operate without PTI 1 bit payload.

Meanwhile, in the case of Class A so far, the embodiments for the case that the LC codebook is configured are described. Even in Class B, the LC codebook may operate. In this case, since the number of ports which is supported to the maximum is 8, the embodiment for the case that $N_1 N_2=4$ or 8 will be described. In the case that the LC is used for 4-port and 8-port, the maximum payload size is as represented in Table 39 below.

Table 39 exemplifies a payload size for the LC for $2N_1 N_2=4, 8$.

TABLE 39

| | Leading beam selection (bit) | Second beam selection (bit) | Power coefficient (bit) | Maximum payload |
|---|---|---|---|---|
| 4-port | 3 ($N1 = 2, O1 = 4$) | 0 | 2 | 5 bits |
| 8-port (1D layout) | 4 ($N1 = 4, O1 = 4$) | 2 (i.e., $\begin{pmatrix} 3 \\ 1 \end{pmatrix}$) | 2 | 8 bits |

TABLE 39-continued

| | Leading beam selection (bit) | Second beam selection (bit) | Power coefficient (bit) | Maximum payload |
|---|---|---|---|---|
| 8-port (2D layout) | 6 (N1 = 2, N2 = 2, O1 = 4, O2 = 4) | 2 (i.e., $\binom{3}{1}$) | 2 | 10 bits |

As known from the payload size exemplified in Table 39, when PUCCH format 2 is used, in the case that W1 is separately reported, which does not exceed 11 bits, and this does not cause a problem. Accordingly, when the LC is used in Class B, P-CSI mode 1-1 submode 1 and P-CSI mode 2-1 supported in Class A may be configured/applied as below.

i) P-CSI Mode 1-1 Submode 1

A single entire report includes three reporting times/instances on PUCCH format 2/2a/2b.

First instance: RI or RI+CRI
Second instance: W1
Third instance: CQI+W2

That is, a UE may report RI (or RI and CRI) to an eNB in the first instance, report W1 to an eNB in the second instance, and report CQI and W2 to an eNB in the third instance.

In the above example, a period of each higher instance may be an integer multiple of a period the next lower instance. For example, a period of the second instance may be an integer multiple of a period of the third instance.

ii) P-CSI Mode 2-1, PTI=0

First instance: RI+PTI=0 or RI+PTI=0+CRI
Second instance: W1
Third instance: CQI+WB W2

A UE may report RI and PTI (or RI, PTI and CRI) to an eNB in the first instance. In the case that PTI=0, a UE may report W1 to an eNB in the second instance, and report CQI and WB W2 to an eNB in the third instance.

In the above example, a period of each higher instance may be an integer multiple of a period the next lower instance. For example, a period of the second instance may be an integer multiple of a period of the third instance.

iii) P-CSI Mode 2-1 PTI=1

First instance: RI+PTI=0 or RI+PTI=1+CRI
Second instance: WB CQI+W2
Third instance: SB CQI+W2+L'

A UE may report RI and PTI (or RI, PTI and CRI) to an eNB in the first instance. In the case that PTI=1, a UE may report WB CQI and W2 to an eNB in the second instance, and report SB CQI, W2 and L' to an eNB in the third instance.

In the above example, a period of each higher instance may be an integer multiple of a period the next lower instance. For example, a period of the second instance may be an integer multiple of a period of the third instance.

Here, L' is a subband (SB) selection index of a bandwidth part (BP). In the case that PTI=1, W2 payload is 6 bits for Rank 1 and 12 bits for Rank 2 regardless of port number, and accordingly, a UE configured with the LC codebook may apply P-CSI mode 2-1 by assuming that PTI=0 always.

In addition, as Class B is a legacy operation, the case that P-CSI mode 1-1 submode 1 is applied in the second reporting instance as below.

A single entire report includes two reporting times/instances on PUCCH format 2/2a/2b.

First instance: RI+W1 or RI+CRI+W1
Second instance: CQI+W2

That is, a UE may report RI and W1 (or RI, CRI and W1) to an eNB in the first instance, and report CQI and W2 to an eNB in the second instance.

In the above example, a period of each higher instance may be an integer multiple of a period the next lower instance. For example, a period of the first instance may be an integer multiple of a period of the second instance.

Considering that RI=3 bits and CRI=3 bits, since payload of W1 is 5 bits for 4-port, this satisfies a payload size of 11 bits. Accordingly, the legacy P-CSI mode 1-1 may be used in the same way.

First, the case of RI+W1 is described. This case may be a case that a reporting type in which CRI is separately reported is newly defined, or restricted to the case that K=1.

In the former case, modified P-CSI mode 1-1 is as below.

A single entire report includes three reporting times/instances on PUCCH format 2/2a/2b.

First instance: CRI
Second instance: RI+W1
Third instance: CQI+W2

That is, a UE may report CRI to an eNB in the first instance, report RI and W1 to an eNB in the second instance, and report CQI and W2 to an eNB in the third instance.

In the above example, a period of each higher instance may be an integer multiple of a period the next lower instance. For example, a period of the second instance may be an integer multiple of a period of the third instance.

In the case of 1D-layout, the payload size is 8 bit, and accordingly, subsampling is not required.

On the other hand, it is joint-encoded with RI+W1 in 2D 8-port, subsampling may be applied by a method exemplified in Table 40 below.

Class B may also be distinguished into leading beam selection subsampling, second beam selection subsampling and power coefficient subsampling, as described above, and the case of reducing 2 bits using the three factors is as represented in Table 40 below.

In the case of subsampling of a second beam selection, the case that the maximum number of second beam candidates is 3 is the same as the beam pattern of proposal 2-1, and the case that the maximum number of second beam candidates is 2 may include the example of proposal 2-5 or 2-6. In addition, the case that the maximum number of second beam candidates is 1 that a specific second beam is selected in the beam pattern of proposal 2-1, which may be promised between an eNB and a UE in advance.

The power coefficient may also include the example of $p_1 \in \{1, \sqrt{0.5}\}$ or $p_1 \in \{1, 0\}$ in the case that the number of the Second beam power coefficients is 2, corresponding to the case that subsampling is not performed when the number of the Second beam power coefficients is 4. In the case that the number of the Second beam power coefficients is 1, it may be promised with a specific second beam power value (e.g., 1) between an eNB and a UE, or configured to a UE by higher layer signaling (e.g., RRC or MAC CE).

Table 40 exemplifies a payload size of the LC for $2N_1N_2=8$.

TABLE 40

| | $(O_1, O_2)$ | Maximum number of second beam candidates | Number of Second beam power coefficients |
|---|---|---|---|
| $N_1 = N_2$ | (4, 4) | 2 | 2 |
| | | 1 | 4 |
| | | 3 | 1 |

TABLE 40-continued

| ($O_1$, $O_2$) | Maximum number of second beam candidates | Number of Second beam power coefficients |
|---|---|---|
| (4, 2) | 2 | 4 |
|  | 3 | 2 |
| (4, 1) | 3 | 4 |

When RI (3 bits)+CRI (3 bits)+W1 (5 bits) are reported together in the legacy P-CSI mode 1-1 submode 1, in the case of 1D layout, 3 bits needs to be reduced, and in the case of 2D layout, 5 bits needs to be reduced.

The subsampling method for this is exemplified in Table 41 below.

Similar to Table 40, in the case of subsampling of a Second beam selection, when the maximum number of second beam candidates is 3, Table 41 is the same as the beam pattern of proposal 2-1, and when the maximum number of second beam candidates is 2, Table 41 may include the example of proposal 2-5 or 2-6. Further, when the maximum number of second beam candidates is 1, it may be promised in advance that a specific one second beam is selected within the beam pattern of 2-1.

The power coefficient may also include the example of $p_1 \in \{1, \sqrt{0.5}\}$ or $p_1 \in \{1, 0\}$ in the case that the number of the Second beam power coefficients is 2, corresponding to no-subsampling when the number of the Second beam power coefficients is 4. In the case that the number of the Second beam power coefficients is 1, it may be promised with a specific second beam power value (e.g., 1) between an eNB and a UE, or configured to a UE by higher layer signaling (e.g., RRC or MAC CE).

Table 41 exemplifies a payload size of the LC for $2N_1N_2 = 8$ and CRI=3.

TABLE 41

|  | ($O_1$, $O_2$) | Maximum number of second beam candidates | Number of Second beam power coefficients |
|---|---|---|---|
| $N_1 > N_2$ | (4, 1) | 2 | 1 |
|  |  | 1 | 2 |
|  | (2, 1) | 3 | 1 |
|  |  | 1 | 4 |
|  |  | 2 | 2 |
| $N_1 = N_2$ | (4, 2) | 1 | 1 |
|  | (2, 2) | 2 | 1 |
|  | or (4, 1) | 1 | 2 |
|  | (2, 1) | 3 | 1 |
|  |  | 1 | 4 |
|  |  | 2 | 2 |

In the case that 8-port LC codebook is applied to Class B, an application to eight CSI resources requires excessively high payload considering payloads of W1 and W2. Accordingly, it is proposed that the number of maximum resources K to which the LC is applied in Class B is limited to a specific number (e.g., K=2). Then, CRI=1 bit is applied, and subsampling of W1 required in this case is as represented in Table 42 below.

TABLE 42

|  | ($O_1$, $O_2$) | Maximum number of second beam candidates | Number of Second beam power coefficients |
|---|---|---|---|
| $N_1 > N_2$ | (4, 1) | 2 | 4 |
|  |  | 3 | 2 |
|  | (2, 1) | 3 | 4 |

TABLE 42-continued

|  | ($O_1$, $O_2$) | Maximum number of second beam candidates | Number of Second beam power coefficients |
|---|---|---|---|
| $N_1 = N_2$ | (4, 2) | 2 | 2 |
|  |  | 3 | 1 |
|  |  | 1 | 4 |
|  | (2, 2) | 3 | 2 |
|  | or (4, 1) | 2 | 4 |
|  | (4, 4) | 2 | 1 |
|  |  | 1 | 2 |

When PUCCH format 3 (PF3) is used, even in the case of using the LC codebook, since the maximum payload size is 22 bits, W1 is 13 bits and W2 is 6 bits (for Rank 1) and 12 bits (for Rank 2).

However, since PUCCH format 3 is used for ACK/NACK feedback for DL data, the information corresponding to ACK/NACK and the CSI information of the LC codebook need to be joint-encoded. Since the payload size of ACK/NACK is determined based on the number of component carriers (CCs) that are carrier-aggregated (CA), the number of codewords, and the like, rather than use of PF3 for all cases, when PF3 is used only for transmitting a report type of which payload size exceeds 11 bits of PF2, subsampling may be avoided, and accordingly, an efficient transmission can be performed.

More particularly, in P-CSI mode 1-1 submode 1, when 1D port layout is configured (i.e., $N_1=1$ or $N_2=1$), the case that W1 may be separately reported may be configured with PF2. For 2D port layout, 4-port and 8-port configured with Class B K=1 may be transmitted with PF2, and W1 (reporting type 2a) may be reported with PF3 for Class A 12-port or more in which subsampling is required. Further, for Rank 1, reporting type 2b (wideband CQI+W2) may be reported with PF2. However, for Rank 2, since CQI increases to 7 bits, reporting type 2b may be reported with PF3.

In addition, in P-CSI mode 2-1, reporting type 1a (subband CQI+W2+L') may be reported with PF3 regardless of Rank.

Furthermore, even in the case of using PF3, when W1+W2+CQI (reporting type 2c) and the like are reported, since a payload size exceeds 22 bits, P-CSI mode 1-1 submode 2 in which such a reporting type is used may not used for feedback for the LC codebook. That is, when the LC codebook is configured, P-CSI mode 1-1 submode 1 and/or P-CSI mode 2-1 may be used.

FIG. 23 is a diagram illustrating a method for transmitting and receiving channel state information according to an embodiment of the present invention.

Referring to FIG. 23, a UE receives a channel state information reference signal (CSI-RS) through multiple antenna ports from an eNB (step, S2101).

The UE reports the channel state information (CSI) to the eNB (step, S2102).

Here, the UE may generate (calculate) the channel state information based on the CSI-RS from the eNB, and may report the channel state information to the eNB.

As described above, the channel state information may include CQI, PMI, RI, PTI, CRI, and the like.

In addition, the UE may report the CSI to the eNB periodically (e.g., on a PUCCH), and may also report the CSI to the eNB aperiodically (e.g., on a PUSCH).

Particularly, the UE may select the most preferred precoding matrix in the Linear Combination (LC) Codebook, and may report the information for indicating it to the eNB.

In the case that the Linear Combination (LC) Codebook is used, the procoding matrix may be generated based on linear combination of a plurality of codewords.

More particularly, in the case of Rank 1, a precoding matrix may include a first precoding vector for a first layer. Further, the first precoding vector in the cross polarization antenna layout may include a vector in which a first codeword and a second codeword are linearly combined for a first polarization and a vector in which a third codeword and a fourth codeword are linearly combined for a second polarization.

In the case of Rank 2, a precoding matrix may include a first precoding vector for a first layer and a second precoding vector for a second layer. Further, the first precoding vector in the cross polarization antenna layout may include a vector in which a first codeword and a second codeword are linearly combined for a first polarization and a vector in which a third codeword and a fourth codeword are linearly combined for a second polarization, and the second procoding vector include a vector in which a fifth codeword and a sixth codeword are linearly combined for a first polarization and a vector in which a seventh codeword and an eighth codeword are linearly combined for a second polarization.

At this time, after a power coefficient and a phase coefficient are applied to each of a plurality of codewords, a plurality of codewords to which the power coefficient and the phase coefficient are applied may be linearly combined.

The CSI may include selection information indicating a plurality of codewords used for generating a precoding matrix, information indicating the power coefficient, and/or information indicating the phase coefficient. Further, the types of information may be reported in different CSI reporting times/instances.

At this time, the selection information and the information indicating the phase coefficient may be included in the PMI. For example, the selection information may be included in a first PMI, and the information indicating the phase coefficient may be included in a second PMI.

For example, when the RI is reported, the information indicating the power coefficient may be transmitted in a first CSI reporting instance which is the same as the RI, the selection information may be transmitted in a second CSI reporting instance with being included in W1, and the information indicating the power coefficient may be transmitted in a third CSI reporting instance with being included in W2.

The detailed description for this may follow the embodiment of "A. CSI feedback method using PUCCH format 2 or PUCCH format 3" or the embodiment of "B. Subsampling method of W1 codebook", and the detailed description is omitted.

Furthermore, in order for the UE to match the payload of W1 and/or W2 to PUCCH format (e.g., PUCCH format 2/2a/2b or PUCCH format 3), the UE may report by subsampling W1 and/or W2 to the eNB.

For example, as described above, in the case of Rank 2, a precoding matrix may include a first precoding vector for a first layer and a second precoding vector for a second layer. The first precoding vector may include a vector in which a first codeword and a second codeword are linearly combined for a first polarization and a vector in which a third codeword and a fourth codeword are linearly combined for a second polarization, and the second procoding vector include a vector in which a fifth codeword and a sixth codeword are linearly combined for a first polarization and a vector in which a seventh codeword and an eighth codeword are linearly combined for a second polarization.

At this time, the phase coefficient value (e.g., 1) applied to the first codeword and the fifth codeword may be predefined. Further, only the phase coefficient values applied to the second codeword, the third codeword, the fourth codeword, the sixth codeword, the seventh codeword and the eighth codeword may be determined by the second PMI.

At this time, the phase coefficient values applied to the second codeword and the sixth codeword may be determined by the second PMI within $\{1, -1, j, -j\}$.

The phase coefficient value applied to each of two codewords among the remaining codewords may be predetermined by the second PMI within two components (e.g., $\{1, j\}$).

In addition, the phase coefficient values that are predetermined or applied to the remaining codewords not determined by the second PMI may be determined according to a predetermined rule. For example, the phase coefficient values applied to the fourth codeword and the eighth codeword may be determined based on the phase coefficient values applied to the third codeword and the seventh codeword. Further, the phase coefficient value applied to the seventh codeword may be the same as the value of the phase coefficient value applied to the third codeword multiplied by $-1$.

The detailed description for this may follow the embodiment of "B. Subsampling method of W1 codebook", and the detailed description is omitted.

The UE may transmit the CSI using PUCCH format 2/2a/2b and/or PUCCH format 3 to the eNB.

In addition, the UE may transmit the CSI to the eNB when operating periodic (or aperiodic) CSI reporting.

General Wireless Communication Device to which an Embodiment of the Present Invention May be Applied FIG. 24 illustrates a block diagram of a wireless communication device according to an embodiment of the present invention.

Referring to FIG. 24, the wireless communication system includes an eNB 2410 and a plurality of UEs 2420 placed within the area of the eNB 2410.

The eNB 2410 includes a processor 2411, memory 2412, and a Radio Frequency (RF) unit 2413. The processor 2411 implements the functions, processes and/or methods proposed with reference to FIGS. 1 to 23. The layers of the radio interface protocol may be implemented by the processor 2411. The memory 2412 is connected to the processor 2411 and stores various types of information for driving the processor 2411. The RF unit 2413 is connected to the processor 2411 and sends and/or receives radio signals.

The UE 2420 includes a processor 2421, memory 2422, and an RF unit 2423. The processor 2421 implements the functions, processes and/or methods proposed with reference to FIGS. 1 to 23. The layers of the radio interface protocol may be implemented by the processor 2421. The memory 2422 is connected to the processor 2421 and stores various types of information for driving the processor 2421. The RF unit 2423 is connected to the processor 2421 and sends and/or receives radio signals.

The memory 2412, 2422 may be placed inside or outside the processor 2411, 2421 and may be connected to the processor 2411, 2421 by well-known various means. Furthermore, the eNB 2410 and/or the UE 2420 may have a single antenna or multiple antennas.

Hereinafter, detailed embodiments of the present invention are described in detail with reference to the accompanying drawings. Each of elements or characteristics may be considered to be optional unless otherwise described explicitly. Each element or characteristic may be implemented in such a way as not to be combined with other elements or characteristics. Furthermore, some of the elements and/or the characteristics may be combined to form an embodiment of the present invention. Order of operations described in connection with the embodiments of the present invention may be changed. Some of the elements or characteristics of an embodiment may be included in another embodiment or may be replaced with corresponding elements or characteristics of another embodiment. It is evident that in the claims, one or more embodiments may be constructed by combining claims not having an explicit citation relation or may be included as one or more new claims by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The present invention has been illustrated as being applied to 3GPP LTE/LTE-A systems, but may be applied to various wireless communication systems other than the 3GPP LTE/LTE-A systems.

What is claimed is:

1. A method for reporting Channel State Information (CSI) performed by a user equipment (UE) in a wireless communication system, the method comprising:
receiving, from a base station (BS), a Channel State Information Reference Signal (CSI-RS) through multiple antenna ports arranged in first dimension and in second dimension; and
reporting, to the BS, the CSI based on a codebook generated by a linear combination of each of a plurality of beams,
wherein the CSI includes (i) selection information for beams selected from the codebook and (ii) coefficient information,
wherein the beams selected from the codebook are selected based on i) a number of antenna ports in the first dimension, ii) a number of antenna ports in the second dimension and iii) a combination formula,
wherein the coefficient information includes information for an amplitude coefficient and information for a phase coefficient,
wherein the amplitude coefficient and the phase coefficient are applied to the selected beams,
wherein a set of oversampling values corresponding to the number of antenna ports in the first dimension and the number of antenna ports in the second dimension are determined by pre-configured values, and
wherein based on the number of the multiple antenna ports being 8, the set of oversampling values is determined by one of (4,1) or (4,4).

2. The method of claim 1, wherein the selection information and the coefficient information are transmitted in different CSI reporting instances.

3. The method of claim 2, wherein the information for the amplitude coefficient and the information for the phase coefficient are transmitted in different CSI reporting instances.

4. The method of claim 3, wherein the CSI includes a rank indication (RI), and
wherein the information for the amplitude coefficient is transmitted in a same CSI reporting instance as the RI.

5. The method of claim 3, wherein the CSI includes a Precoding Matrix Indicator (PMI), and
wherein the selection information is included in a first PMI, and the information for the phase coefficient is included in a second PMI.

6. The method of claim 5, wherein the second PMI is subsampled, and transmitted in 4 bits.

7. The method of claim 6, wherein the subsampling is not performed when the RI is 1, and performed only when the RI is 2.

8. The method of claim 7 further comprising: when the RI is 2, a precoding matrix in the codebook includes a first precoding vector for a first layer and a second precoding vector for a second layer,
the first precoding vector includes a vector in which a first beam and a second beam are linearly combined for a first polarization and a vector in which a third beam and a fourth beam are linearly combined for a second polarization, and
the second precoding vector includes a vector in which a fifth beam and a sixth beam are linearly combined for the first polarization and a vector in which a seventh beam and an eighth beam are linearly combined for the second polarization.

9. The method of claim 8, wherein phase coefficient values applied to the second beam, the third beam, the fourth beam, the sixth beam, the seventh beam and the eighth beam are determined by the second PMI.

10. The method of claim 9, wherein a phase coefficient value applied to the second beam is determined by the second PMI within $\{1, -1, j, -j\}$.

11. The method of claim 10, wherein a phase coefficient value applied to the third beam is determined by the second PMI within $\{1, j\}$.

12. The method of claim 11, wherein phase coefficient values applied to the fourth beam and the eighth beam are determined based on phase coefficient values applied to the third beam and the seventh beam.

13. The method of claim 12, wherein a phase coefficient value applied to the seventh beam is a same as the value of a phase coefficient value applied to the third beam multiplied by −1.

14. The method of claim 2, wherein the CSI is transmitted utilizing Physical Uplink Control Channel (PUCCH) format 2/2a/2b.

15. A user equipment (UE) for reporting Channel State Information (CSI) in a wireless communication system, the UE comprising:
- a transceiver for transmitting and receiving a radio signal; and
- a processor for controlling the transceiver,
- wherein the processor is configured to:
  - receive, from a base station (BS) through the transceiver, a Channel State Information Reference Signal (CSI-RS) through multiple antenna ports arranged in first dimension and in second dimension; and
  - report, to the BS through the transceiver, the CSI based on a codebook generated by a linear combination of each of a plurality of beams,
- wherein the CSI includes (i) selection information for beams selected from the codebook and (ii) coefficient information,
- wherein the beams selected from the codebook are selected based on i) a number of antenna ports in the first dimension, ii) a number of antenna ports in the second dimension and iii) a combination formula,
- wherein the coefficient information includes information for an amplitude coefficient and information for a phase coefficient,
- wherein the amplitude coefficient and the phase coefficient are applied to the selected beams,
- wherein a set of oversampling values corresponding to the number of antenna ports in the first dimension and the number of antenna ports in the second dimension are determined by pre-configured values, and
- wherein based on the number of the multiple antenna ports being 8, the set of oversampling values is determined by one of (4,1) or (4,4).

* * * * *